(12) United States Patent
Kumarasamy

(10) Patent No.: US 10,860,426 B2
(45) Date of Patent: *Dec. 8, 2020

(54) CONTENT-INDEPENDENT AND DATABASE MANAGEMENT SYSTEM-INDEPENDENT SYNTHETIC FULL BACKUP OF A DATABASE BASED ON SNAPSHOT TECHNOLOGY

(71) Applicant: Commvault Systems, Inc., Tinton Falls, NJ (US)

(72) Inventor: Paramasivam Kumarasamy, Morganville, NJ (US)

(73) Assignee: Commvault Systems, Inc., Tinton Falls, NJ (US)

( * ) Notice: Subject to any disclaimer, the term of this patent is extended or adjusted under 35 U.S.C. 154(b) by 190 days.

This patent is subject to a terminal disclaimer.

(21) Appl. No.: 16/232,946

(22) Filed: Dec. 26, 2018

(65) Prior Publication Data

US 2019/0129799 A1    May 2, 2019

Related U.S. Application Data

(63) Continuation of application No. 15/868,854, filed on Jan. 11, 2018, now Pat. No. 10,303,550, which is a
(Continued)

(51) Int. Cl.
*G06F 7/00* (2006.01)
*G06F 11/14* (2006.01)
*G06F 11/00* (2006.01)

(52) U.S. Cl.
CPC ......... *G06F 11/1435* (2013.01); *G06F 11/00* (2013.01); *G06F 11/1451* (2013.01); *G06F 2201/80* (2013.01); *G06F 2201/84* (2013.01)

(58) Field of Classification Search
CPC ............ G06F 11/1448; G06F 11/1451; G06F 11/1435
(Continued)

(56) References Cited

U.S. PATENT DOCUMENTS 4,084,231 A    4/1978 Capozzi et al.
4,267,568 A    5/1981 Dechant et al.
(Continued)

FOREIGN PATENT DOCUMENTS

EP    0259912    3/1988
EP    0405926    1/1991
(Continued)

OTHER PUBLICATIONS

Arneson, "Mass Storage Archiving in Network Environments" IEEE, Oct. 31-Nov. 1998, pp. 45-50.
(Continued)

*Primary Examiner* — Md I Uddin
(74) *Attorney, Agent, or Firm* — Commvault Systems, Inc.

(57) ABSTRACT

The illustrative storage management system uses snapshot technologies and performs block-level analysis thereof and to synthesize full backups of a database, regardless of the database management system (DBMS) and content of the database and without involving native DBMS utilities. Synthetic full copies are created efficiently and use network transport resources sparingly. Successive snapshots of the database may be hardware snapshots and/or software snapshots. The illustrative storage management system tracks which data blocks in the database change over time after a baseline full copy is saved to secondary storage. Only the changed blocks are subsequently moved to secondary storage as incremental backups and are indexed for future reference. A synthetic full backup of the database, at a given
(Continued)

point in time, may be created by synthesizing the original full backup with changed blocks from any number of later incremental backups. The synthetic full backup comprises pointers to appropriate data blocks, ignoring intermediate changes, and pointing to the most current data block in secondary storage relative to the given point in time chosen for the synthetic full backup. The illustrative storage management system may restore the synthetic full backup without native DBMS utilities.

20 Claims, 17 Drawing Sheets

Related U.S. Application Data continuation of application No. 14/692,357, filed on Apr. 21, 2015, now Pat. No. 9,904,568.

(58) Field of Classification Search
USPC .................................. 707/639, 645, 646
See application file for complete search history.

(56) References Cited

U.S. PATENT DOCUMENTS

| | | |
|---|---|---|
| 4,283,787 A | 8/1981 | Chambers |
| 4,417,321 A | 11/1983 | Chang et al. |
| 4,641,274 A | 2/1987 | Swank |
| 4,654,819 A | 3/1987 | Stiffler et al. |
| 4,686,620 A | 8/1987 | Ng |
| 4,912,637 A | 3/1990 | Sheedy et al. |
| 4,995,035 A | 2/1991 | Cole et al. |
| 5,005,122 A | 4/1991 | Griffin et al. |
| 5,093,912 A | 3/1992 | Dong et al. |
| 5,133,065 A | 7/1992 | Cheffetz et al. |
| 5,193,154 A | 3/1993 | Kitajima et al. |
| 5,212,772 A | 5/1993 | Masters |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,276,860 A | 1/1994 | Fortier et al. |
| 5,276,867 A | 1/1994 | Kenley et al. |
| 5,287,500 A | 2/1994 | Stoppani, Jr. |
| 5,301,286 A | 4/1994 | Rajani |
| 5,321,816 A | 6/1994 | Rogan et al. |
| 5,347,653 A | 9/1994 | Flynn et al. |
| 5,410,700 A | 4/1995 | Fecteau et al. |
| 5,420,996 A | 5/1995 | Aoyagi |
| 5,454,099 A | 9/1995 | Myers et al. |
| 5,559,991 A | 9/1996 | Kanfi |
| 5,642,496 A | 6/1997 | Kanfi |
| 5,758,337 A | 5/1998 | Hammond |
| 5,991,772 A | 11/1999 | Doherty et al. |
| 6,151,608 A | 11/2000 | Abrams |
| 6,199,074 B1 | 3/2001 | Kern et al. |
| 6,360,228 B1 | 3/2002 | Sundara et al. |
| 6,374,267 B1 | 4/2002 | Tam |
| 6,418,478 B1 | 7/2002 | Ignatius et al. |
| 6,460,043 B1 | 10/2002 | Tabbara et al. |
| 6,487,561 B1 | 11/2002 | Ofek et al. |
| 6,542,972 B2 | 4/2003 | Ignatius et al. |
| 6,658,436 B2 | 12/2003 | Oshinsky et al. |
| 6,678,700 B1 | 1/2004 | Moore et al. |
| 6,684,225 B1 | 1/2004 | Huras et al. |
| 6,721,767 B2 | 4/2004 | De Meno et al. |
| 6,760,723 B2 | 7/2004 | Oshinsky et al. |
| 6,920,537 B2 | 7/2005 | Ofek et al. |
| 7,003,641 B2 | 2/2006 | Prahlad et al. |
| 7,035,880 B1 | 4/2006 | Crescenti et al. |
| 7,107,298 B2 | 9/2006 | Prahlad |
| 7,113,964 B1 | 9/2006 | Bequet et al. |
| 7,130,970 B2 | 10/2006 | Devassy et al. |
| 7,162,496 B2 | 1/2007 | Amarendran et al. |
| 7,174,433 B2 | 2/2007 | Kottomtharayil et al. |
| 7,246,207 B2 | 7/2007 | Kottomtharayil et al. |
| 7,315,923 B2 | 1/2008 | Retnamma et al. |
| 7,343,453 B2 | 3/2008 | Prahlad et al. |
| 7,389,311 B1 | 6/2008 | Crescenti et al. |
| 7,395,282 B1 | 7/2008 | Crescenti et al. |
| 7,440,982 B2 | 10/2008 | Lu et al. |
| 7,454,569 B2 | 11/2008 | Kavuri et al. |
| 7,472,142 B2 | 12/2008 | Prahlad |
| 7,490,207 B2 | 2/2009 | Amarendran et al. |
| 7,500,053 B1 | 3/2009 | Kavuri et al. |
| 7,519,620 B2 | 4/2009 | Yokouchi |
| 7,529,782 B2 | 5/2009 | Prahlad et al. |
| 7,536,291 B1 | 5/2009 | Vijayan Retnamma et al. |
| 7,539,707 B2 | 5/2009 | Prahlad et al. |
| 7,543,125 B2 | 6/2009 | Gokhale |
| 7,546,324 B2 | 6/2009 | Prahlad et al. |
| 7,552,358 B1 | 6/2009 | Asgar-Deen et al. |
| 7,568,080 B2 | 7/2009 | Prahlad et al. |
| 7,603,386 B2 | 10/2009 | Amarendran et al. |
| 7,606,844 B2 | 10/2009 | Kottomtharayil |
| 7,613,752 B2 | 11/2009 | Prahlad et al. |
| 7,617,253 B2 | 11/2009 | Prahlad et al. |
| 7,617,262 B2 | 11/2009 | Prahlad et al. |
| 7,620,710 B2 | 11/2009 | Kottomtharayil et al. |
| 7,634,511 B1 | 12/2009 | Freiheit et al. |
| 7,636,743 B2 | 12/2009 | Erofeev |
| 7,651,593 B2 | 1/2010 | Prahlad et al. |
| 7,657,550 B2 | 2/2010 | Prahlad et al. |
| 7,660,807 B2 | 2/2010 | Prahlad et al. |
| 7,661,028 B2 | 2/2010 | Erofeev |
| 7,720,801 B2 | 5/2010 | Chen |
| 7,734,669 B2 | 6/2010 | Kottomtharayil et al. |
| 7,747,579 B2 | 6/2010 | Prahlad et al. |
| 7,769,890 B2 | 8/2010 | Littlefield |
| 7,778,974 B2 | 8/2010 | Compton et al. |
| 7,801,864 B2 | 9/2010 | Prahlad et al. |
| 7,809,914 B2 | 10/2010 | Kottomtharayil et al. |
| 7,836,022 B2 | 11/2010 | Gillespie |
| 7,840,539 B2 | 11/2010 | Mooney et al. |
| 7,860,824 B2 | 12/2010 | Suzuki et al. |
| 7,882,067 B2 | 2/2011 | Saika |
| 8,055,627 B2 | 11/2011 | Prahlad et al. |
| 8,065,278 B2 | 11/2011 | Beatty et al. |
| 8,073,969 B2 | 12/2011 | Littlefield |
| 8,131,964 B2 | 3/2012 | Retnamma et al. |
| 8,170,995 B2 | 5/2012 | Prahlad et al. |
| 8,229,954 B2 | 7/2012 | Kottomtharayil et al. |
| 8,244,681 B2 | 8/2012 | Laffin |
| 8,271,436 B2 | 9/2012 | D'Souza et al. |
| 8,285,681 B2 | 10/2012 | Prahlad et al. |
| 8,307,177 B2 | 11/2012 | Prahlad et al. |
| 8,315,981 B2 | 11/2012 | Prahlad |
| 8,352,422 B2 | 1/2013 | Prahlad et al. |
| 8,364,652 B2 | 1/2013 | Vijayan et al. |
| 8,370,542 B2 | 2/2013 | Lu et al. |
| 8,392,370 B1 | 3/2013 | Whitney et al. |
| 8,442,945 B1 | 5/2013 | Doerner |
| 8,515,911 B1 | 8/2013 | Zhou et al. |
| 8,543,542 B2 | 9/2013 | D'Souza et al. |
| 8,578,120 B2 | 11/2013 | Attarde et al. |
| 8,589,347 B2 | 11/2013 | Erofeev |
| 8,606,752 B1 | 12/2013 | Beatty et al. |
| 8,612,394 B2 | 12/2013 | Prahlad |
| 8,645,320 B2 | 2/2014 | Prahlad et al. |
| 8,650,169 B1 | 2/2014 | Jacobs et al. |
| 8,677,091 B2 | 3/2014 | Littlefield |
| 8,726,242 B2 | 5/2014 | Ngo |
| 8,745,003 B1 | 6/2014 | Patterson |
| 8,745,105 B2 | 6/2014 | Erofeev |
| 8,789,208 B1 | 7/2014 | Sundaram et al. |
| 8,805,786 B1 | 8/2014 | Natanzon |
| 8,874,519 B1 | 10/2014 | Payne |
| 8,935,492 B2 | 1/2015 | Gokhale et al. |
| 8,954,446 B2 | 2/2015 | Vijayan Retnamma et al. |
| 9,020,900 B2 | 4/2015 | Vijayan Retnamma et al. |
| 9,043,287 B2 | 5/2015 | Periyagaram et al. |
| 9,098,495 B2 | 8/2015 | Gokhale |
| 9,124,611 B2 | 9/2015 | Littlefield |

(56) References Cited

U.S. PATENT DOCUMENTS

| | | | |
|---|---|---|---|
| 9,164,850 B2 | 10/2015 | Prahlad | |
| 9,239,687 B2 | 1/2016 | Vijayan et al. | |
| 9,244,779 B2 | 1/2016 | Littlefield | |
| 9,275,086 B2 | 3/2016 | Kumarasamy et al. | |
| 9,298,715 B2 | 3/2016 | Kumarasamy et al. | |
| 9,400,803 B2 | 7/2016 | Littlefield | |
| 9,558,072 B1 | 1/2017 | Mam | |
| 9,659,076 B2 | 5/2017 | Kumarasamy et al. | |
| 9,720,787 B2 | 8/2017 | Kumarasamy et al. | |
| 9,766,987 B2 | 9/2017 | Kumarasamy et al. | |
| 9,846,620 B2 | 12/2017 | Kumarasamy et al. | |
| 9,904,598 B2 | 2/2018 | Kumarasamy | |
| 10,108,687 B2 | 10/2018 | Dornemann et al. | |
| 10,191,819 B2 | 1/2019 | Dornemann et al. | |
| 10,210,051 B2 | 2/2019 | Vallabhaneni et al. | |
| 10,223,211 B2 | 3/2019 | Kumarasamy et al. | |
| 10,223,212 B2 | 3/2019 | Kumarasamy et al. | |
| 10,303,550 B2 | 5/2019 | Kumarasamy et al. | |
| 2003/0182313 A1 | 9/2003 | Federwisch et al. | |
| 2004/0059738 A1 | 3/2004 | Tarbell | |
| 2004/0167941 A1 | 8/2004 | Prahald | |
| 2005/0203887 A1 | 9/2005 | Joshi et al. | |
| 2006/0015485 A1 | 1/2006 | Hofmann | |
| 2006/0095481 A1 | 5/2006 | Singh et al. | |
| 2006/0224846 A1 | 10/2006 | Amarendran et al. | |
| 2006/0235904 A1 | 10/2006 | Kapur | |
| 2007/0033237 A1 | 2/2007 | Prahald | |
| 2007/0050777 A1 | 3/2007 | Hutchinson et al. | |
| 2007/0083563 A1 | 4/2007 | Souder et al. | |
| 2007/0143371 A1 | 6/2007 | Kottomtharayil | |
| 2007/0174325 A1 | 7/2007 | Mooney et al. | |
| 2007/0185915 A1 | 8/2007 | Prahlad et al. | |
| 2007/0288490 A1 | 12/2007 | Longshaw | |
| 2008/0014869 A1 | 1/2008 | Demirbasa et al. | |
| 2008/0034018 A1 | 2/2008 | Cisler et al. | |
| 2008/0144601 A1 | 6/2008 | Nurminen et al. | |
| 2008/0147754 A1 | 6/2008 | Littlefield | |
| 2008/0147836 A1 | 6/2008 | Littlefield | |
| 2008/0147997 A1 | 6/2008 | Littlefield | |
| 2008/0162590 A1 | 7/2008 | Kundu et al. | |
| 2008/0172391 A1 | 7/2008 | Adelman et al. | |
| 2009/0083338 A1 | 3/2009 | Evans et al. | |
| 2009/0164532 A1 | 6/2009 | Pralad | |
| 2009/0193206 A1 | 7/2009 | Ishii et al. | |
| 2009/0319534 A1 | 12/2009 | Gokhale | |
| 2010/0005259 A1 | 1/2010 | Prahlad et al. | |
| 2010/0070448 A1 | 3/2010 | Omoigui | |
| 2010/0070726 A1 | 3/2010 | Ngo et al. | |
| 2010/0077165 A1 | 3/2010 | Lu et al. | |
| 2010/0082552 A1 | 4/2010 | Beatty | |
| 2010/0082553 A1 | 4/2010 | Beatty et al. | |
| 2010/0082554 A1 | 4/2010 | Beatty et al. | |
| 2010/0082672 A1 | 4/2010 | Kottomtharayil et al. | |
| 2010/0191702 A1 | 7/2010 | Hofmann | |
| 2010/0223373 A1 | 9/2010 | Littlefield | |
| 2010/0250549 A1 | 9/2010 | Muller et al. | |
| 2010/0332401 A1 | 12/2010 | Prahlad | |
| 2010/0332453 A1 | 12/2010 | Prahlad et al. | |
| 2010/0332479 A1 | 12/2010 | Prahlad | |
| 2011/0010440 A1 | 1/2011 | Kottomtharayil et al. | |
| 2011/0035419 A1 | 2/2011 | Littlefield | |
| 2011/0035621 A1 | 2/2011 | Littlefield | |
| 2011/0125714 A1* | 5/2011 | Manson | G06F 11/1458 707/645 |
| 2011/0138225 A1 | 6/2011 | Gunabalasubramaniam et al. | |
| 2011/0161295 A1* | 6/2011 | Ngo | G06F 11/1446 707/639 |
| 2011/0231698 A1 | 9/2011 | Ziati et al. | |
| 2012/0036108 A1 | 2/2012 | Prahlad | |
| 2012/0084523 A1 | 4/2012 | Littlefield | |
| 2012/0150818 A1 | 6/2012 | Vijayan Retnamma et al. | |
| 2012/0150826 A1 | 6/2012 | Vijayan Retnamma et al. | |
| 2012/0330911 A1 | 12/2012 | Gruenheid et al. | |
| 2013/0198165 A1 | 8/2013 | Cheng et al. | |
| 2013/0238562 A1 | 9/2013 | Kumarasamy et al. | |
| 2013/0339298 A1 | 12/2013 | Muller et al. | |
| 2014/0046900 A1 | 2/2014 | Kumarasamy et al. | |
| 2014/0095816 A1 | 4/2014 | Hsu et al. | |
| 2014/0108352 A1 | 4/2014 | Ahrens et al. | |
| 2014/0108355 A1 | 4/2014 | Prahlad | |
| 2014/0181028 A1 | 6/2014 | Prahlad et al. | |
| 2014/0201170 A1 | 7/2014 | Viyayan et al. | |
| 2014/0201250 A1 | 7/2014 | Littlefield | |
| 2014/0297699 A1 | 10/2014 | Fujishima et al. | |
| 2014/0317063 A1 | 10/2014 | Patterson | |
| 2015/0066852 A1 | 3/2015 | Beard et al. | |
| 2015/0269144 A1 | 9/2015 | Littlefield | |
| 2015/0278034 A1 | 10/2015 | Barnes et al. | |
| 2016/0004721 A1 | 1/2016 | Iyer | |
| 2016/0034481 A1 | 2/2016 | Kumarasamy et al. | |
| 2016/0041880 A1 | 2/2016 | Mitkar et al. | |
| 2016/0142483 A1 | 5/2016 | Nallathambi et al. | |
| 2016/0147472 A1 | 5/2016 | Littlefield | |
| 2016/0210306 A1 | 7/2016 | Kumarasamy et al. | |
| 2016/0350391 A1 | 12/2016 | Vijayan et al. | |
| 2017/0168903 A1 | 6/2017 | Chen | |
| 2017/0177251 A1 | 6/2017 | Chen | |
| 2017/0185488 A1 | 6/2017 | Kumarasamy et al. | |
| 2017/0193003 A1 | 7/2017 | Vijayan et al. | |
| 2017/0206221 A1 | 7/2017 | Kumarasamy et al. | |
| 2017/0235647 A1 | 8/2017 | Kilaru et al. | |
| 2017/0242871 A1 | 8/2017 | Kilaru et al. | |
| 2017/0300548 A1 | 10/2017 | Kumarasamy et al. | |
| 2018/0089038 A1 | 3/2018 | Kumarasamy et al. | |
| 2018/0129567 A1 | 5/2018 | Kumarasamy | |
| 2019/0196916 A1 | 6/2019 | Kumarasamy et al. | |
| 2019/0213087 A1 | 7/2019 | Kumarasamy et al. | |
| 2019/0220368 A1 | 7/2019 | Vallabhaneni et al. | |
| 2019/0227883 A1 | 7/2019 | Kumarasamy et al. | |
| 2019/0227990 A1 | 7/2019 | Kumarasamy et al. | |
| 2019/0278664 A1 | 9/2019 | Dornemann et al. | |

FOREIGN PATENT DOCUMENTS

| | | |
|---|---|---|
| EP | 0467546 | 1/1992 |
| EP | 0541281 | 5/1993 |
| EP | 0774715 | 5/1997 |
| EP | 0809184 | 11/1997 |
| EP | 0899662 | 3/1999 |
| EP | 0981090 | 2/2000 |
| WO | WO 95/13580 | 5/1995 |
| WO | WO 99/12098 | 3/1999 |
| WO | WO 2006/052872 | 5/2006 |

OTHER PUBLICATIONS

Cabrera, et al. "ADSM: A Multi-Platform, Scalable, Back-up and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.

Catalogic Software Solutions Sheet, "Universal Data Protection Built on NetApp," 2013.

Eitel, "Backup and Storage Management in Distributed Heterogeneous Environments," IEEE, 1994, pp. 124-126.

Huff, KL, "Data Set Usage Sequence Number," IBM Technical Disclosure Bulletin, vol. 24, No. 5, Oct. 1981 New York, US, pp. 2404-2406.

Rosenblum et al., "The Design and Implementation of a Log-Structure File System," Operating Systems Review SIGOPS, vol. 25, No. 5, May 1991, New York, US, pp. 1-15.

"What is a Sharepoint List?" by Chris. Publication date unknown. Accessed archive from Sep. 27, 2012 on Jul. 30, 2015. <https://web.archive.org/web/201209270 1211 8/http://www.fastsharepoint.com/tutorials/SharePoi ntList>.

Commvault, "Commvault Simpana Intellisnap Snapshot Management Technology: Capabilities and Benefits", 16 pages, 2014.

Commvault, "Commvault Snapshot Backup & Recovery", 9 pages, 2015.

Commvault Systems, Inc., "Simpana Intellisnap Technology, Make Snaps Work", 2 pages, 2014.

(56) References Cited

OTHER PUBLICATIONS

Commvault Systems, Inc., "Synthetic Full Backups"), 3 pages, 1997-2015.
Nagy, Tibor, Table Level Recovery for Selected SQL Server Tables, Edgewood Solutions, LLC, https:/www.mssqltips.com/sqlservertip/2814/table-level-recovery-for-selected-sql-server-tables, May 12, 2017, pp. 1-10.

* cited by examiner

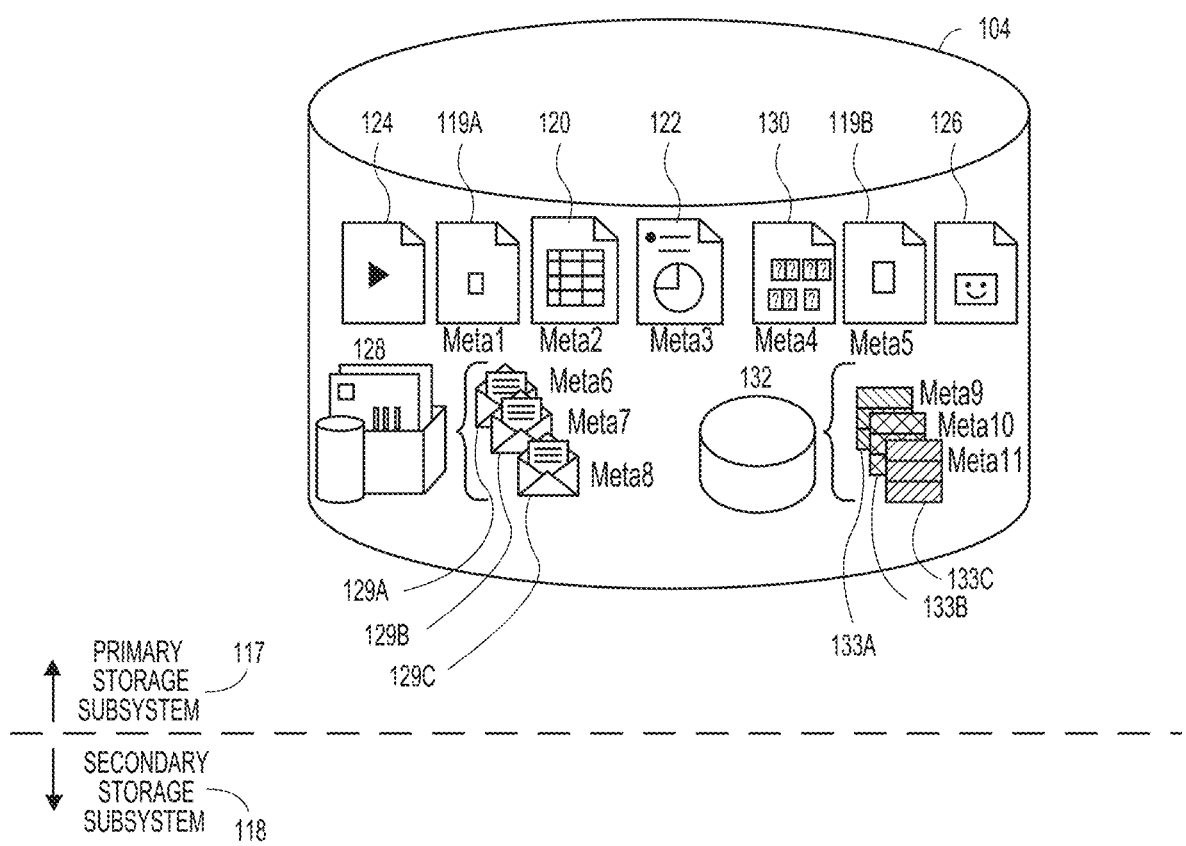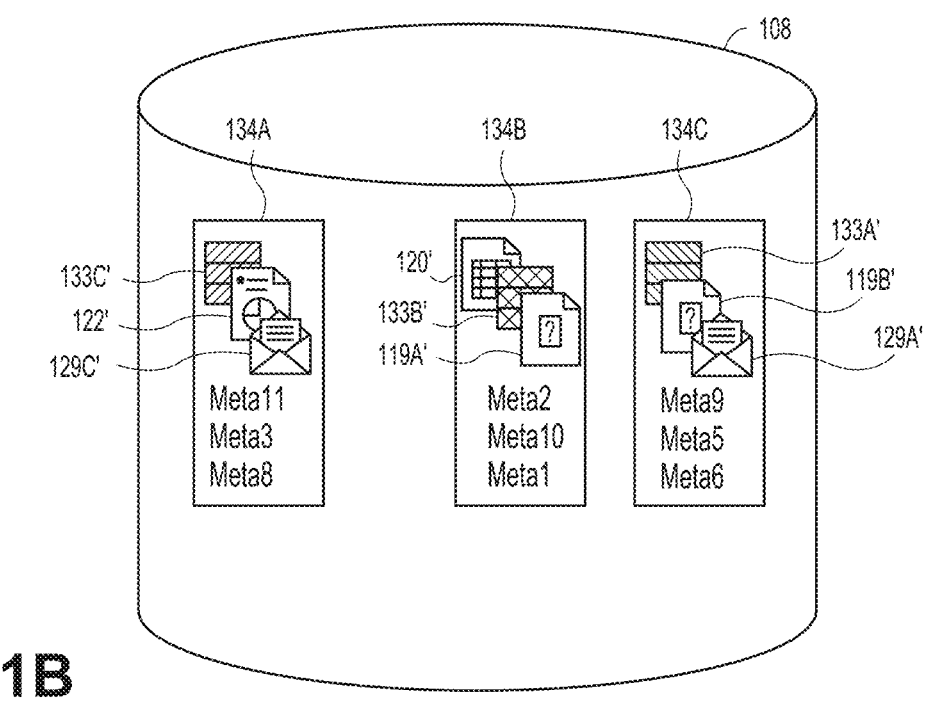
FIG. 1B

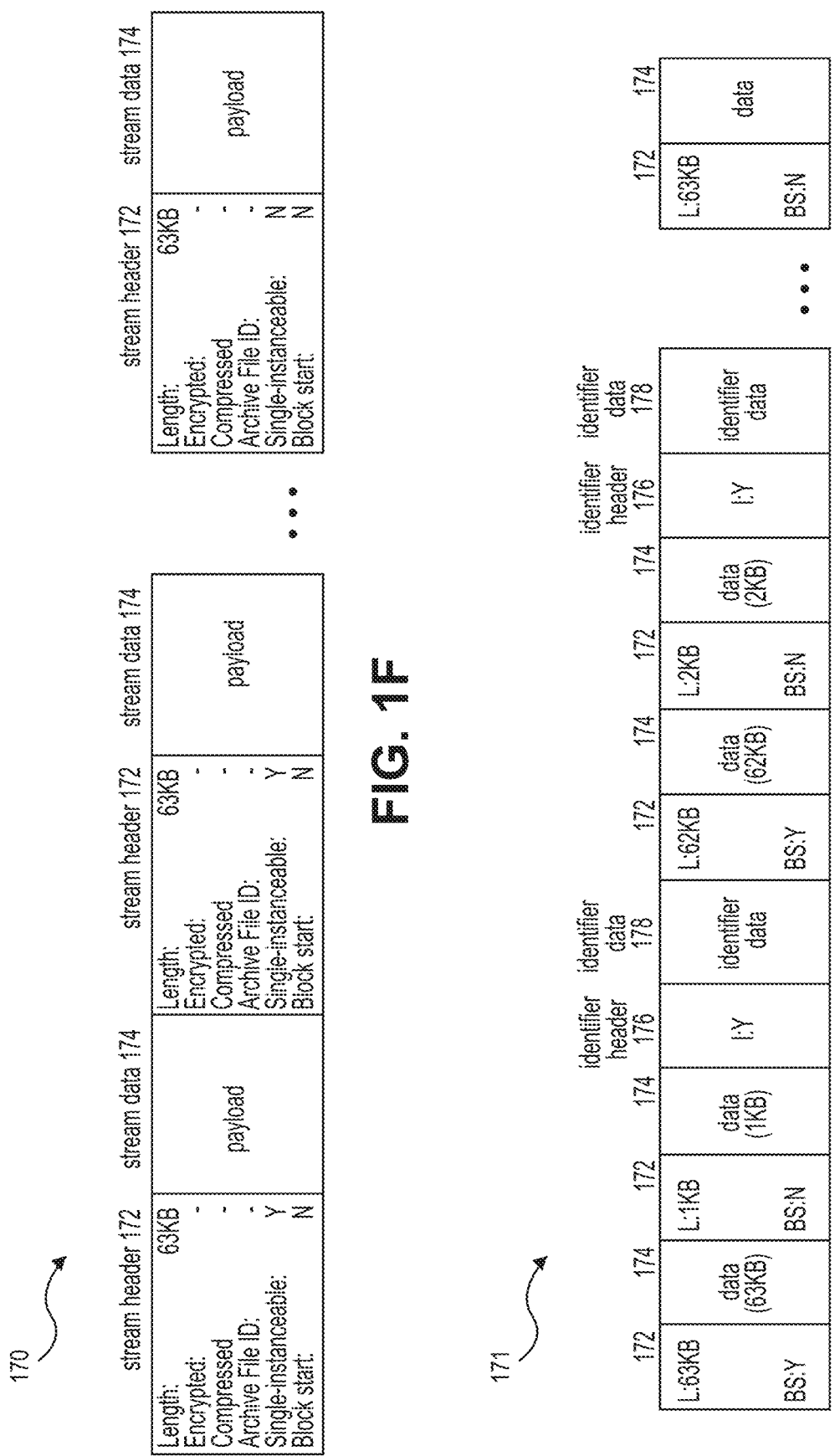

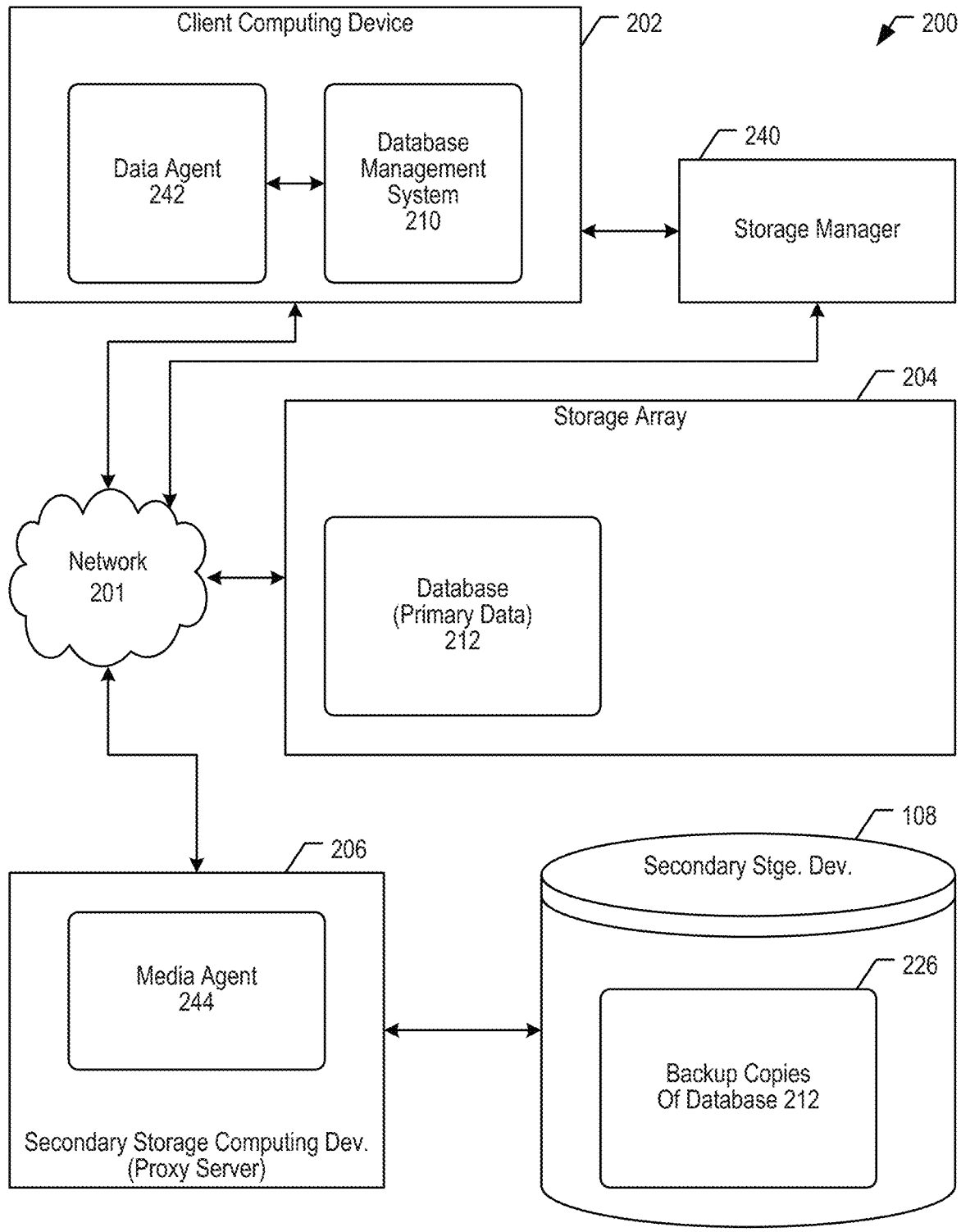
FIG. 2  Storage Management System 200 For Synthesizing A Content-Independent And DBMS-Independent Full Backup Of A Database Based On Snapshot Technology

US 10,860,426 B2

CONTENT-INDEPENDENT AND DATABASE MANAGEMENT SYSTEM-INDEPENDENT SYNTHETIC FULL BACKUP OF A DATABASE BASED ON SNAPSHOT TECHNOLOGY

INCORPORATION BY REFERENCE TO ANY PRIORITY APPLICATIONS

The present application is a Continuation of U.S. patent application Ser. No. 15/868,854 filed on Jan. 11, 2018, which is a Continuation of U.S. patent application Ser. No. 14/692,357, filed on Apr. 21, 2015, now U.S. Pat. No. 9,904,598. Any and all applications for which a foreign or domestic priority claim is identified in the Application Data Sheet of the present application are hereby incorporated by reference under 37 CFR 1.57.

BACKGROUND

Businesses worldwide recognize the commercial value of their data and seek reliable, cost-effective ways to protect the information stored on their computer networks while minimizing impact on productivity. A company might back up critical computing systems such as databases, file servers, web servers, and so on as part of a daily, weekly, or monthly maintenance schedule. Given the rapidly expanding volume of data under management, and with particular regard to very large production databases that are heavily used, there is a need for efficient backups that minimize resource usage, e.g., CPU, disk, network resources.

SUMMARY

Very large production databases not only may occupy terabytes of storage space, but may also be very heavily used, so that any performance slowdown is undesirable, such as the time required for traditional full backups of the database. Such databases may be key business assets that must be carefully and regularly protected. Traditional approaches to database backups in which the database management system (DBMS) natively performs full database backups may be undesirable in some situations, because the typical DBMS takes a relatively long time to perform the backups. Traditional storage management systems may perform backups apart from the DBMS, but generally are not equipped to parse database states and other metadata generated by the DBMS, and thus may treat the entire database storage volume as an undivided whole. As a result, the databases are protected as unified data structures. When a database size is on the order of terabytes, this approach may generate very large amounts of data to be moved across the storage management system, e.g., from the live production environment to secondary storage, which may substantially strain networking resources and may also increase the risk of backup failures. Database transaction logs, generated and managed by the DBMS, may be saved as incremental backups, but they are also impenetrable to the storage management system and would also be transported as unified wholes. Therefore, a more storage- and bandwidth-efficient approach is desirable.

The illustrative storage management system according to an embodiment of the present invention uses snapshot technologies and performs block-level analysis thereof to synthesize full backups of a database, regardless of the DBMS type or maker, and also regardless of the content of the database, and also without involving native DBMS utilities. Accordingly, the illustrative synthetic full backups are created efficiently and use network transport resources sparingly.

Successive snapshots are taken of the production database. The illustrative storage management system tracks which data blocks in a database change over time after a baseline full copy is saved to secondary storage. Only the changed blocks are subsequently moved to secondary storage as incremental backups and are indexed for future reference. The incremental backups require fewer network resources, since they are generally substantially smaller than the full-sized database. A synthetic full backup, representing the database at a given point in time, may be created by synthesizing the original full backup with changed blocks from any number of later incremental backups. The synthetic full backup comprises pointers to appropriate data blocks, ignoring intermediate changes, and pointing to the most current data block in secondary storage relative to the given point in time chosen for the synthetic full backup. The present approach is able to ignore or skip intermediate changes, which is advantageous in restore operations over the prior-art approach of replaying database transaction logs.

The synthetic full backup may be used by the illustrative storage management system to restore the database by retrieving the data blocks from secondary storage according to the pointers and reconstructing or reconstituting the backed up database at the given point in time with all the data blocks intact. The restore operation, like the synthetic full backup, may be performed by the illustrative storage management system without involving any native DBMS utilities. Like the synthetic full backup, the restore from the synthetic full backup is independent of the DBMS and the database content. This means that, advantageously, performance slowdowns, processing cycles and downtime of the DBMS may be reduced for purposes of restoring the database, and when the full copy is restored and ready for use, the DBMS may relatively rapidly acquire access to the restored database.

BRIEF DESCRIPTION OF THE DRAWINGS

FIG. 1B is a detailed view of a primary storage device, a secondary storage device, and some examples of primary data and secondary copy data.

FIGS. 1F-1H are block diagrams illustrating suitable data structures that may be employed by the information management system.

FIG. 2 is a block diagram illustrating some salient portions of a system 200 for generating and using a content-independent and DBMS-independent synthetic full backup of a database based on snapshot technology, according to an illustrative embodiment of the present invention.

DETAILED DESCRIPTION

Example of systems and methods for generating and using a content-independent and DBMS-independent synthetic full backup of a database based on snapshot technology are described in further detail herein, in reference to FIGS. 2 through 9 and in the section entitled CONTENT-INDEPENDENT AND DBMS-INDEPENDENT SYNTHETIC FULL BACKUP OF A DATABASE BASED ON SNAPSHOT TECHNOLOGY. Moreover, components and functionality for generating and using a content-independent and DBMS-independent synthetic full backup of a database based on snapshot technology may be configured and/or incorporated into information management systems such as those described herein in FIGS. 1A-1H.

Information Management System Overview

With the increasing importance of protecting and leveraging data, organizations simply cannot afford to take the risk of losing critical data, and thus storage management is a critical business function. Moreover, runaway data growth and other modern realities make protecting and managing data an increasingly difficult task. There is therefore a need for efficient, powerful, and user-friendly solutions for protecting and managing data. Depending on the size of the organization, there are typically many data production sources which are under the purview of tens, hundreds, or even thousands of employees or other individuals. In the past, individual employees were sometimes responsible for managing and protecting their data. A patchwork of hardware and software point solutions has been applied in other cases. These solutions were often provided by different vendors and had limited or no interoperability. Certain embodiments described herein provide systems and methods capable of addressing these and other shortcomings of prior approaches by implementing unified, organization-wide information and storage management.

Figure 1A:
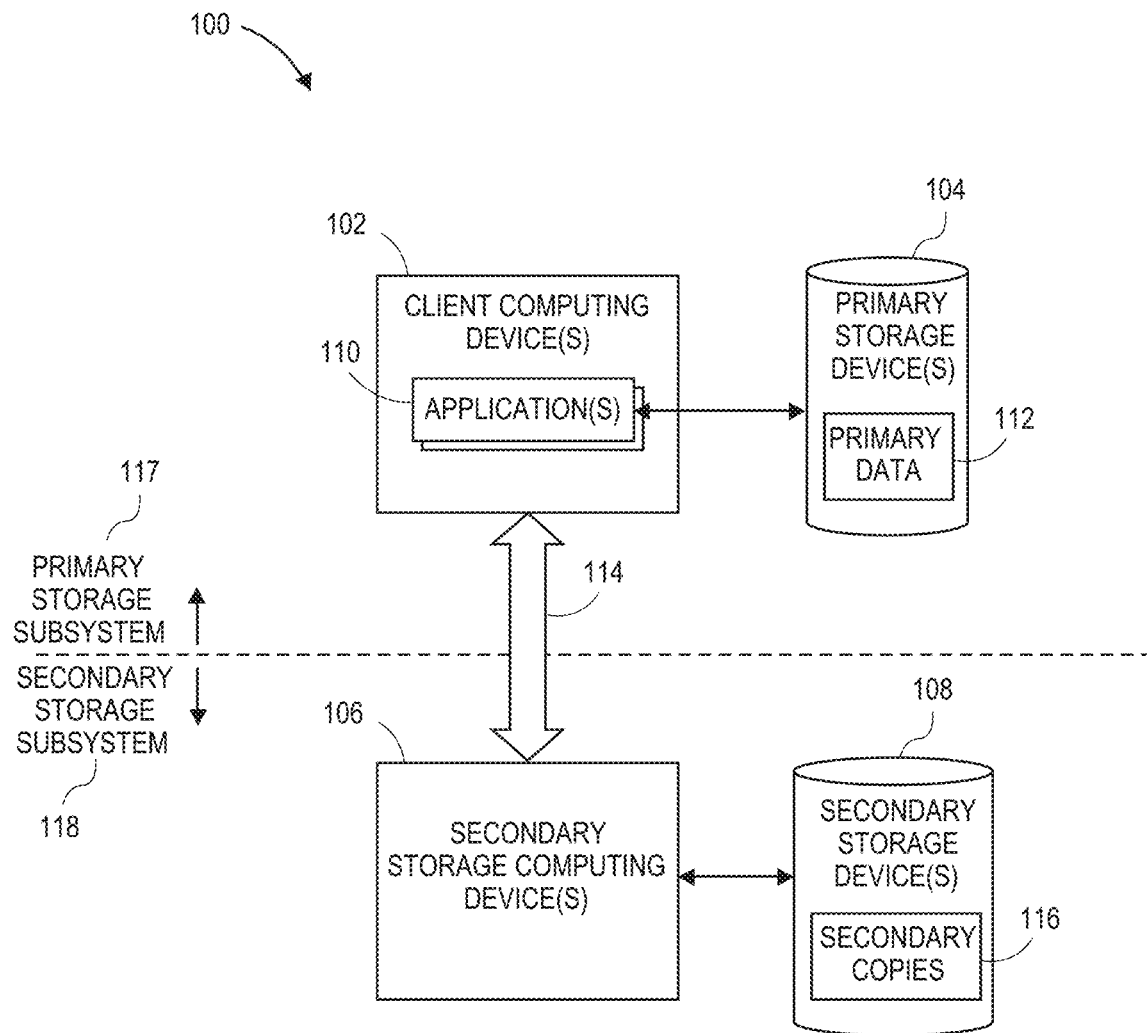
FIG. 1A is a block diagram illustrating an exemplary information management system.

FIG. 1A shows one such information management system 100, which generally includes combinations of hardware and software configured to protect and manage data and metadata, which is generated and used by the various computing devices in information management system 100. The organization that employs the information management system 100 may be a corporation or other business entity, non-profit organization, educational institution, household, governmental agency, or the like.

Generally, the systems and associated components described herein may be compatible with and/or provide some or all of the functionality of the systems and corresponding components described in one or more of the following U.S. patents and patent application publications assigned to CommVault Systems, Inc., each of which is hereby incorporated in its entirety by reference herein:

U.S. Pat. No. 7,035,880, entitled "Modular Backup and Retrieval System Used in Conjunction With a Storage Area Network";

U.S. Pat. No. 7,107,298, entitled "System And Method For Archiving Objects In An Information Store";

U.S. Pat. No. 7,246,207, entitled "System and Method for Dynamically Performing Storage Operations in a Computer Network";

U.S. Pat. No. 7,315,923, entitled "System And Method For Combining Data Streams In Pipelined Storage Operations In A Storage Network";

U.S. Pat. No. 7,343,453, entitled "Hierarchical Systems and Methods for Providing a Unified View of Storage Information";

U.S. Pat. No. 7,395,282, entitled "Hierarchical Backup and Retrieval System";

U.S. Pat. No. 7,529,782, entitled "System and Methods for Performing a Snapshot and for Restoring Data";

U.S. Pat. No. 7,617,262, entitled "System and Methods for Monitoring Application Data in a Data Replication System";

U.S. Pat. No. 7,747,579, entitled "Metabase for Facilitating Data Classification";

U.S. Pat. No. 8,156,086, entitled "Systems And Methods For Stored Data Verification";

U.S. Pat. No. 8,170,995, entitled "Method and System for Offline Indexing of Content and Classifying Stored Data";

U.S. Pat. No. 8,229,954, entitled "Managing Copies Of Data";

U.S. Pat. No. 8,230,195, entitled "System And Method For Performing Auxiliary Storage Operations";

U.S. Pat. No. 8,285,681, entitled "Data Object Store and Server for a Cloud Storage Environment, Including Data Deduplication and Data Management Across Multiple Cloud Storage Sites";

U.S. Pat. No. 8,307,177, entitled "Systems And Methods For Management Of Virtualization Data";

U.S. Pat. No. 8,364,652, entitled "Content-Aligned, Block-Based Deduplication";

U.S. Pat. No. 8,578,120, entitled "Block-Level Single Instancing";

U.S. Pat. Pub. No. 2006/0224846, entitled "System and Method to Support Single Instance Storage Operations";

U.S. Pat. Pub. No. 2009/0319534, entitled "Application-Aware and Remote Single Instance Data Management";

U.S. Pat. Pub. No. 2012/0150818, entitled "Client-Side Repository in a Networked Deduplicated Storage System"; and U.S. Pat. Pub. No. 2012/0150826, entitled "Distributed Deduplicated Storage System".

The information management system 100 can include a variety of different computing devices. For instance, as will be described in greater detail herein, the information management system 100 can include one or more client computing devices 102 and secondary storage computing devices 106.

Computing devices can include, without limitation, one or more: workstations, personal computers, desktop computers, or other types of generally fixed computing systems such as mainframe computers and minicomputers. Other computing devices can include mobile or portable computing devices, such as one or more laptops, tablet computers, personal data assistants, mobile phones (such as smartphones), and other mobile or portable computing devices such as embedded computers, set top boxes, vehicle-mounted devices, wearable computers, etc. Computing devices can include servers, such as mail servers, file servers, database servers, and web servers.

In some cases, a computing device includes virtualized and/or cloud computing resources. For instance, one or more virtual machines may be provided to the organization by a third-party cloud service vendor. Or, in some embodiments, computing devices can include one or more virtual machine(s) running on a physical host computing device (or "host machine") operated by the organization. As one example, the organization may use one virtual machine as a database server and another virtual machine as a mail server, both virtual machines operating on the same host machine. A virtual machine includes an operating system and associated virtual resources, and is hosted simultaneously with another operating system on a physical host computer (or host machine). A hypervisor (typically software, and also known in the art as a virtual machine monitor or a virtual machine manager or "VMM") sits between the virtual machine and the hardware of the physical host machine. One example of hypervisor as virtualization software is ESX Server, by VMware, Inc. of Palo Alto, Calif.; other examples include Microsoft Virtual Server and Microsoft Windows Server Hyper-V, both by Microsoft Corporation of Redmond, Wash., and Sun xVM by Oracle America Inc. of Santa Clara, Calif. In some embodiments, the hypervisor may be firmware or hardware or a combination of software and/or firmware and/or hardware.

The hypervisor provides to each virtual operating system virtual resources, such as a virtual processor, virtual memory, a virtual network device, and a virtual disk. Each virtual machine has one or more virtual disks. The hypervisor typically stores the data of virtual disks in files on the file system of the physical host machine, called virtual machine disk files (in the case of VMware virtual servers) or virtual hard disk image files (in the case of Microsoft virtual servers). For example, VMware's ESX Server provides the Virtual Machine File System (VMFS) for the storage of virtual machine disk files. A virtual machine reads data from and writes data to its virtual disk much the same way that an actual physical machine reads data from and writes data to an actual disk.

Examples of techniques for implementing information management techniques in a cloud computing environment are described in U.S. Pat. No. 8,285,681, which is incorporated by reference herein. Examples of techniques for implementing information management techniques in a virtualized computing environment are described in U.S. Pat. No. 8,307,177, also incorporated by reference herein.

The information management system 100 can also include a variety of storage devices, including primary storage devices 104 and secondary storage devices 108, for example. Storage devices can generally be of any suitable type including, without limitation, disk drives, hard-disk arrays, semiconductor memory (e.g., solid state storage devices), network attached storage (NAS) devices, tape libraries or other magnetic, non-tape storage devices, optical media storage devices, DNA/RNA-based memory technology, combinations of the same, and the like. In some embodiments, storage devices can form part of a distributed file system. In some cases, storage devices are provided in a cloud (e.g., a private cloud or one operated by a third-party vendor). A storage device in some cases comprises a disk array or portion thereof.

The illustrated information management system 100 includes one or more client computing device 102 having at least one application 110 executing thereon, and one or more primary storage devices 104 storing primary data 112. The client computing device(s) 102 and the primary storage devices 104 may generally be referred to in some cases as a primary storage subsystem 117. A computing device in an information management system 100 that has a data agent 142 installed and operating on it is generally referred to as a client computing device 102 (or, in the context of a component of the information management system 100 simply as a "client").

Depending on the context, the term "information management system" can refer to generally all of the illustrated hardware and software components. Or, in other instances, the term may refer to only a subset of the illustrated components.

For instance, in some cases, the information management system 100 generally refers to a combination of specialized components used to protect, move, manage, manipulate, analyze, and/or process data and metadata generated by the client computing devices 102. However, the information management system 100 in some cases does not include the underlying components that generate and/or store the primary data 112, such as the client computing devices 102 themselves, the applications 110 and operating system operating on the client computing devices 102, and the primary storage devices 104. As an example, "information management system" may sometimes refer to one or more of the following components and corresponding data structures: storage managers, data agents, and media agents. These components will be described in further detail below.

Client Computing Devices

There are typically a variety of sources in an organization that produce data to be protected and managed. As just one illustrative example, in a corporate environment such data sources can be employee workstations and company servers such as a mail server, a web server, a database server, a transaction server, or the like. In the information management system 100, the data generation sources include the one or more client computing devices 102.

The client computing devices 102 may include any of the types of computing devices described above, without limitation, and in some cases the client computing devices 102 are associated with one or more users and/or corresponding user accounts, of employees or other individuals.

The information management system 100 generally addresses and handles the data management and protection needs for the data generated by the client computing devices 102. However, the use of this term does not imply that the client computing devices 102 cannot be "servers" in other respects. For instance, a particular client computing device 102 may act as a server with respect to other devices, such as other client computing devices 102. As just a few examples, the client computing devices 102 can include mail servers, file servers, database servers, and web servers.

Each client computing device 102 may have one or more applications 110 (e.g., software applications) executing thereon which generate and manipulate the data that is to be protected from loss and managed. The applications 110 generally facilitate the operations of an organization (or multiple affiliated organizations), and can include, without limitation, mail server applications (e.g., Microsoft Exchange Server), file server applications, mail client applications (e.g., Microsoft Exchange Client), database applications (e.g., SQL, Oracle, SAP, Lotus Notes Database), word processing applications (e.g., Microsoft Word), spreadsheet applications, financial applications, presentation applications, graphics and/or video applications, browser applications, mobile applications, entertainment applications, and so on.

The client computing devices 102 can have at least one operating system (e.g., Microsoft Windows, Mac OS X, iOS, IBM z/OS, Linux, other Unix-based operating systems, etc.) installed thereon, which may support or host one or more file systems and other applications 110.

The client computing devices 102 and other components in information management system 100 can be connected to one another via one or more communication pathways 114. For example, a first communication pathway 114 may connect (or communicatively couple) client computing device 102 and secondary storage computing device 106; a second communication pathway 114 may connect storage manager 140 and client computing device 102; and a third communication pathway 114 may connect storage manager 140 and secondary storage computing device 106, etc. (see, e.g., FIG. 1A and FIG. 1C). The communication pathways 114 can include one or more networks or other connection types including one or more of the following, without limitation: the Internet, a wide area network (WAN), a local area network (LAN), a Storage Area Network (SAN), a Fibre Channel connection, a Small Computer System Interface (SCSI) connection, a virtual private network (VPN), a token ring or TCP/IP based network, an intranet network, a point-to-point link, a cellular network, a wireless data transmission system, a two-way cable system, an interactive kiosk network, a satellite network, a broadband network, a baseband network, a neural network, a mesh network, an ad hoc network, other appropriate wired, wireless, or partially wired/wireless computer or telecommunications networks, combinations of the same or the like. The communication pathways 114 in some cases may also include application programming interfaces (APIs) including, e.g., cloud service provider APIs, virtual machine management APIs, and hosted service provider APIs. The underlying infrastructure of communication paths 114 may be wired and/or wireless, analog and/or digital, or any combination thereof; and the facilities used may be private, public, third-party provided, or any combination thereof, without limitation.

Primary Data and Exemplary Primary Storage Devices

Primary data 112 according to some embodiments is production data or other "live" data generated by the operating system and/or applications 110 operating on a client computing device 102. The primary data 112 is generally stored on the primary storage device(s) 104 and is organized via a file system supported by the client computing device 102. For instance, the client computing device(s) 102 and corresponding applications 110 may create, access, modify, write, delete, and otherwise use primary data 112. In some cases, some or all of the primary data 112 can be stored in cloud storage resources (e.g., primary storage device 104 may be a cloud-based resource).

Primary data 112 is generally in the native format of the source application 110. According to certain aspects, primary data 112 is an initial or first (e.g., created before any other copies or before at least one other copy) stored copy of data generated by the source application 110. Primary data 112 in some cases is created substantially directly from data generated by the corresponding source applications 110.

The primary storage devices 104 storing the primary data 112 may be relatively fast and/or expensive technology (e.g., a disk drive, a hard-disk array, solid state memory, etc.). In addition, primary data 112 may be highly changeable and/or may be intended for relatively short term retention (e.g., hours, days, or weeks).

According to some embodiments, the client computing device 102 can access primary data 112 from the primary storage device 104 by making conventional file system calls via the operating system. Primary data 112 may include structured data (e.g., database files), unstructured data (e.g., documents), and/or semi-structured data. Some specific examples are described below with respect to FIG. 1B.

It can be useful in performing certain tasks to organize the primary data 112 into units of different granularities. In general, primary data 112 can include files, directories, file system volumes, data blocks, extents, or any other hierarchies or organizations of data objects. As used herein, a "data object" can refer to both (1) any file that is currently addressable by a file system or that was previously addressable by the file system (e.g., an archive file) and (2) a subset of such a file (e.g., a data block).

As will be described in further detail, it can also be useful in performing certain functions of the information management system 100 to access and modify metadata within the primary data 112. Metadata generally includes information about data objects or characteristics associated with the data objects. For simplicity herein, it is to be understood that, unless expressly stated otherwise, any reference to primary data 112 generally also includes its associated metadata, but references to the metadata do not include the primary data.

Metadata can include, without limitation, one or more of the following: the data owner (e.g., the client or user that generates the data), the last modified time (e.g., the time of the most recent modification of the data object), a data object name (e.g., a file name), a data object size (e.g., a number of bytes of data), information about the content (e.g., an indication as to the existence of a particular search term), user-supplied tags, to/from information for email (e.g., an email sender, recipient, etc.), creation date, file type (e.g., format or application type), last accessed time, application type (e.g., type of application that generated the data object), location/network (e.g., a current, past or future location of the data object and network pathways to/from the data object), geographic location (e.g., GPS coordinates), frequency of change (e.g., a period in which the data object is modified), business unit (e.g., a group or department that generates, manages or is otherwise associated with the data object), aging information (e.g., a schedule, such as a time period, in which the data object is migrated to secondary or long term storage), boot sectors, partition layouts, file location within a file folder directory structure, user permissions, owners, groups, access control lists [ACLs]), system metadata (e.g., registry information), combinations of the same or other similar information related to the data object.

In addition to metadata generated by or related to file systems and operating systems, some of the applications 110 and/or other components of the information management system 100 maintain indices of metadata for data objects, e.g., metadata associated with individual email messages. Thus, each data object may be associated with corresponding metadata. The use of metadata to perform classification and other functions is described in greater detail below.

Each of the client computing devices 102 are generally associated with and/or in communication with one or more of the primary storage devices 104 storing corresponding primary data 112. A client computing device 102 may be considered to be "associated with" or "in communication with" a primary storage device 104 if it is capable of one or more of: routing and/or storing data (e.g., primary data 112)

to the particular primary storage device 104, coordinating the routing and/or storing of data to the particular primary storage device 104, retrieving data from the particular primary storage device 104, coordinating the retrieval of data from the particular primary storage device 104, and modifying and/or deleting data retrieved from the particular primary storage device 104.

The primary storage devices 104 can include any of the different types of storage devices described above, or some other kind of suitable storage device. The primary storage devices 104 may have relatively fast I/O times and/or are relatively expensive in comparison to the secondary storage devices 108. For example, the information management system 100 may generally regularly access data and metadata stored on primary storage devices 104, whereas data and metadata stored on the secondary storage devices 108 is accessed relatively less frequently.

Primary storage device 104 may be dedicated or shared. In some cases, each primary storage device 104 is dedicated to an associated client computing device 102. For instance, a primary storage device 104 in one embodiment is a local disk drive of a corresponding client computing device 102. In other cases, one or more primary storage devices 104 can be shared by multiple client computing devices 102, e.g., via a network such as in a cloud storage implementation. As one example, a primary storage device 104 can be a disk array shared by a group of client computing devices 102, such as one of the following types of disk arrays: EMC Clariion, EMC Symmetrix, EMC Celerra, Dell EqualLogic, IBM XIV, NetApp FAS, HP EVA, and HP 3PAR.

The information management system 100 may also include hosted services (not shown), which may be hosted in some cases by an entity other than the organization that employs the other components of the information management system 100. For instance, the hosted services may be provided by various online service providers to the organization. Such service providers can provide services including social networking services, hosted email services, or hosted productivity applications or other hosted applications). Hosted services may include software-as-a-service (SaaS), platform-as-a-service (PaaS), application service providers (ASPs), cloud services, or other mechanisms for delivering functionality via a network. As it provides services to users, each hosted service may generate additional data and metadata under management of the information management system 100, e.g., as primary data 112. In some cases, the hosted services may be accessed using one of the applications 110. As an example, a hosted mail service may be accessed via browser running on a client computing device 102. The hosted services may be implemented in a variety of computing environments. In some cases, they are implemented in an environment having a similar arrangement to the information management system 100, where various physical and logical components are distributed over a network.

Secondary Copies and Exemplary Secondary Storage Devices

The primary data 112 stored on the primary storage devices 104 may be compromised in some cases, such as when an employee deliberately or accidentally deletes or overwrites primary data 112 during their normal course of work. Or the primary storage devices 104 can be damaged, lost, or otherwise corrupted. For recovery and/or regulatory compliance purposes, it is therefore useful to generate copies of the primary data 112. Accordingly, the information management system 100 includes one or more secondary storage computing devices 106 and one or more secondary storage devices 108 configured to create and store one or more secondary copies 116 of the primary data 112 and associated metadata. The secondary storage computing devices 106 and the secondary storage devices 108 may sometimes be referred to as a secondary storage subsystem 118.

Creation of secondary copies 116 can help in search and analysis efforts and meet other information management goals, such as: restoring data and/or metadata if an original version (e.g., of primary data 112) is lost (e.g., by deletion, corruption, or disaster); allowing point-in-time recovery; complying with regulatory data retention and electronic discovery (e-discovery) requirements; reducing utilized storage capacity; facilitating organization and search of data; improving user access to data files across multiple computing devices and/or hosted services; and implementing data retention policies.

The client computing devices 102 access or receive primary data 112 and communicate the data, e.g., over one or more communication pathways 114, for storage in the secondary storage device(s) 108.

A secondary copy 116 can comprise a separate stored copy of application data that is derived from one or more earlier-created, stored copies (e.g., derived from primary data 112 or another secondary copy 116). Secondary copies 116 can include point-in-time data, and may be intended for relatively long-term retention (e.g., weeks, months or years), before some or all of the data is moved to other storage or is discarded.

In some cases, a secondary copy 116 is a copy of application data created and stored subsequent to at least one other stored instance (e.g., subsequent to corresponding primary data 112 or to another secondary copy 116), in a different storage device than at least one previous stored copy, and/or remotely from at least one previous stored copy. In some other cases, secondary copies can be stored in the same storage device as primary data 112 and/or other previously stored copies. For example, in one embodiment a disk array capable of performing hardware snapshots stores primary data 112 and creates and stores hardware snapshots of the primary data 112 as secondary copies 116. Secondary copies 116 may be stored in relatively slow and/or low cost storage (e.g., magnetic tape). A secondary copy 116 may be stored in a backup or archive format, or in some other format different than the native source application format or other primary data format.

In some cases, secondary copies 116 are indexed so users can browse and restore at another point in time. After creation of a secondary copy 116 representative of certain primary data 112, a pointer or other location indicia (e.g., a stub) may be placed in primary data 112, or be otherwise associated with primary data 112 to indicate the current location on the secondary storage device(s) 108 of secondary copy 116.

Since an instance of a data object or metadata in primary data 112 may change over time as it is modified by an application 110 (or hosted service or the operating system), the information management system 100 may create and manage multiple secondary copies 116 of a particular data object or metadata, each representing the state of the data object in primary data 112 at a particular point in time. Moreover, since an instance of a data object in primary data 112 may eventually be deleted from the primary storage device 104 and the file system, the information management system 100 may continue to manage point-in-time representations of that data object, even though the instance in primary data 112 no longer exists.

For virtualized computing devices the operating system and other applications 110 of the client computing device(s) 102 may execute within or under the management of virtualization software (e.g., a VMM), and the primary storage device(s) 104 may comprise a virtual disk created on a physical storage device. The information management system 100 may create secondary copies 116 of the files or other data objects in a virtual disk file and/or secondary copies 116 of the entire virtual disk file itself (e.g., of an entire .vmdk file).

Secondary copies 116 may be distinguished from corresponding primary data 112 in a variety of ways, some of which will now be described. First, as discussed, secondary copies 116 can be stored in a different format (e.g., backup, archive, or other non-native format) than primary data 112. For this or other reasons, secondary copies 116 may not be directly useable by the applications 110 of the client computing device 102, e.g., via standard system calls or otherwise without modification, processing, or other intervention by the information management system 100.

Secondary copies 116 are also in some embodiments stored on a secondary storage device 108 that is inaccessible to the applications 110 running on the client computing devices 102 (and/or hosted services). Some secondary copies 116 may be "offline copies," in that they are not readily available (e.g., not mounted to tape or disk). Offline copies can include copies of data that the information management system 100 can access without human intervention (e.g., tapes within an automated tape library, but not yet mounted in a drive), and copies that the information management system 100 can access only with at least some human intervention (e.g., tapes located at an offsite storage site).

The Use of Intermediate Devices For Creating Secondary Copies

Creating secondary copies can be a challenging task. For instance, there can be hundreds or thousands of client computing devices 102 continually generating large volumes of primary data 112 to be protected. Also, there can be significant overhead involved in the creation of secondary copies 116. Moreover, secondary storage devices 108 may be special purpose components, and interacting with them can require specialized intelligence.

In some cases, the client computing devices 102 interact directly with the secondary storage device 108 to create the secondary copies 116. However, in view of the factors described above, this approach can negatively impact the ability of the client computing devices 102 to serve the applications 110 and produce primary data 112. Further, the client computing devices 102 may not be optimized for interaction with the secondary storage devices 108.

Thus, in some embodiments, the information management system 100 includes one or more software and/or hardware components which generally act as intermediaries between the client computing devices 102 and the secondary storage devices 108. In addition to off-loading certain responsibilities from the client computing devices 102, these intermediate components can provide other benefits. For instance, as discussed further below with respect to FIG. 1D, distributing some of the work involved in creating secondary copies 116 can enhance scalability.

The intermediate components can include one or more secondary storage computing devices 106 as shown in FIG. 1A and/or one or more media agents, which can be software modules operating on corresponding secondary storage computing devices 106 (or other appropriate computing devices). Media agents are discussed below (e.g., with respect to FIGS. 1C-1E).

The secondary storage computing device(s) 106 can comprise any of the computing devices described above, without limitation. In some cases, the secondary storage computing device(s) 106 include specialized hardware and/or software componentry for interacting with the secondary storage devices 108.

To create a secondary copy 116 involving the copying of data from the primary storage subsystem 117 to the secondary storage subsystem 118, the client computing device 102 in some embodiments communicates the primary data 112 to be copied (or a processed version thereof) to the designated secondary storage computing device 106, via the communication pathway 114. The secondary storage computing device 106 in turn conveys the received data (or a processed version thereof) to the secondary storage device 108. In some such configurations, the communication pathway 114 between the client computing device 102 and the secondary storage computing device 106 comprises a portion of a LAN, WAN or SAN. In other cases, at least some client computing devices 102 communicate directly with the secondary storage devices 108 (e.g., via Fibre Channel or SCSI connections). In some other cases, one or more secondary copies 116 are created from existing secondary copies, such as in the case of an auxiliary copy operation, described in greater detail below.

Exemplary Primary Data and an Exemplary Secondary Copy

FIG. 1B is a detailed view showing some specific examples of primary data stored on the primary storage device(s) 104 and secondary copy data stored on the secondary storage device(s) 108, with other components in the system removed for the purposes of illustration. Stored on the primary storage device(s) 104 are primary data objects including word processing documents 119A-B, spreadsheets 120, presentation documents 122, video files 124, image files 126, email mailboxes 128 (and corresponding email messages 129A-C), html/xml or other types of markup language files 130, databases 132 and corresponding tables or other data structures 133A-133C).

Some or all primary data objects are associated with corresponding metadata (e.g., "Meta1-11"), which may include file system metadata and/or application specific metadata. Stored on the secondary storage device(s) 108 are secondary copy data objects 134A-C which may include copies of or otherwise represent corresponding primary data objects and metadata.

As shown, the secondary copy data objects 134A-C can individually represent more than one primary data object. For example, secondary copy data object 134A represents three separate primary data objects 133C, 122, and 129C (represented as 133C', 122', and 129C', respectively, and accompanied by the corresponding metadata Meta11, Meta3, and Meta8, respectively). Moreover, as indicated by the prime mark ('), a secondary copy object may store a representation of a primary data object and/or metadata differently than the original format, e.g., in a compressed, encrypted, deduplicated, or other modified format. Likewise, secondary data object 134B represents primary data objects 120, 133B, and 119A as 120', 133B', and 119A', respectively and accompanied by corresponding metadata Meta2, Meta10, and Meta1, respectively. Also, secondary data object 134C represents primary data objects 133A, 119B, and 129A as 133A', 119B', and 129A', respectively, accompanied by corresponding metadata Meta9, Meta5, and Meta6, respectively.

Exemplary Information Management System Architecture

The information management system 100 can incorporate a variety of different hardware and software components, which can in turn be organized with respect to one another in many different configurations, depending on the embodiment. There are critical design choices involved in specifying the functional responsibilities of the components and the role of each component in the information management system 100. For instance, as will be discussed, such design choices can impact performance as well as the adaptability of the information management system 100 to data growth or other changing circumstances.

Figure 1C:
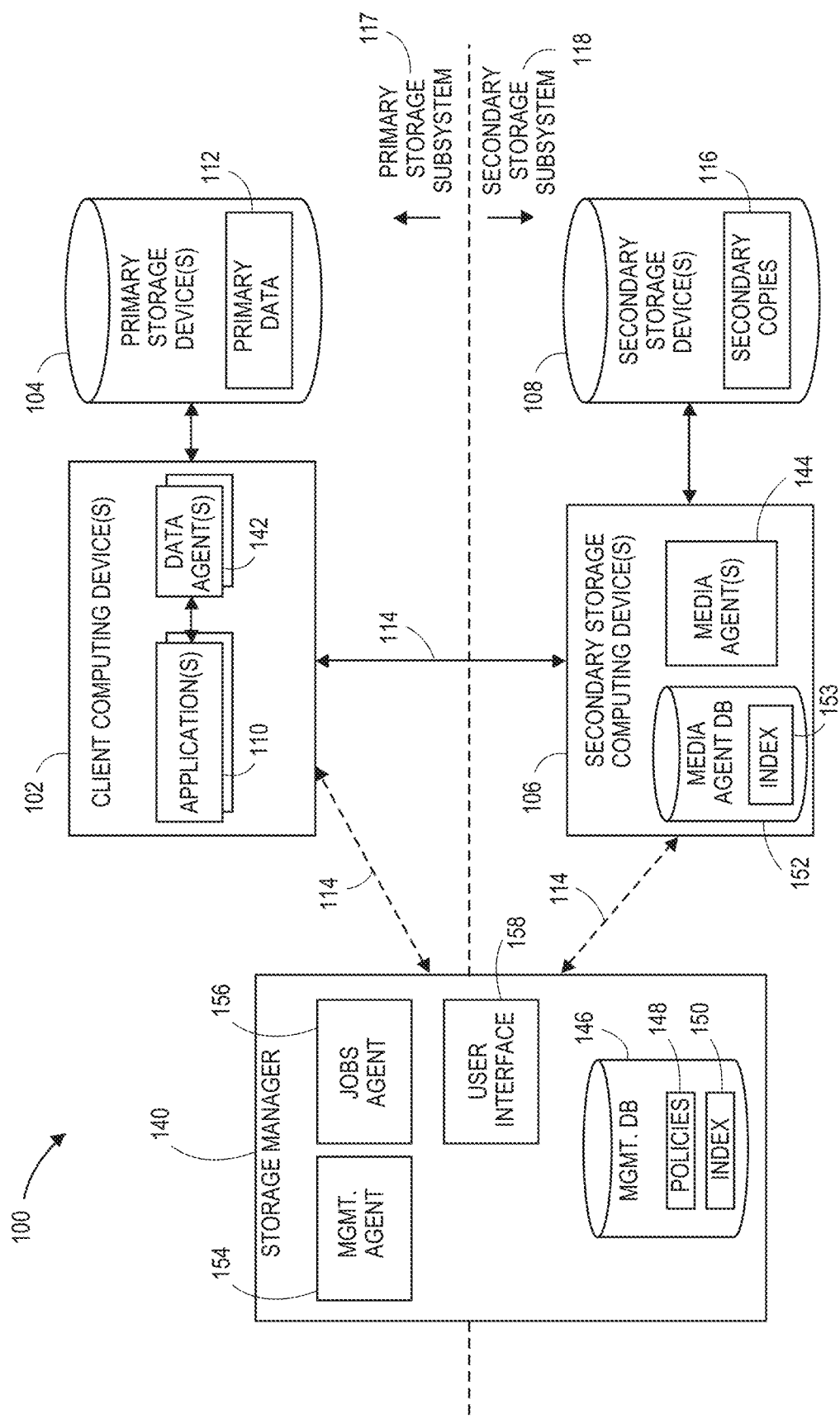
FIG. 1C is a block diagram of an exemplary information management system including a storage manager, one or more data agents, and one or more media agents.

FIG. 1C shows an information management system 100 designed according to these considerations and which includes: storage manager 140, a centralized storage and/or information manager that is configured to perform certain control functions, one or more data agents 142 executing on the client computing device(s) 102 configured to process primary data 112, and one or more media agents 144 executing on the one or more secondary storage computing devices 106 for performing tasks involving the secondary storage devices 108. While distributing functionality amongst multiple computing devices can have certain advantages, in other contexts it can be beneficial to consolidate functionality on the same computing device. As such, in various other embodiments, one or more of the components shown in FIG. 1C as being implemented on separate computing devices are implemented on the same computing device. In one configuration, a storage manager 140, one or more data agents 142, and one or more media agents 144 are all implemented on the same computing device. In another embodiment, one or more data agents 142 and one or more media agents 144 are implemented on the same computing device, while the storage manager 140 is implemented on a separate computing device, etc. without limitation.

Storage Manager

As noted, the number of components in the information management system 100 and the amount of data under management can be quite large. Managing the components and data is therefore a significant task, and a task that can grow in an often unpredictable fashion as the quantity of components and data scale to meet the needs of the organization. For these and other reasons, according to certain embodiments, responsibility for controlling the information management system 100, or at least a significant portion of that responsibility, is allocated to the storage manager 140. By distributing control functionality in this manner, the storage manager 140 can be adapted independently according to changing circumstances. Moreover, a computing device for hosting the storage manager 140 can be selected to best suit the functions of the storage manager 140. These and other advantages are described in further detail below with respect to FIG. 1D.

The storage manager 140 may be a software module or other application, which, in some embodiments operates in conjunction with one or more associated data structures, e.g., a dedicated database (e.g., management database 146). In some embodiments, storage manager 140 is a computing device comprising circuitry for executing computer instructions and performs the functions described herein. The storage manager generally initiates, performs, coordinates and/or controls storage and other information management operations performed by the information management system 100, e.g., to protect and control the primary data 112 and secondary copies 116 of data and metadata. In general, storage manager 100 may be said to manage information management system 100, which includes managing the constituent components, e.g., data agents and media agents, etc.

As shown by the dashed arrowed lines 114 in FIG. 1C, the storage manager 140 may communicate with and/or control some or all elements of the information management system 100, such as the data agents 142 and media agents 144. Thus, in certain embodiments, control information originates from the storage manager 140 and status reporting is transmitted to storage manager 140 by the various managed components, whereas payload data and payload metadata is generally communicated between the data agents 142 and the media agents 144 (or otherwise between the client computing device(s) 102 and the secondary storage computing device(s) 106), e.g., at the direction of and under the management of the storage manager 140. Control information can generally include parameters and instructions for carrying out information management operations, such as, without limitation, instructions to perform a task associated with an operation, timing information specifying when to initiate a task associated with an operation, data path information specifying what components to communicate with or access in carrying out an operation, and the like. Payload data, on the other hand, can include the actual data involved in the storage operation, such as content data written to a secondary storage device 108 in a secondary copy operation. Payload metadata can include any of the types of metadata described herein, and may be written to a storage device along with the payload content data (e.g., in the form of a header).

In other embodiments, some information management operations are controlled by other components in the information management system 100 (e.g., the media agent(s) 144 or data agent(s) 142), instead of or in combination with the storage manager 140.

According to certain embodiments, the storage manager 140 provides one or more of the following functions:
initiating execution of secondary copy operations;
managing secondary storage devices 108 and inventory/capacity of the same;
reporting, searching, and/or classification of data in the information management system 100;
allocating secondary storage devices 108 for secondary storage operations;
monitoring completion of and providing status reporting related to secondary storage operations;
tracking age information relating to secondary copies 116, secondary storage devices 108, and comparing the age information against retention guidelines;
tracking movement of data within the information management system 100;
tracking logical associations between components in the information management system 100;
protecting metadata associated with the information management system 100; and
implementing operations management functionality.

The storage manager 140 may maintain a database 146 (or "storage manager database 146" or "management database 146") of management-related data and information management policies 148. The database 146 may include a management index 150 (or "index 150") or other data structure that stores logical associations between components of the system, user preferences and/or profiles (e.g., preferences regarding encryption, compression, or deduplication of primary or secondary copy data, preferences regarding the scheduling, type, or other aspects of primary or secondary copy or other operations, mappings of particular information management users or user accounts to certain computing devices or other components, etc.), management tasks, media containerization, or other useful data. For example, the storage manager 140 may use the index 150 to track logical associations between media agents 144 and secondary storage devices 108 and/or movement of data from primary storage devices 104 to secondary storage devices 108. For instance, the index 150 may store data associating a client computing device 102 with a particular media agent 144 and/or secondary storage device 108, as specified in an information management policy 148 (e.g., a storage policy, which is defined in more detail below).

Administrators and other people may be able to configure and initiate certain information management operations on an individual basis. But while this may be acceptable for some recovery operations or other relatively less frequent tasks, it is often not workable for implementing on-going organization-wide data protection and management. Thus, the information management system 100 may utilize information management policies 148 for specifying and executing information management operations (e.g., on an automated basis). Generally, an information management policy 148 can include a data structure or other information source that specifies a set of parameters (e.g., criteria and rules) associated with storage or other information management operations.

The storage manager database 146 may maintain the information management policies 148 and associated data, although the information management policies 148 can be stored in any appropriate location. For instance, an information management policy 148 such as a storage policy may be stored as metadata in a media agent database 152 or in a secondary storage device 108 (e.g., as an archive copy) for use in restore operations or other information management operations, depending on the embodiment. Information management policies 148 are described further below.

According to certain embodiments, the storage manager database 146 comprises a relational database (e.g., an SQL database) for tracking metadata, such as metadata associated with secondary copy operations (e.g., what client computing devices 102 and corresponding data were protected). This and other metadata may additionally be stored in other locations, such as at the secondary storage computing devices 106 or on the secondary storage devices 108, allowing data recovery without the use of the storage manager 140 in some cases.

As shown, the storage manager 140 may include a jobs agent 156, a user interface 158, and a management agent 154, all of which may be implemented as interconnected software modules or application programs.

The jobs agent 156 in some embodiments initiates, controls, and/or monitors the status of some or all storage or other information management operations previously performed, currently being performed, or scheduled to be performed by the information management system 100. For instance, the jobs agent 156 may access information management policies 148 to determine when and how to initiate and control secondary copy and other information management operations, as will be discussed further.

The user interface 158 may include information processing and display software, such as a graphical user interface ("GUI"), an application program interface ("API"), or other interactive interface(s) through which users and system processes can retrieve information about the status of information management operations (e.g., storage operations) or issue instructions to the information management system 100 and its constituent components. Via the user interface 158, users may optionally issue instructions to the components in the information management system 100 regarding performance of storage and recovery operations. For example, a user may modify a schedule concerning the number of pending secondary copy operations. As another example, a user may employ the GUI to view the status of pending storage operations or to monitor the status of certain components in the information management system 100 (e.g., the amount of capacity left in a storage device).

An "information management cell" (or "storage operation cell" or "cell") may generally include a logical and/or physical grouping of a combination of hardware and software components associated with performing information management operations on electronic data, typically one storage manager 140 and at least one client computing device 102 (comprising data agent(s) 142) and at least one media agent 144. For instance, the components shown in FIG. 1C may together form an information management cell. Multiple cells may be organized hierarchically. With this configuration, cells may inherit properties from hierarchically superior cells or be controlled by other cells in the hierarchy (automatically or otherwise). Alternatively, in some embodiments, cells may inherit or otherwise be associated with information management policies, preferences, information management metrics, or other properties or characteristics according to their relative position in a hierarchy of cells. Cells may also be delineated and/or organized hierarchically according to function, geography, architectural considerations, or other factors useful or desirable in performing information management operations. A first cell may represent a geographic segment of an enterprise, such as a Chicago office, and a second cell may represent a different geographic segment, such as a New York office. Other cells may represent departments within a particular office. Where delineated by function, a first cell may perform one or more first types of information management operations (e.g., one or more first types of secondary or other copies), and a second cell may perform one or more second types of information management operations (e.g., one or more second types of secondary or other copies).

The storage manager 140 may also track information that permits it to select, designate, or otherwise identify content indices, deduplication databases, or similar databases or resources or data sets within its information management cell (or another cell) to be searched in response to certain queries. Such queries may be entered by the user via interaction with the user interface 158. In general, the management agent 154 allows multiple information management cells to communicate with one another. For example, the information management system 100 in some cases may be one information management cell of a network of multiple cells adjacent to one another or otherwise logically related in a WAN or LAN. With this arrangement, the cells may be connected to one another through respective management agents 154.

For instance, the management agent 154 can provide the storage manager 140 with the ability to communicate with other components within the information management system 100 (and/or other cells within a larger information management system) via network protocols and application programming interfaces ("APIs") including, e.g., HTTP, HTTPS, FTP, REST, virtualization software APIs, cloud service provider APIs, and hosted service provider APIs. Inter-cell communication and hierarchy is described in greater detail in e.g., U.S. Pat. Nos. 7,747,579 and 7,343,453, which are incorporated by reference herein.

Data Agents

As discussed, a variety of different types of applications 110 can operate on a given client computing device 102, including operating systems, database applications, e-mail applications, and virtual machines, just to name a few. And, as part of the process of creating and restoring secondary copies 116, the client computing devices 102 may be tasked with processing and preparing the primary data 112 from these various different applications 110. Moreover, the nature of the processing/preparation can differ across clients and application types, e.g., due to inherent structural and formatting differences among applications 110.

The one or more data agent(s) 142 are therefore advantageously configured in some embodiments to assist in the performance of information management operations based on the type of data that is being protected, at a client-specific and/or application-specific level.

The data agent 142 may be a software module or component that is generally responsible for managing, initiating, or otherwise assisting in the performance of information management operations in information management system 100, generally as directed by storage manager 140. For instance, the data agent 142 may take part in performing data storage operations such as the copying, archiving, migrating, and/or replicating of primary data 112 stored in the primary storage device(s) 104. The data agent 142 may receive control information from the storage manager 140, such as commands to transfer copies of data objects, metadata, and other payload data to the media agents 144.

In some embodiments, a data agent 142 may be distributed between the client computing device 102 and storage manager 140 (and any other intermediate components) or may be deployed from a remote location or its functions approximated by a remote process that performs some or all of the functions of data agent 142. In addition, a data agent 142 may perform some functions provided by a media agent 144, or may perform other functions such as encryption and deduplication.

As indicated, each data agent 142 may be specialized for a particular application 110, and the system can employ multiple application-specific data agents 142, each of which may perform information management operations (e.g., perform backup, migration, and data recovery) associated with a different application 110. For instance, different individual data agents 142 may be designed to handle Microsoft Exchange data, Lotus Notes data, Microsoft Windows file system data, Microsoft Active Directory Objects data, SQL Server data, SharePoint data, Oracle database data, SAP database data, virtual machines and/or associated data, and other types of data.

A file system data agent, for example, may handle data files and/or other file system information. If a client computing device 102 has two or more types of data, a specialized data agent 142 may be used for each data type to copy, archive, migrate, and restore the client computing device 102 data. For example, to backup, migrate, and/or restore all of the data on a Microsoft Exchange server, the client computing device 102 may use a Microsoft Exchange Mailbox data agent 142 to back up the Exchange mailboxes, a Microsoft Exchange Database data agent 142 to back up the Exchange databases, a Microsoft Exchange Public Folder data agent 142 to back up the Exchange Public Folders, and a Microsoft Windows File System data agent 142 to back up the file system of the client computing device 102. In such embodiments, these specialized data agents 142 may be treated as four separate data agents 142 even though they operate on the same client computing device 102.

Other embodiments may employ one or more generic data agents 142 that can handle and process data from two or more different applications 110, or that can handle and process multiple data types, instead of or in addition to using specialized data agents 142. For example, one generic data agent 142 may be used to back up, migrate and restore Microsoft Exchange Mailbox data and Microsoft Exchange Database data while another generic data agent may handle Microsoft Exchange Public Folder data and Microsoft Windows File System data.

Each data agent 142 may be configured to access data and/or metadata stored in the primary storage device(s) 104 associated with the data agent 142 and process the data as appropriate. For example, during a secondary copy operation, the data agent 142 may arrange or assemble the data and metadata into one or more files having a certain format (e.g., a particular backup or archive format) before transferring the file(s) to a media agent 144 or other component. The file(s) may include a list of files or other metadata. Each data agent 142 can also assist in restoring data or metadata to primary storage devices 104 from a secondary copy 116. For instance, the data agent 142 may operate in conjunction with the storage manager 140 and one or more of the media agents 144 to restore data from secondary storage device(s) 108.

Media Agents

As indicated above with respect to FIG. 1A, off-loading certain responsibilities from the client computing devices 102 to intermediate components such as the media agent(s) 144 can provide a number of benefits including improved client computing device 102 operation, faster secondary copy operation performance, and enhanced scalability. In one specific example which will be discussed below in further detail, the media agent 144 can act as a local cache of copied data and/or metadata that it has stored to the secondary storage device(s) 108, providing improved restore capabilities.

Generally speaking, a media agent 144 may be implemented as a software module that manages, coordinates, and facilitates the transmission of data, as directed by the storage manager 140, between a client computing device 102 and one or more secondary storage devices 108. Whereas the storage manager 140 controls the operation of the information management system 100, the media agent 144 generally provides a portal to secondary storage devices 108. For instance, other components in the system interact with the media agents 144 to gain access to data stored on the secondary storage devices 108, whether it be for the purposes of reading, writing, modifying, or deleting data. Moreover, as will be described further, media agents 144 can generate and store information relating to characteristics of the stored data and/or metadata, or can generate and store other types of information that generally provides insight into the contents of the secondary storage devices 108.

Media agents 144 can comprise separate nodes in the information management system 100 (e.g., nodes that are separate from the client computing devices 102, storage manager 140, and/or secondary storage devices 108). In general, a node within the information management system 100 can be a logically and/or physically separate component, and in some cases is a component that is individually addressable or otherwise identifiable. In addition, each media agent 144 may operate on a dedicated secondary storage computing device 106 in some cases, while in other embodiments a plurality of media agents 144 operate on the same secondary storage computing device 106.

A media agent 144 (and corresponding media agent database 152) may be considered to be "associated with" a particular secondary storage device 108 if that media agent 144 is capable of one or more of: routing and/or storing data to the particular secondary storage device 108, coordinating the routing and/or storing of data to the particular secondary storage device 108, retrieving data from the particular secondary storage device 108, coordinating the retrieval of data from a particular secondary storage device 108, and modifying and/or deleting data retrieved from the particular secondary storage device 108.

While media agent(s) 144 are generally associated with one or more secondary storage devices 108, one or more media agents 144 in certain embodiments are physically separate from the secondary storage devices 108. For instance, the media agents 144 may operate on secondary storage computing devices 106 having different housings or packages than the secondary storage devices 108. In one example, a media agent 144 operates on a first server computer and is in communication with a secondary storage device(s) 108 operating in a separate, rack-mounted RAID-based system.

Where the information management system 100 includes multiple media agents 144 (see, e.g., FIG. 1D), a first media agent 144 may provide failover functionality for a second, failed media agent 144. In addition, media agents 144 can be dynamically selected for storage operations to provide load balancing. Failover and load balancing are described in greater detail below.

In operation, a media agent 144 associated with a particular secondary storage device 108 may instruct the secondary storage device 108 to perform an information management operation. For instance, a media agent 144 may instruct a tape library to use a robotic arm or other retrieval means to load or eject a certain storage media, and to subsequently archive, migrate, or retrieve data to or from that media, e.g., for the purpose of restoring the data to a client computing device 102. As another example, a secondary storage device 108 may include an array of hard disk drives or solid state drives organized in a RAID configuration, and the media agent 144 may forward a logical unit number (LUN) and other appropriate information to the array, which uses the received information to execute the desired storage operation. The media agent 144 may communicate with a secondary storage device 108 via a suitable communications link, such as a SCSI or Fiber Channel link.

As shown, each media agent 144 may maintain an associated media agent database 152. The media agent database 152 may be stored in a disk or other storage device (not shown) that is local to the secondary storage computing device 106 on which the media agent 144 operates. In other cases, the media agent database 152 is stored remotely from the secondary storage computing device 106.

The media agent database 152 can include, among other things, an index 153 (see, e.g., FIG. 1C), which comprises information generated during secondary copy operations and other storage or information management operations. The index 153 provides a media agent 144 or other component with a fast and efficient mechanism for locating secondary copies 116 or other data stored in the secondary storage devices 108. In some cases, the index 153 does not form a part of and is instead separate from the media agent database 152.

A media agent index 153 or other data structure associated with the particular media agent 144 may include information about the stored data. For instance, for each secondary copy 116, the index 153 may include metadata such as a list of the data objects (e.g., files/subdirectories, database objects, mailbox objects, etc.), a path to the secondary copy 116 on the corresponding secondary storage device 108, location information indicating where the data objects are stored in the secondary storage device 108, when the data objects were created or modified, etc. Thus, the index 153 includes metadata associated with the secondary copies 116 that is readily available for use without having to be first retrieved from the secondary storage device 108. In yet further embodiments, some or all of the information in index 153 may instead or additionally be stored along with the secondary copies of data in a secondary storage device 108. In some embodiments, the secondary storage devices 108 can include sufficient information to perform a "bare metal restore", where the operating system of a failed client computing device 102 or other restore target is automatically rebuilt as part of a restore operation.

Because the index 153 maintained in the media agent database 152 may operate as a cache, it can also be referred to as "an index cache." In such cases, information stored in the index cache 153 typically comprises data that reflects certain particulars about storage operations that have occurred relatively recently. After some triggering event, such as after a certain period of time elapses, or the index cache 153 reaches a particular size, the index cache 153 may be copied or migrated to a secondary storage device(s) 108. This information may need to be retrieved and uploaded back into the index cache 153 or otherwise restored to a media agent 144 to facilitate retrieval of data from the secondary storage device(s) 108. In some embodiments, the cached information may include format or containerization information related to archives or other files stored on the storage device(s) 108. In this manner, the index cache 153 allows for accelerated restores.

In some alternative embodiments the media agent 144 generally acts as a coordinator or facilitator of storage operations between client computing devices 102 and corresponding secondary storage devices 108, but does not actually write the data to the secondary storage device 108. For instance, the storage manager 140 (or the media agent 144) may instruct a client computing device 102 and secondary storage device 108 to communicate with one another directly. In such a case the client computing device 102 transmits the data directly or via one or more intermediary components to the secondary storage device 108 according to the received instructions, and vice versa. In some such cases, the media agent 144 may still receive, process, and/or maintain metadata related to the storage operations. Moreover, in these embodiments, the payload data can flow through the media agent 144 for the purposes of populating the index cache 153 maintained in the media agent database 152, but not for writing to the secondary storage device 108.

The media agent 144 and/or other components such as the storage manager 140 may in some cases incorporate additional functionality, such as data classification, content indexing, deduplication, encryption, compression, and the like. Further details regarding these and other functions are described below.

Distributed, Scalable Architecture

As described, certain functions of the information management system 100 can be distributed amongst various physical and/or logical components in the system. For instance, one or more of the storage manager 140, data agents 142, and media agents 144 may operate on computing devices that are physically separate from one another. This architecture can provide a number of benefits.

For instance, hardware and software design choices for each distributed component can be targeted to suit its particular function. The secondary computing devices 106 on which the media agents 144 operate can be tailored for interaction with associated secondary storage devices 108 and provide fast index cache operation, among other specific tasks. Similarly, the client computing device(s) 102 can be selected to effectively service the applications 110 thereon, in order to efficiently produce and store primary data 112.

Moreover, in some cases, one or more of the individual components in the information management system 100 can be distributed to multiple, separate computing devices. As one example, for large file systems where the amount of data stored in the management database 146 is relatively large, the database 146 may be migrated to or otherwise reside on a specialized database server (e.g., an SQL server) separate from a server that implements the other functions of the storage manager 140. This distributed configuration can provide added protection because the database 146 can be protected with standard database utilities (e.g., SQL log shipping or database replication) independent from other functions of the storage manager 140. The database 146 can be efficiently replicated to a remote site for use in the event of a disaster or other data loss at the primary site. Or the database 146 can be replicated to another computing device within the same site, such as to a higher performance machine in the event that a storage manager host device can no longer service the needs of a growing information management system 100.

Figure 1D:
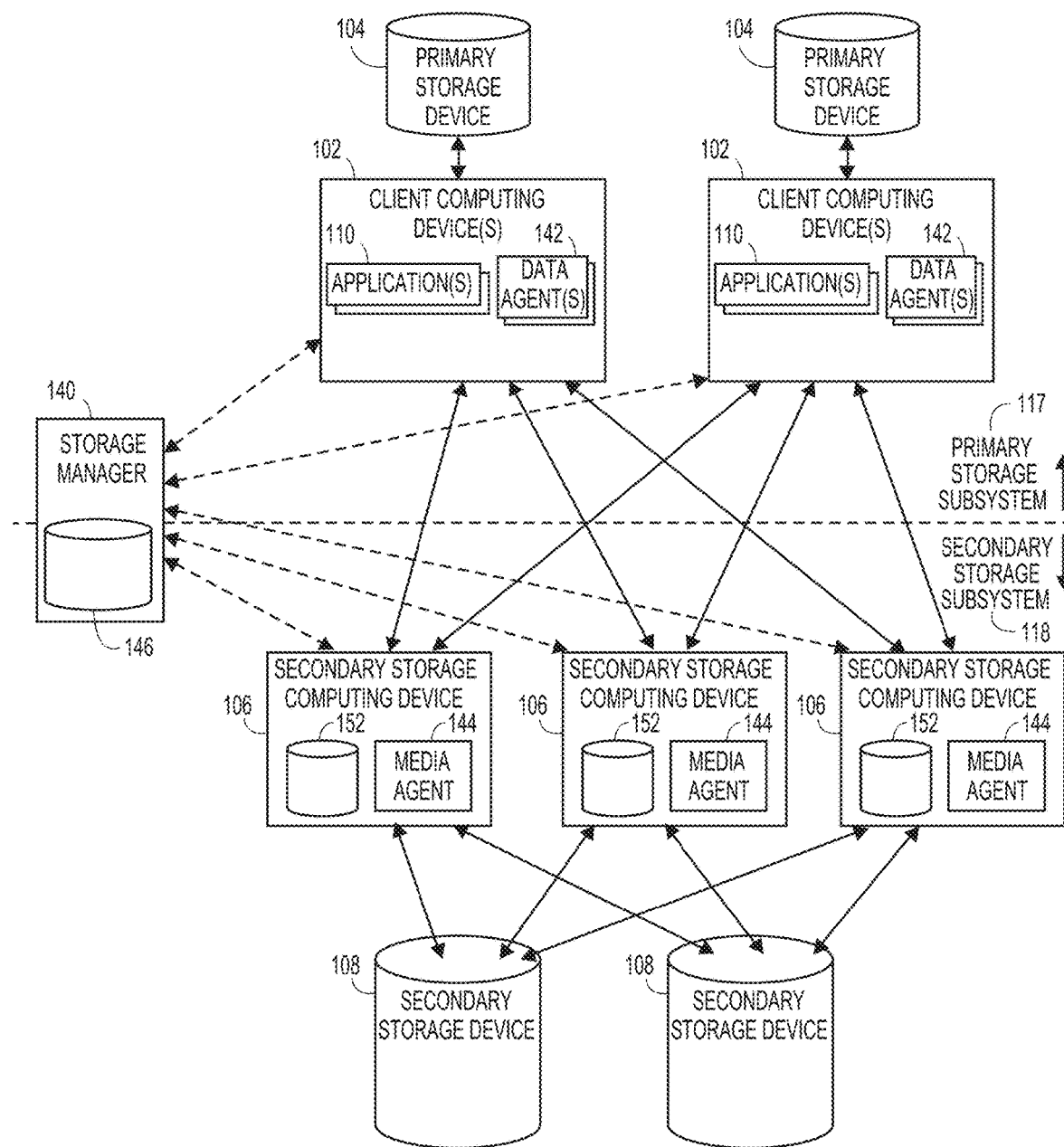
FIG. 1D is a block diagram illustrating a scalable information management system.

The distributed architecture also provides both scalability and efficient component utilization. FIG. 1D shows an embodiment of the information management system 100 including a plurality of client computing devices 102 and associated data agents 142 as well as a plurality of secondary storage computing devices 106 and associated media agents 144.

Additional components can be added or subtracted based on the evolving needs of the information management system 100. For instance, depending on where bottlenecks are identified, administrators can add additional client computing devices 102, secondary storage computing devices 106 (and corresponding media agents 144), and/or secondary storage devices 108. Moreover, where multiple fungible components are available, load balancing can be implemented to dynamically address identified bottlenecks. As an example, the storage manager 140 may dynamically select which media agents 144 and/or secondary storage devices 108 to use for storage operations based on a processing load analysis of the media agents 144 and/or secondary storage devices 108, respectively.

Moreover, each client computing device 102 in some embodiments can communicate with, among other components, any of the media agents 144, e.g., as directed by the storage manager 140. And each media agent 144 may be able to communicate with, among other components, any of the secondary storage devices 108, e.g., as directed by the storage manager 140. Thus, operations can be routed to the secondary storage devices 108 in a dynamic and highly flexible manner, to provide load balancing, failover, and the like. Further examples of scalable systems capable of dynamic storage operations, and of systems capable of performing load balancing and fail over are provided in U.S. Pat. No. 7,246,207, which is incorporated by reference herein.

In alternative configurations, certain components are not distributed and may instead reside and execute on the same computing device. For example, in some embodiments, one or more data agents 142 and the storage manager 140 operate on the same client computing device 102. In another embodiment, one or more data agents 142 and one or more media agents 144 operate on a single computing device.

Exemplary Types of Information Management Operations

In order to protect and leverage stored data, the information management system 100 can be configured to perform a variety of information management operations. As will be described, these operations can generally include secondary copy and other data movement operations, processing and data manipulation operations, analysis, reporting, and management operations. The operations described herein may be performed on any type of computing device, e.g., between two computers connected via a LAN, to a mobile client telecommunications device connected to a server via a WLAN, to any manner of client computing device coupled to a cloud storage target, etc., without limitation.

Data Movement Operations

Data movement operations according to certain embodiments are generally operations that involve the copying or migration of data (e.g., payload data) between different locations in the information management system 100 in an original/native and/or one or more different formats. For example, data movement operations can include operations in which stored data is copied, migrated, or otherwise transferred from one or more first storage devices to one or more second storage devices, such as from primary storage device(s) 104 to secondary storage device(s) 108, from secondary storage device(s) 108 to different secondary storage device(s) 108, from secondary storage devices 108 to primary storage devices 104, or from primary storage device(s) 104 to different primary storage device(s) 104.

Data movement operations can include by way of example, backup operations, archive operations, information lifecycle management operations such as hierarchical storage management operations, replication operations (e.g., continuous data replication operations), snapshot operations, deduplication or single-instancing operations, auxiliary copy operations, and the like. As will be discussed, some of these operations involve the copying, migration or other movement of data, without actually creating multiple, distinct copies. Nonetheless, some or all of these operations are referred to as "copy" operations for simplicity.

Backup Operations

A backup operation creates a copy of a version of data (e.g., one or more files or other data units) in primary data 112 at a particular point in time. Each subsequent backup copy may be maintained independently of the first. Further, a backup copy in some embodiments is generally stored in a form that is different than the native format, e.g., a backup format. This can be in contrast to the version in primary data 112 from which the backup copy is derived, and which may instead be stored in a native format of the source application(s) 110. In various cases, backup copies can be stored in a format in which the data is compressed, encrypted, deduplicated, and/or otherwise modified from the original application format. For example, a backup copy may be stored in a backup format that facilitates compression and/or efficient long-term storage.

Backup copies can have relatively long retention periods as compared to primary data 112, and may be stored on media with slower retrieval times than primary data 112 and certain other types of secondary copies 116. On the other hand, backups may have relatively shorter retention periods than some other types of secondary copies 116, such as archive copies (described below). Backups may sometimes be stored at an offsite location.

Backup operations can include full backups, differential backups, incremental backups, "synthetic full" backups, and/or creating a "reference copy." A full backup (or "standard full backup") in some embodiments is generally a complete image of the data to be protected. However, because full backup copies can consume a relatively large amount of storage, it can be useful to use a full backup copy as a baseline and only store changes relative to the full backup copy for subsequent backup copies.

For instance, a differential backup operation (or cumulative incremental backup operation) tracks and stores changes that have occurred since the last full backup. Differential backups can grow quickly in size, but can provide relatively efficient restore times because a restore can be completed in some cases using only the full backup copy and the latest differential copy.

An incremental backup operation generally tracks and stores changes since the most recent backup copy of any type, which can greatly reduce storage utilization. In some cases, however, restore times can be relatively long in comparison to full or differential backups because completing a restore operation may involve accessing a full backup in addition to multiple incremental backups.

Synthetic full backups generally consolidate data without directly backing up data from the client computing device. A synthetic full backup is created from the most recent full backup (i.e., standard or synthetic) and subsequent incremental and/or differential backups. The resulting synthetic full backup is identical to what would have been created had the last backup for the subclient been a standard full backup. Unlike standard full, incremental, and differential backups, a synthetic full backup does not actually transfer data from a client computer to the backup media, because it operates as a backup consolidator. A synthetic full backup extracts the index data of each participating subclient. Using this index data and the previously backed up user data images, it builds new full backup images, one for each subclient. The new backup images consolidate the index and user data stored in the related incremental, differential, and previous full backups, in some embodiments creating an archive file at the subclient level.

Any of the above types of backup operations can be at the volume-level, file-level, or block-level. Volume level backup operations generally involve the copying of a data volume (e.g., a logical disk or partition) as a whole. In a file-level backup, the information management system 100 may generally track changes to individual files, and includes copies of files in the backup copy. In the case of a block-level backup, files are broken into constituent blocks, and changes are tracked at the block-level. Upon restore, the information management system 100 reassembles the blocks into files in a transparent fashion.

Far less data may actually be transferred and copied to the secondary storage devices 108 during a file-level copy than a volume-level copy. Likewise, a block-level copy may involve the transfer of less data than a file-level copy, resulting in faster execution times. However, restoring a relatively higher-granularity copy can result in longer restore times. For instance, when restoring a block-level copy, the process of locating constituent blocks can sometimes result in longer restore times as compared to file-level backups. Similar to backup operations, the other types of secondary copy operations described herein can also be implemented at either the volume-level, file-level, or block-level.

For example, in some embodiments, a reference copy may comprise copy(ies) of selected objects from backed up data, typically to help organize data by keeping contextual information from multiple sources together, and/or help retain specific data for a longer period of time, such as for legal hold needs. A reference copy generally maintains data integrity, and when the data is restored, it may be viewed in the same format as the source data. In some embodiments, a reference copy is based on a specialized client, individual subclient and associated information management policies (e.g., storage policy, retention policy, etc.) that are administered within information management system 100.

Archive Operations

Because backup operations generally involve maintaining a version of the copied data in primary data 112 and also maintaining backup copies in secondary storage device(s) 108, they can consume significant storage capacity. To help reduce storage consumption, an archive operation according to certain embodiments creates a secondary copy 116 by both copying and removing source data. Or, seen another way, archive operations can involve moving some or all of the source data to the archive destination. Thus, data satisfying criteria for removal (e.g., data of a threshold age or size) may be removed from source storage. The source data may be primary data 112 or a secondary copy 116, depending on the situation. As with backup copies, archive copies can be stored in a format in which the data is compressed, encrypted, deduplicated, and/or otherwise modified from the format of the original application or source copy. In addition, archive copies may be retained for relatively long periods of time (e.g., years) and, in some cases, are never deleted. Archive copies are generally retained for longer periods of time than backup copies, for example. In certain embodiments, archive copies may be made and kept for extended periods in order to meet compliance regulations.

Moreover, when primary data 112 is archived, in some cases the corresponding primary data 112 or a portion thereof is deleted when creating the archive copy. Thus, archiving can serve the purpose of freeing up space in the primary storage device(s) 104 and easing the demand on computational resources on client computing device 102. Similarly, when a secondary copy 116 is archived, the secondary copy 116 may be deleted, and an archive copy can therefore serve the purpose of freeing up space in secondary storage device(s) 108. In contrast, source copies often remain intact when creating backup copies. Examples of compatible data archiving operations are provided in U.S. Pat. No. 7,107,298, which is incorporated by reference herein.

Snapshot Operations

Snapshot operations can provide a relatively lightweight, efficient mechanism for protecting data. From an end-user viewpoint, a snapshot may be thought of as an "instant" image of the primary data 112 at a given point in time, and may include state and/or status information relative to an application that creates/manages the primary data 112. In one embodiment, a snapshot may generally capture the directory structure of an object in primary data 112 such as a file or volume or other data set at a particular moment in time and may also preserve file attributes and contents. A snapshot in some cases is created relatively quickly, e.g., substantially instantly, using a minimum amount of file space, but may still function as a conventional file system backup.

A "hardware snapshot" (or "hardware-based snapshot") operation can be a snapshot operation where a target storage device (e.g., a primary storage device 104 or a secondary storage device 108) performs the snapshot operation in a self-contained fashion, substantially independently, using hardware, firmware and/or software operating on the storage device itself. For instance, the storage device may be capable of performing snapshot operations upon request, generally without intervention or oversight from any of the other components in the information management system 100. In this manner, hardware snapshots can off-load other components of information management system 100 from processing involved in snapshot creation and management.

A "software snapshot" (or "software-based snapshot") operation, on the other hand, can be a snapshot operation in which one or more other components in information management system 100 (e.g., client computing devices 102, data agents 142, etc.) implement a software layer that manages the snapshot operation via interaction with the target storage device. For instance, the component executing the snapshot management software layer may derive a set of pointers and/or data that represents the snapshot. The snapshot management software layer may then transmit the same to the target storage device, along with appropriate instructions for writing the snapshot. One example of a software snapshot product may be Microsoft Volume Snapshot Service or "VSS," which may be part of Microsoft Windows® operating system.

Some types of snapshots do not actually create another physical copy of all the data as it existed at the particular point in time, but may simply create pointers that are able to map files and directories to specific memory locations (e.g., to specific disk blocks) where the data resides, as it existed at the particular point in time. For example, a snapshot copy may include a set of pointers derived from the file system or from an application. In some other cases, the snapshot may be created at the block-level, such that creation of the snapshot occurs without awareness of the file system. Each pointer points to a respective stored data block, so that collectively, the set of pointers reflect the storage location and state of the data object (e.g., file(s) or volume(s) or data set(s)) at a particular point in time when the snapshot copy was created.

An initial snapshot may use only a small amount of disk space needed to record a mapping or other data structure representing or otherwise tracking the blocks that correspond to the current state of the file system. Additional disk space is usually required only when files and directories are modified later on. Furthermore, when files are modified, typically only the pointers which map to blocks are copied, not the blocks themselves. In some embodiments, for example in the case of "copy-on-write" snapshots, when a block changes in primary storage, the block is copied to secondary storage or cached in primary storage before the block is overwritten in primary storage, and the pointer to that block is changed to reflect the new location of that block. The snapshot mapping of file system data may also be updated to reflect the changed block(s) at that particular point in time. In some other cases, a snapshot includes a full physical copy of all or substantially all of the data represented by the snapshot. Further examples of snapshot operations are provided in U.S. Pat. No. 7,529,782, which is incorporated by reference herein.

A snapshot copy in many cases can be made quickly and without significantly impacting primary computing resources because large amounts of data need not be copied or moved. In some embodiments, a snapshot may exist as a virtual file system, parallel to the actual file system. Users in some cases gain read-only access to the record of files and directories of the snapshot. By electing to restore primary data 112 from a snapshot taken at a given point in time, users may also return the current file system to the state of the file system that existed when the snapshot was taken.

Replication Operations

Another type of secondary copy operation is a replication operation. Some types of secondary copies 116 are used to periodically capture images of primary data 112 at particular points in time (e.g., backups, archives, and snapshots). However, it can also be useful for recovery purposes to protect primary data 112 in a more continuous fashion, by replicating the primary data 112 substantially as changes occur. In some cases a replication copy can be a mirror copy, for instance, where changes made to primary data 112 are mirrored or substantially immediately copied to another location (e.g., to secondary storage device(s) 108). By copying each write operation to the replication copy, two storage systems are kept synchronized or substantially synchronized so that they are virtually identical at approximately the same time. Where entire disk volumes are mirrored, however, mirroring can require significant amount of storage space and utilizes a large amount of processing resources.

According to some embodiments storage operations are performed on replicated data that represents a recoverable state, or "known good state" of a particular application running on the source system. For instance, in certain embodiments, known good replication copies may be viewed as copies of primary data 112. This feature allows the system to directly access, copy, restore, backup or otherwise manipulate the replication copies as if the data were the "live" primary data 112. This can reduce access time, storage utilization, and impact on source applications 110, among other benefits. Based on known good state information, the information management system 100 can replicate sections of application data that represent a recoverable state rather than rote copying of blocks of data. Examples of compatible replication operations (e.g., continuous data replication) are provided in U.S. Pat. No. 7,617,262, which is incorporated by reference herein.

Deduplication/Single-Instancing Operations

Another type of data movement operation is deduplication or single-instance storage, which is useful to reduce the amount of non-primary data. For instance, some or all of the above-described secondary storage operations can involve deduplication in some fashion. New data is read, broken down into portions (e.g., sub-file level blocks, files, etc.) of a selected granularity, compared with blocks that are already in secondary storage, and only the new blocks are stored. Blocks that already exist are represented as pointers to the already stored data.

In order to streamline the comparison process, the information management system 100 may calculate and/or store signatures (e.g., hashes or cryptographically unique IDs) corresponding to the individual data blocks in a database and compare the signatures instead of comparing entire data blocks. In some cases, only a single instance of each element is stored, and deduplication operations may therefore be referred to interchangeably as "single-instancing" operations. Depending on the implementation, however, deduplication or single-instancing operations can store more than one instance of certain data blocks, but nonetheless significantly reduce data redundancy. Depending on the embodiment, deduplication blocks can be of fixed or variable length. Using variable length blocks can provide enhanced deduplication by responding to changes in the data stream, but can involve complex processing. In some cases, the information management system 100 utilizes a technique for dynamically aligning deduplication blocks (e.g., fixed-length blocks) based on changing content in the data stream, as described in U.S. Pat. No. 8,364,652, which is incorporated by reference herein.

The information management system 100 can perform deduplication in a variety of manners at a variety of locations in the information management system 100. For instance, in some embodiments, the information management system 100 implements "target-side" deduplication by deduplicating data (e.g., secondary copies 116) stored in the secondary storage devices 108. In some such cases, the media agents 144 are generally configured to manage the deduplication process. For instance, one or more of the media agents 144 maintain a corresponding deduplication database that stores deduplication information (e.g., datablock signatures). Examples of such a configuration are provided in U.S. Pat. Pub. No. 2012/0150826, which is incorporated by reference herein. Instead of or in combination with "target-side" deduplication, deduplication can also be performed on the "source-side" (or "client-side"), e.g., to reduce the amount of traffic between the media agents 144 and the client computing device(s) 102 and/or reduce redundant data stored in the primary storage devices 104. According to various implementations, one or more of the storage devices of the target-side and/or source-side of an operation can be cloud-based storage devices. Thus, the target-side and/or source-side deduplication can be cloud-based deduplication. In particular, as discussed previously, the storage manager 140 may communicate with other components within the information management system 100 via network protocols and cloud service provider APIs to facilitate cloud-based deduplication/single instancing. Examples of such deduplication techniques are provided in U.S. Pat. Pub. No. 2012/0150818, which is incorporated by reference herein. Some other compatible deduplication/single instancing techniques are described in U.S. Pat. Pub. Nos. 2006/0224846 and 2009/0319534, which are incorporated by reference herein.

Information Lifecycle Management and Hierarchical Storage Management Operations

In some embodiments, files and other data over their lifetime move from more expensive, quick access storage to less expensive, slower access storage. Operations associated with moving data through various tiers of storage are sometimes referred to as information lifecycle management (ILM) operations.

One type of ILM operation is a hierarchical storage management (HSM) operation. A HSM operation is generally an operation for automatically moving data between classes of storage devices, such as between high-cost and low-cost storage devices. For instance, an HSM operation may involve movement of data from primary storage devices 104 to secondary storage devices 108, or between tiers of secondary storage devices 108. With each tier, the storage devices may be progressively relatively cheaper, have relatively slower access/restore times, etc. For example, movement of data between tiers may occur as data becomes less important over time.

In some embodiments, an HSM operation is similar to an archive operation in that creating an HSM copy may (though not always) involve deleting some of the source data, e.g., according to one or more criteria related to the source data. For example, an HSM copy may include data from primary data 112 or a secondary copy 116 that is larger than a given size threshold or older than a given age threshold and that is stored in a backup format.

Often, and unlike some types of archive copies, HSM data that is removed or aged from the source is replaced by a logical reference pointer or stub. The reference pointer or stub can be stored in the primary storage device 104 (or other source storage device, such as a secondary storage device 108) to replace the deleted source data and to point to or otherwise indicate the new location in a secondary storage device 108.

According to one example, files are generally moved between higher and lower cost storage depending on how often the files are accessed. When a user requests access to the HSM data that has been removed or migrated, the information management system 100 uses the stub to locate the data and may make recovery of the data appear transparent, even though the HSM data may be stored at a location different from other source data. In this manner, the data appears to the user (e.g., in file system browsing windows and the like) as if it still resides in the source location (e.g., in a primary storage device 104). The stub may also include some metadata associated with the corresponding data, so that a file system and/or application can provide some information about the data object and/or a limited-functionality version (e.g., a preview) of the data object.

An HSM copy may be stored in a format other than the native application format (e.g., where the data is compressed, encrypted, deduplicated, and/or otherwise modified from the original native application format). In some cases, copies which involve the removal of data from source storage and the maintenance of stub or other logical reference information on source storage may be referred to generally as "on-line archive copies". On the other hand, copies which involve the removal of data from source storage without the maintenance of stub or other logical reference information on source storage may be referred to as "off-line archive copies". Examples of HSM and ILM techniques are provided in U.S. Pat. No. 7,343,453, which is incorporated by reference herein.

Auxiliary Copy and Disaster Recovery Operations

An auxiliary copy is generally a copy operation in which a copy is created of an existing secondary copy 116. For instance, an initial secondary copy 116 may be generated using or otherwise be derived from primary data 112 (or other data residing in the secondary storage subsystem 118), whereas an auxiliary copy is generated from the initial secondary copy 116. Auxiliary copies can be used to create additional standby copies of data and may reside on different secondary storage devices 108 than the initial secondary copies 116. Thus, auxiliary copies can be used for recovery purposes if initial secondary copies 116 become unavailable. Exemplary compatible auxiliary copy techniques are described in further detail in U.S. Pat. No. 8,230,195, which is incorporated by reference herein.

The information management system 100 may also perform disaster recovery operations that make or retain disaster recovery copies, often as secondary, high-availability disk copies. The information management system 100 may create secondary disk copies and store the copies at disaster recovery locations using auxiliary copy or replication operations, such as continuous data replication technologies. Depending on the particular data protection goals, disaster recovery locations can be remote from the client computing devices 102 and primary storage devices 104, remote from some or all of the secondary storage devices 108, or both.

Data Analysis, Reporting, and Management Operations

Data analysis, reporting, and management operations can be different than data movement operations in that they do not necessarily involve the copying, migration or other transfer of data (e.g., primary data 112 or secondary copies 116) between different locations in the system. For instance, data analysis operations may involve processing (e.g., offline processing) or modification of already stored primary data 112 and/or secondary copies 116. However, in some embodiments data analysis operations are performed in conjunction with data movement operations. Some data analysis operations include content indexing operations and classification operations which can be useful in leveraging the data under management to provide enhanced search and other features. Other data analysis operations such as compression and encryption can provide data reduction and security benefits, respectively.

Classification Operations/Content Indexing

In some embodiments, the information management system 100 analyzes and indexes characteristics, content, and metadata associated with the primary data 112 and/or secondary copies 116. The content indexing can be used to identify files or other data objects having pre-defined content (e.g., user-defined keywords or phrases, other keywords/phrases that are not defined by a user, etc.), and/or metadata (e.g., email metadata such as "to", "from", "cc", "bcc", attachment name, received time, etc.).

The information management system 100 generally organizes and catalogues the results in a content index, which may be stored within the media agent database 152, for example. The content index can also include the storage locations of (or pointer references to) the indexed data in the primary data 112 or secondary copies 116, as appropriate. The results may also be stored, in the form of a content index database or otherwise, elsewhere in the information management system 100 (e.g., in the primary storage devices 104, or in the secondary storage device 108). Such index data provides the storage manager 140 or another component with an efficient mechanism for locating primary data 112 and/or secondary copies 116 of data objects that match particular criteria.

For instance, search criteria can be specified by a user through user interface 158 of the storage manager 140. In some cases, the information management system 100 analyzes data and/or metadata in secondary copies 116 to create an "off-line" content index, without significantly impacting the performance of the client computing devices 102. Depending on the embodiment, the system can also implement "on-line" content indexing, e.g., of primary data 112. Examples of compatible content indexing techniques are provided in U.S. Pat. No. 8,170,995, which is incorporated by reference herein.

One or more components can be configured to scan data and/or associated metadata for classification purposes to populate a database (or other data structure) of information, which can be referred to as a "data classification database" or a "metabase". Depending on the embodiment, the data classification database(s) can be organized in a variety of different ways, including centralization, logical sub-divisions, and/or physical sub-divisions. For instance, one or more centralized data classification databases may be associated with different subsystems or tiers within the information management system 100. As an example, there may be a first centralized metabase associated with the primary storage subsystem 117 and a second centralized metabase associated with the secondary storage subsystem 118. In other cases, there may be one or more metabases associated with individual components, e.g., client computing devices 102 and/or media agents 144. In some embodiments, a data classification database (metabase) may reside as one or more data structures within management database 146, or may be otherwise associated with storage manager 140.

In some cases, the metabase(s) may be included in separate database(s) and/or on separate storage device(s) from primary data 112 and/or secondary copies 116, such that operations related to the metabase do not significantly impact performance on other components in the information management system 100. In other cases, the metabase(s) may be stored along with primary data 112 and/or secondary copies 116. Files or other data objects can be associated with identifiers (e.g., tag entries, etc.) in the media agent 144 (or other indices) to facilitate searches of stored data objects. Among a number of other benefits, the metabase can also allow efficient, automatic identification of files or other data objects to associate with secondary copy or other information management operations (e.g., in lieu of scanning an entire file system). Examples of compatible metabases and data classification operations are provided in U.S. Pat. Nos. 8,229,954 and 7,747,579, which are incorporated by reference herein.

Encryption Operations

The information management system 100 in some cases is configured to process data (e.g., files or other data objects, secondary copies 116, etc.), according to an appropriate encryption algorithm (e.g., Blowfish, Advanced Encryption Standard [AES], Triple Data Encryption Standard [3-DES], etc.) to limit data access and provide data security in the information management system 100. The information management system 100 in some cases encrypts the data at the client level, such that the client computing devices 102 (e.g., the data agents 142) encrypt the data prior to forwarding the data to other components, e.g., before sending the data to media agents 144 during a secondary copy operation. In such cases, the client computing device 102 may maintain or have access to an encryption key or passphrase for decrypting the data upon restore. Encryption can also occur when creating copies of secondary copies, e.g., when creating auxiliary copies or archive copies. In yet further embodiments, the secondary storage devices 108 can implement built-in, high performance hardware encryption.

Management and Reporting Operations

Certain embodiments leverage the integrated, ubiquitous nature of the information management system 100 to provide useful system-wide management and reporting functions. Examples of some compatible management and reporting techniques are provided in U.S. Pat. No. 7,343, 453, which is incorporated by reference herein.

Operations management can generally include monitoring and managing the health and performance of information management system 100 by, without limitation, performing error tracking, generating granular storage/performance metrics (e.g., job success/failure information, deduplication efficiency, etc.), generating storage modeling and costing information, and the like. As an example, a storage manager 140 or other component in the information management system 100 may analyze traffic patterns and suggest and/or automatically route data via a particular route to minimize congestion. In some embodiments, the system can generate predictions relating to storage operations or storage operation information. Such predictions, which may be based on a trending analysis, may predict various network operations or resource usage, such as network traffic levels, storage media use, use of bandwidth of communication links, use of media agent components, etc. Further examples of traffic analysis, trend analysis, prediction generation, and the like are described in U.S. Pat. No. 7,343,453, which is incorporated by reference herein.

In some configurations, a master storage manager 140 may track the status of storage operation cells in a hierarchy, such as the status of jobs, system components, system resources, and other items, by communicating with storage managers 140 (or other components) in the respective storage operation cells. Moreover, the master storage manager 140 may track the status of its associated storage operation cells and information management operations by receiving periodic status updates from the storage managers 140 (or other components) in the respective cells regarding jobs, system components, system resources, and other items. In some embodiments, a master storage manager 140 may store status information and other information regarding its associated storage operation cells and other system information in its index 150 (or other location).

The master storage manager 140 or other component may also determine whether certain storage-related criteria or other criteria are satisfied, and perform an action or trigger event (e.g., data migration) in response to the criteria being satisfied, such as where a storage threshold is met for a particular volume, or where inadequate protection exists for certain data. For instance, in some embodiments, data from one or more storage operation cells is used to dynamically and automatically mitigate recognized risks, and/or to advise users of risks or suggest actions to mitigate these risks. For example, an information management policy may specify certain requirements (e.g., that a storage device should maintain a certain amount of free space, that secondary copies should occur at a particular interval, that data should be aged and migrated to other storage after a particular period, that data on a secondary volume should always have a certain level of availability and be restorable within a given time period, that data on a secondary volume may be mirrored or otherwise migrated to a specified number of other volumes, etc.). If a risk condition or other criterion is triggered, the system may notify the user of these conditions and may suggest (or automatically implement) an action to mitigate or otherwise address the risk. For example, the system may indicate that data from a primary copy 112 should be migrated to a secondary storage device 108 to free space on the primary storage device 104. Examples of the use of risk factors and other triggering criteria are described in U.S. Pat. No. 7,343,453, which is incorporated by reference herein.

In some embodiments, the system 100 may also determine whether a metric or other indication satisfies particular storage criteria and, if so, perform an action. For example, as previously described, a storage policy or other definition might indicate that a storage manager 140 should initiate a particular action if a storage metric or other indication drops below or otherwise fails to satisfy specified criteria such as a threshold of data protection. Examples of such metrics are described in U.S. Pat. No. 7,343,453, which is incorporated by reference herein.

In some embodiments, risk factors may be quantified into certain measurable service or risk levels for ease of comprehension. For example, certain applications and associated data may be considered to be more important by an enterprise than other data and services. Financial compliance data, for example, may be of greater importance than marketing materials, etc. Network administrators may assign priority values or "weights" to certain data and/or applications, corresponding to the relative importance. The level of compliance of storage operations specified for these applications may also be assigned a certain value. Thus, the health, impact, and overall importance of a service may be determined, such as by measuring the compliance value and calculating the product of the priority value and the compliance value to determine the "service level" and comparing it to certain operational thresholds to determine whether it is acceptable. Further examples of the service level determination are provided in U.S. Pat. No. 7,343,453, which is incorporated by reference herein.

The system 100 may additionally calculate data costing and data availability associated with information management operation cells according to an embodiment of the invention. For instance, data received from the cell may be used in conjunction with hardware-related information and other information about system elements to determine the cost of storage and/or the availability of particular data in the system. Exemplary information generated could include how fast a particular department is using up available storage space, how long data would take to recover over a particular system pathway from a particular secondary storage device, costs over time, etc. Moreover, in some embodiments, such information may be used to determine or predict the overall cost associated with the storage of certain information. The cost associated with hosting a certain application may be based, at least in part, on the type of media on which the data resides, for example. Storage devices may be assigned to a particular cost categories, for example. Further examples of costing techniques are described in U.S. Pat. No. 7,343,453, which is incorporated by reference herein.

Any of the above types of information (e.g., information related to trending, predictions, job, cell or component status, risk, service level, costing, etc.) can generally be provided to users via the user interface 158 in a single, integrated view or console (not shown). The console may support a reporting capability that allows for the generation of a variety of reports, which may be tailored to a particular aspect of information management. Report types may include: scheduling, event management, media management and data aging. Available reports may also include backup history, data aging history, auxiliary copy history, job history, library and drive, media in library, restore history, and storage policy, etc., without limitation. Such reports may be specified and created at a certain point in time as a system analysis, forecasting, or provisioning tool. Integrated reports may also be generated that illustrate storage and performance metrics, risks and storage costing information. Moreover, users may create their own reports based on specific needs.

The integrated user interface 158 can include an option to show a "virtual view" of the system that graphically depicts the various components in the system using appropriate icons. As one example, the user interface 158 may provide a graphical depiction of one or more primary storage devices 104, the secondary storage devices 108, data agents 142 and/or media agents 144, and their relationship to one another in the information management system 100. The operations management functionality can facilitate planning and decision-making. For example, in some embodiments, a user may view the status of some or all jobs as well as the status of each component of the information management system 100. Users may then plan and make decisions based on this data. For instance, a user may view high-level information regarding storage operations for the information management system 100, such as job status, component status, resource status (e.g., communication pathways, etc.), and other information. The user may also drill down or use other means to obtain more detailed information regarding a particular component, job, or the like. Further examples of some reporting techniques and associated interfaces providing an integrated view of an information management system are provided in U.S. Pat. No. 7,343,453, which is incorporated by reference herein.

The information management system 100 can also be configured to perform system-wide e-discovery operations in some embodiments. In general, e-discovery operations provide a unified collection and search capability for data in the system, such as data stored in the secondary storage devices 108 (e.g., backups, archives, or other secondary copies 116). For example, the information management system 100 may construct and maintain a virtual repository for data stored in the information management system 100 that is integrated across source applications 110, different storage device types, etc. According to some embodiments, e-discovery utilizes other techniques described herein, such as data classification and/or content indexing.

Information Management Policies

As indicated previously, an information management policy 148 can include a data structure or other information source that specifies a set of parameters (e.g., criteria and rules) associated with secondary copy and/or other information management operations.

One type of information management policy 148 is a storage policy. According to certain embodiments, a storage policy generally comprises a data structure or other information source that defines (or includes information sufficient to determine) a set of preferences or other criteria for performing information management operations. Storage policies can include one or more of the following items: (1) what data will be associated with the storage policy; (2) a destination to which the data will be stored; (3) datapath information specifying how the data will be communicated to the destination; (4) the type of storage operation to be performed; and (5) retention information specifying how long the data will be retained at the destination (see, e.g., FIG. 1E).

As an illustrative example, data associated with a storage policy can be logically organized into groups. In some cases, these logical groupings can be referred to as "sub-clients". A sub-client may represent static or dynamic associations of portions of a data volume. Sub-clients may represent mutually exclusive portions. Thus, in certain embodiments, a portion of data may be given a label and the association is stored as a static entity in an index, database or other storage location. Sub-clients may also be used as an effective administrative scheme of organizing data according to data type, department within the enterprise, storage preferences, or the like. Depending on the configuration, sub-clients can correspond to files, folders, virtual machines, databases, etc. In one exemplary scenario, an administrator may find it preferable to separate e-mail data from financial data using two different sub-clients.

A storage policy can define where data is stored by specifying a target or destination storage device (or group of storage devices). For instance, where the secondary storage device 108 includes a group of disk libraries, the storage policy may specify a particular disk library for storing the sub-clients associated with the policy. As another example, where the secondary storage devices 108 include one or more tape libraries, the storage policy may specify a particular tape library for storing the sub-clients associated with the storage policy, and may also specify a drive pool and a tape pool defining a group of tape drives and a group of tapes, respectively, for use in storing the sub-client data. While information in the storage policy can be statically assigned in some cases, some or all of the information in the storage policy can also be dynamically determined based on criteria, which can be set forth in the storage policy. For instance, based on such criteria, a particular destination storage device(s) (or other parameter of the storage policy) may be determined based on characteristics associated with the data involved in a particular storage operation, device availability (e.g., availability of a secondary storage device 108 or a media agent 144), network status and conditions (e.g., identified bottlenecks), user credentials, and the like).

Datapath information can also be included in the storage policy. For instance, the storage policy may specify network pathways and components to utilize when moving the data to the destination storage device(s). In some embodiments, the storage policy specifies one or more media agents 144 for conveying data associated with the storage policy between the source (e.g., one or more host client computing devices 102) and destination (e.g., a particular target secondary storage device 108).

A storage policy can also specify the type(s) of operations associated with the storage policy, such as a backup, archive, snapshot, auxiliary copy, or the like. Retention information can specify how long the data will be kept, depending on organizational needs (e.g., a number of days, months, years, etc.)

Another type of information management policy 148 is a scheduling policy, which specifies when and how often to perform operations. Scheduling parameters may specify with what frequency (e.g., hourly, weekly, daily, event-based, etc.) or under what triggering conditions secondary copy or other information management operations will take place. Scheduling policies in some cases are associated with particular components, such as particular logical groupings of data associated with a storage policy (e.g., a sub-client), client computing device 102, and the like. In one configuration, a separate scheduling policy is maintained for particular logical groupings of data on a client computing device 102. The scheduling policy specifies that those logical groupings are to be moved to secondary storage devices 108 every hour according to storage policies associated with the respective sub-clients.

When adding a new client computing device 102, administrators can manually configure information management policies 148 and/or other settings, e.g., via the user interface 158. However, this can be an involved process resulting in delays, and it may be desirable to begin data protection operations quickly, without awaiting human intervention. Thus, in some embodiments, the information management system 100 automatically applies a default configuration to client computing device 102. As one example, when one or more data agent(s) 142 are installed on one or more client computing devices 102, the installation script may register the client computing device 102 with the storage manager 140, which in turn applies the default configuration to the new client computing device 102. In this manner, data protection operations can begin substantially immediately. The default configuration can include a default storage policy, for example, and can specify any appropriate information sufficient to begin data protection operations. This can include a type of data protection operation, scheduling information, a target secondary storage device 108, data path information (e.g., a particular media agent 144), and the like.

Other types of information management policies 148 are possible, including one or more audit (or security) policies. An audit policy is a set of preferences, rules and/or criteria that protect sensitive data in the information management system 100. For example, an audit policy may define "sensitive objects" as files or objects that contain particular keywords (e.g., "confidential," or "privileged") and/or are associated with particular keywords (e.g., in metadata) or particular flags (e.g., in metadata identifying a document or email as personal, confidential, etc.). An audit policy may further specify rules for handling sensitive objects. As an example, an audit policy may require that a reviewer approve the transfer of any sensitive objects to a cloud storage site, and that if approval is denied for a particular sensitive object, the sensitive object should be transferred to a local primary storage device 104 instead. To facilitate this approval, the audit policy may further specify how a secondary storage computing device 106 or other system component should notify a reviewer that a sensitive object is slated for transfer.

Another type of information management policy 148 is a provisioning policy. A provisioning policy can include a set of preferences, priorities, rules, and/or criteria that specify how client computing devices 102 (or groups thereof) may utilize system resources, such as available storage on cloud storage and/or network bandwidth. A provisioning policy specifies, for example, data quotas for particular client computing devices 102 (e.g., a number of gigabytes that can be stored monthly, quarterly or annually). The storage manager 140 or other components may enforce the provisioning policy. For instance, the media agents 144 may enforce the policy when transferring data to secondary storage devices 108. If a client computing device 102 exceeds a quota, a budget for the client computing device 102 (or associated department) is adjusted accordingly or an alert may trigger.

While the above types of information management policies 148 have been described as separate policies, one or more of these can be generally combined into a single information management policy 148. For instance, a storage policy may also include or otherwise be associated with one or more scheduling, audit, or provisioning policies or operational parameters thereof. Moreover, while storage policies are typically associated with moving and storing data, other policies may be associated with other types of information management operations. The following is a non-exhaustive list of items the information management policies 148 may specify:

schedules or other timing information, e.g., specifying when and/or how often to perform information management operations;

the type of copy 116 (e.g., type of secondary copy) and/or copy format (e.g., snapshot, backup, archive, HSM, etc.);

a location or a class or quality of storage for storing secondary copies 116 (e.g., one or more particular secondary storage devices 108);

preferences regarding whether and how to encrypt, compress, deduplicate, or otherwise modify or transform secondary copies 116;

which system components and/or network pathways (e.g., preferred media agents 144) should be used to perform secondary storage operations;

resource allocation among different computing devices or other system components used in performing information management operations (e.g., bandwidth allocation, available storage capacity, etc.);

whether and how to synchronize or otherwise distribute files or other data objects across multiple computing devices or hosted services; and retention information specifying the length of time primary data 112 and/or secondary copies 116 should be retained, e.g., in a particular class or tier of storage devices, or within the information management system 100.

Policies can additionally specify or depend on a variety of historical or current criteria that may be used to determine which rules to apply to a particular data object, system component, or information management operation, such as:

frequency with which primary data 112 or a secondary copy 116 of a data object or metadata has been or is predicted to be used, accessed, or modified;

time-related factors (e.g., aging information such as time since the creation or modification of a data object);

deduplication information (e.g., hashes, data blocks, deduplication block size, deduplication efficiency or other metrics);

an estimated or historic usage or cost associated with different components (e.g., with secondary storage devices 108);

the identity of users, applications 110, client computing devices 102 and/or other computing devices that created, accessed, modified, or otherwise utilized primary data 112 or secondary copies 116;

a relative sensitivity (e.g., confidentiality, importance) of a data object, e.g., as determined by its content and/or metadata;

the current or historical storage capacity of various storage devices;

the current or historical network capacity of network pathways connecting various components within the storage operation cell;

access control lists or other security information; and the content of a particular data object (e.g., its textual content) or of metadata associated with the data object.

Exemplary Storage Policy and Secondary Storage Operations

Figure 1E:
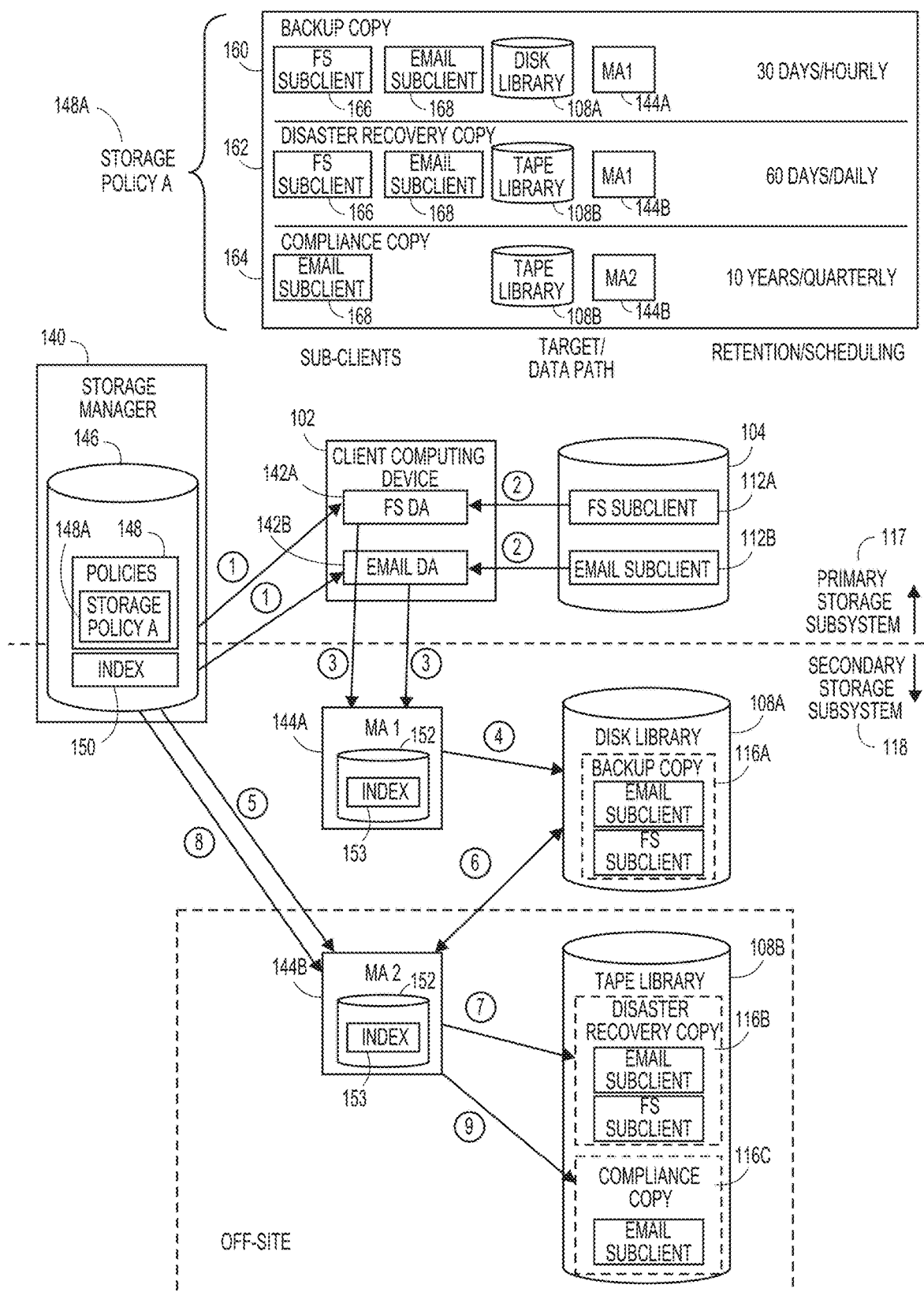
FIG. 1E illustrates certain secondary copy operations according to an exemplary storage policy.

FIG. 1E includes a data flow diagram depicting performance of storage operations by an embodiment of an information management system 100, according to an exemplary storage policy 148A. The information management system 100 includes a storage manger 140, a client computing device 102 having a file system data agent 142A and an email data agent 142B operating thereon, a primary storage device 104, two media agents 144A, 144B, and two secondary storage devices 108A, 108B: a disk library 108A and a tape library 108B. As shown, the primary storage device 104 includes primary data 112A, which is associated with a logical grouping of data associated with a file system, and primary data 112B, which is associated with a logical grouping of data associated with email. Although for simplicity the logical grouping of data associated with the file system is referred to as a file system sub-client, and the logical grouping of data associated with the email is referred to as an email sub-client, the techniques described with respect to FIG. 1E can be utilized in conjunction with data that is organized in a variety of other manners.

As indicated by the dashed box, the second media agent 144B and the tape library 108B are "off-site", and may therefore be remotely located from the other components in the information management system 100 (e.g., in a different city, office building, etc.). Indeed, "off-site" may refer to a magnetic tape located in storage, which must be manually retrieved and loaded into a tape drive to be read. In this manner, information stored on the tape library 108B may provide protection in the event of a disaster or other failure.

The file system sub-client and its associated primary data 112A in certain embodiments generally comprise information generated by the file system and/or operating system of the client computing device 102, and can include, for example, file system data (e.g., regular files, file tables, mount points, etc.), operating system data (e.g., registries, event logs, etc.), and the like. The e-mail sub-client, on the other hand, and its associated primary data 112B, include data generated by an e-mail application operating on the client computing device 102, and can include mailbox information, folder information, emails, attachments, associated database information, and the like. As described above, the sub-clients can be logical containers, and the data included in the corresponding primary data 112A, 112B may or may not be stored contiguously.

The exemplary storage policy 148A includes backup copy preferences (or rule set) 160, disaster recovery copy preferences rule set 162, and compliance copy preferences or rule set 164. The backup copy rule set 160 specifies that it is associated with a file system sub-client 166 and an email sub-client 168. Each of these sub-clients 166, 168 are associated with the particular client computing device 102. The backup copy rule set 160 further specifies that the backup operation will be written to the disk library 108A, and designates a particular media agent 144A to convey the data to the disk library 108A. Finally, the backup copy rule set 160 specifies that backup copies created according to the rule set 160 are scheduled to be generated on an hourly basis and to be retained for 30 days. In some other embodiments, scheduling information is not included in the storage policy 148A, and is instead specified by a separate scheduling policy.

The disaster recovery copy rule set 162 is associated with the same two sub-clients 166, 168. However, the disaster recovery copy rule set 162 is associated with the tape library 108B, unlike the backup copy rule set 160. Moreover, the disaster recovery copy rule set 162 specifies that a different media agent, namely 144B, will be used to convey the data to the tape library 108B. As indicated, disaster recovery copies created according to the rule set 162 will be retained for 60 days, and will be generated on a daily basis. Disaster recovery copies generated according to the disaster recovery copy rule set 162 can provide protection in the event of a disaster or other catastrophic data loss that would affect the backup copy 116A maintained on the disk library 108A.

The compliance copy rule set 164 is only associated with the email sub-client 168, and not the file system sub-client 166. Compliance copies generated according to the compliance copy rule set 164 will therefore not include primary data 112A from the file system sub-client 166. For instance, the organization may be under an obligation to store and maintain copies of email data for a particular period of time (e.g., 10 years) to comply with state or federal regulations, while similar regulations do not apply to the file system data. The compliance copy rule set 164 is associated with the same tape library 108B and media agent 144B as the disaster recovery copy rule set 162, although a different storage device or media agent could be used in other embodiments. Finally, the compliance copy rule set 164 specifies that copies generated under the compliance copy rule set 164 will be retained for 10 years, and will be generated on a quarterly basis.

At step 1, the storage manager 140 initiates a backup operation according to the backup copy rule set 160. For instance, a scheduling service running on the storage manager 140 accesses scheduling information from the backup copy rule set 160 or a separate scheduling policy associated with the client computing device 102, and initiates a backup copy operation on an hourly basis. Thus, at the scheduled time slot the storage manager 140 sends instructions to the client computing device 102 (i.e., to both data agent 142A and data agent 142B) to begin the backup operation.

At step 2, the file system data agent 142A and the email data agent 142B operating on the client computing device 102 respond to the instructions received from the storage manager 140 by accessing and processing the primary data 112A, 112B involved in the copy operation, which can be found in primary storage device 104. Because the operation is a backup copy operation, the data agent(s) 142A, 142B may format the data into a backup format or otherwise process the data.

At step 3, the client computing device 102 communicates the retrieved, processed data to the first media agent 144A, as directed by the storage manager 140, according to the backup copy rule set 160. In some other embodiments, the information management system 100 may implement a load-balancing, availability-based, or other appropriate algorithm to select from the available set of media agents 144A, 144B. Regardless of the manner the media agent 144A is selected, the storage manager 140 may further keep a record in the storage manager database 146 of the association between the selected media agent 144A and the client computing device 102 and/or between the selected media agent 144A and the backup copy 116A.

The target media agent 144A receives the data from the client computing device 102, and at step 4 conveys the data to the disk library 108A to create the backup copy 116A, again at the direction of the storage manager 140 and according to the backup copy rule set 160. The secondary storage device 108A can be selected in other ways. For instance, the media agent 144A may have a dedicated association with a particular secondary storage device(s), or the storage manager 140 or media agent 144A may select from a plurality of secondary storage devices, e.g., according to availability, using one of the techniques described in U.S. Pat. No. 7,246,207, which is incorporated by reference herein.

The media agent 144A can also update its index 153 to include data and/or metadata related to the backup copy 116A, such as information indicating where the backup copy 116A resides on the disk library 108A, data and metadata for cache retrieval, etc. The storage manager 140 may similarly update its index 150 to include information relating to the storage operation, such as information relating to the type of storage operation, a physical location associated with one or more copies created by the storage operation, the time the storage operation was performed, status information relating to the storage operation, the components involved in the storage operation, and the like. In some cases, the storage manager 140 may update its index 150 to include some or all of the information stored in the index 153 of the media agent 144A. After the 30 day retention period expires, the storage manager 140 instructs the media agent 144A to delete the backup copy 116A from the disk library 108A. Indexes 150 and/or 153 are updated accordingly.

At step 5, the storage manager 140 initiates the creation of a disaster recovery copy 116B according to the disaster recovery copy rule set 162.

At step 6, illustratively based on the instructions received from the storage manager 140 at step 5, the specified media agent 144B retrieves the most recent backup copy 116A from the disk library 108A.

At step 7, again at the direction of the storage manager 140 and as specified in the disaster recovery copy rule set 162, the media agent 144B uses the retrieved data to create a disaster recovery copy 116B on the tape library 108B. In some cases, the disaster recovery copy 116B is a direct, mirror copy of the backup copy 116A, and remains in the backup format. In other embodiments, the disaster recovery copy 116B may be generated in some other manner, such as by using the primary data 112A, 112B from the primary storage device 104 as source data. The disaster recovery copy operation is initiated once a day and the disaster recovery copies 116B are deleted after 60 days; indexes are updated accordingly when/after each information management operation is executed/completed.

At step 8, the storage manager 140 initiates the creation of a compliance copy 116C, according to the compliance copy rule set 164. For instance, the storage manager 140 instructs the media agent 144B to create the compliance copy 116C on the tape library 108B at step 9, as specified in the compliance copy rule set 164. In the example, the compliance copy 116C is generated using the disaster recovery copy 116B. In other embodiments, the compliance copy 116C is instead generated using either the primary data 112B corresponding to the email sub-client or using the backup copy 116A from the disk library 108A as source data. As specified, in the illustrated example, compliance copies 116C are created quarterly, and are deleted after ten years, and indexes are kept up-to-date accordingly.

While not shown in FIG. 1E, at some later point in time, a restore operation can be initiated involving one or more of the secondary copies 116A, 1166, 116C. As one example, a user may manually initiate a restore of the backup copy 116A by interacting with the user interface 158 of the storage manager 140. The storage manager 140 then accesses data in its index 150 (and/or the respective storage policy 148A) associated with the selected backup copy 116A to identify the appropriate media agent 144A and/or secondary storage device 108A.

In other cases, a media agent may be selected for use in the restore operation based on a load balancing algorithm, an availability based algorithm, or other criteria. The selected media agent 144A retrieves the data from the disk library 108A. For instance, the media agent 144A may access its index 153 to identify a location of the backup copy 116A on the disk library 108A, or may access location information residing on the disk 108A itself.

When the backup copy 116A was recently created or accessed, the media agent 144A accesses a cached version of the backup copy 116A residing in the index 153, without having to access the disk library 108A for some or all of the data. Once it has retrieved the backup copy 116A, the media agent 144A communicates the data to the source client computing device 102. Upon receipt, the file system data agent 142A and the email data agent 142B may unpackage (e.g., restore from a backup format to the native application format) the data in the backup copy 116A and restore the unpackaged data to the primary storage device 104.

Exemplary Applications of Storage Policies

The storage manager 140 may permit a user to specify aspects of the storage policy 148A. For example, the storage policy can be modified to include information governance policies to define how data should be managed in order to comply with a certain regulation or business objective. The various policies may be stored, for example, in the management database 146. An information governance policy may comprise a classification policy, which is described herein. An information governance policy may align with one or more compliance tasks that are imposed by regulations or business requirements. Examples of information governance policies might include a Sarbanes-Oxley policy, a HIPAA policy, an electronic discovery (E-Discovery) policy, and so on.

Information governance policies allow administrators to obtain different perspectives on all of an organization's online and offline data, without the need for a dedicated data silo created solely for each different viewpoint. As described previously, the data storage systems herein build a centralized index that reflects the contents of a distributed data set that spans numerous clients and storage devices, including both primary and secondary copies, and online and offline copies. An organization may apply multiple information governance policies in a top-down manner over that unified data set and indexing schema in order to permit an organization to view and manipulate the single data set through different lenses, each of which is adapted to a particular compliance or business goal. Thus, for example, by applying an E-discovery policy and a Sarbanes-Oxley policy, two different groups of users in an organization can conduct two very different analyses of the same underlying physical set of data copies, which may be distributed throughout the organization and information management system.

A classification policy defines a taxonomy of classification terms or tags relevant to a compliance task and/or business objective. A classification policy may also associate a defined tag with a classification rule. A classification rule defines a particular combination of criteria, such as users who have created, accessed or modified a document or data object; file or application types; content or metadata keywords; clients or storage locations; dates of data creation and/or access; review status or other status within a workflow (e.g., reviewed or un-reviewed); modification times or types of modifications; and/or any other data attributes in any combination, without limitation. A classification rule may also be defined using other classification tags in the taxonomy. The various criteria used to define a classification rule may be combined in any suitable fashion, for example, via Boolean operators, to define a complex classification rule. As an example, an E-discovery classification policy might define a classification tag "privileged" that is associated with documents or data objects that (1) were created or modified by legal department staff, or (2) were sent to or received from outside counsel via email, or (3) contain one of the following keywords: "privileged" or "attorney" or "counsel", or other like terms.

One specific type of classification tag, which may be added to an index at the time of indexing, is an entity tag. An entity tag may be, for example, any content that matches a defined data mask format. Examples of entity tags might include, e.g., social security numbers (e.g., any numerical content matching the formatting mask XXX-XX-XXXX), credit card numbers (e.g., content having a 13-16 digit string of numbers), SKU numbers, product numbers, etc.

A user may define a classification policy by indicating criteria, parameters or descriptors of the policy via a graphical user interface, such as a form or page with fields to be filled in, pull-down menus or entries allowing one or more of several options to be selected, buttons, sliders, hypertext links or other known user interface tools for receiving user input, etc. For example, a user may define certain entity tags, such as a particular product number or project ID code that is relevant in the organization. In some implementations, the classification policy can be implemented using cloud-based techniques. For example, the storage devices may be cloud storage devices, and the storage manager 140 may execute cloud service provider API over a network to classify data stored on cloud storage devices.

Exemplary Secondary Copy Formatting

The formatting and structure of secondary copies 116 can vary, depending on the embodiment. In some cases, secondary copies 116 are formatted as a series of logical data units or "chunks" (e.g., 512 MB, 1 GB, 2 GB, 4 GB, or 8 GB chunks). This can facilitate efficient communication and writing to secondary storage devices 108, e.g., according to resource availability. For example, a single secondary copy 116 may be written on a chunk-by-chunk basis to a single secondary storage device 108 or across multiple secondary storage devices 108. In some cases, users can select different chunk sizes, e.g., to improve throughput to tape storage devices.

Generally, each chunk can include a header and a payload. The payload can include files (or other data units) or subsets thereof included in the chunk, whereas the chunk header generally includes metadata relating to the chunk, some or all of which may be derived from the payload. For example, during a secondary copy operation, the media agent 144, storage manager 140, or other component may divide the associated files into chunks and generate headers for each chunk by processing the constituent files. The headers can include a variety of information such as file identifier(s), volume(s), offset(s), or other information associated with the payload data items, a chunk sequence number, etc. Importantly, in addition to being stored with the secondary copy 116 on the secondary storage device 108, the chunk headers can also be stored to the index 153 of the associated media agent(s) 144 and/or the index 150. This is useful in some cases for providing faster processing of secondary copies 116 during restores or other operations. In some cases, once a chunk is successfully transferred to a secondary storage device 108, the secondary storage device 108 returns an indication of receipt, e.g., to the media agent 144 and/or storage manager 140, which may update their respective indexes 153, 150 accordingly. During restore, chunks may be processed (e.g., by the media agent 144) according to the information in the chunk header to reassemble the files.

Data can also be communicated within the information management system 100 in data channels that connect the client computing devices 102 to the secondary storage devices 108. These data channels can be referred to as "data streams", and multiple data streams can be employed to parallelize an information management operation, improving data transfer rate, among providing other advantages. Example data formatting techniques including techniques involving data streaming, chunking, and the use of other data structures in creating copies (e.g., secondary copies) are described in U.S. Pat. Nos. 7,315,923 and 8,156,086, and 8,578,120, each of which is incorporated by reference herein.

FIGS. 1F and 1G are diagrams of example data streams 170 and 171, respectively, which may be employed for performing data storage operations. Referring to FIG. 1F, the data agent 142 forms the data stream 170 from the data associated with a client computing device 102 (e.g., primary data 112). The data stream 170 is composed of multiple pairs of stream header 172 and stream data (or stream payload) 174. The data streams 170 and 171 shown in the illustrated example are for a single-instanced storage operation, and a stream payload 174 therefore may include both single-instance ("SI") data and/or non-SI data. A stream header 172 includes metadata about the stream payload 174. This metadata may include, for example, a length of the stream payload 174, an indication of whether the stream payload 174 is encrypted, an indication of whether the stream payload 174 is compressed, an archive file identifier (ID), an indication of whether the stream payload 174 is single instanceable, and an indication of whether the stream payload 174 is a start of a block of data.

Referring to FIG. 1G, the data stream 171 has the stream header 172 and stream payload 174 aligned into multiple data blocks. In this example, the data blocks are of size 64 KB. The first two stream header 172 and stream payload 174 pairs comprise a first data block of size 64 KB. The first stream header 172 indicates that the length of the succeeding stream payload 174 is 63 KB and that it is the start of a data block. The next stream header 172 indicates that the succeeding stream payload 174 has a length of 1 KB and that it is not the start of a new data block. Immediately following stream payload 174 is a pair comprising an identifier header 176 and identifier data 178. The identifier header 176 includes an indication that the succeeding identifier data 178 includes the identifier for the immediately previous data block. The identifier data 178 includes the identifier that the data agent 142 generated for the data block. The data stream 171 also includes other stream header 172 and stream payload 174 pairs, which may be for SI data and/or for non-SI data.

Figure 1H:
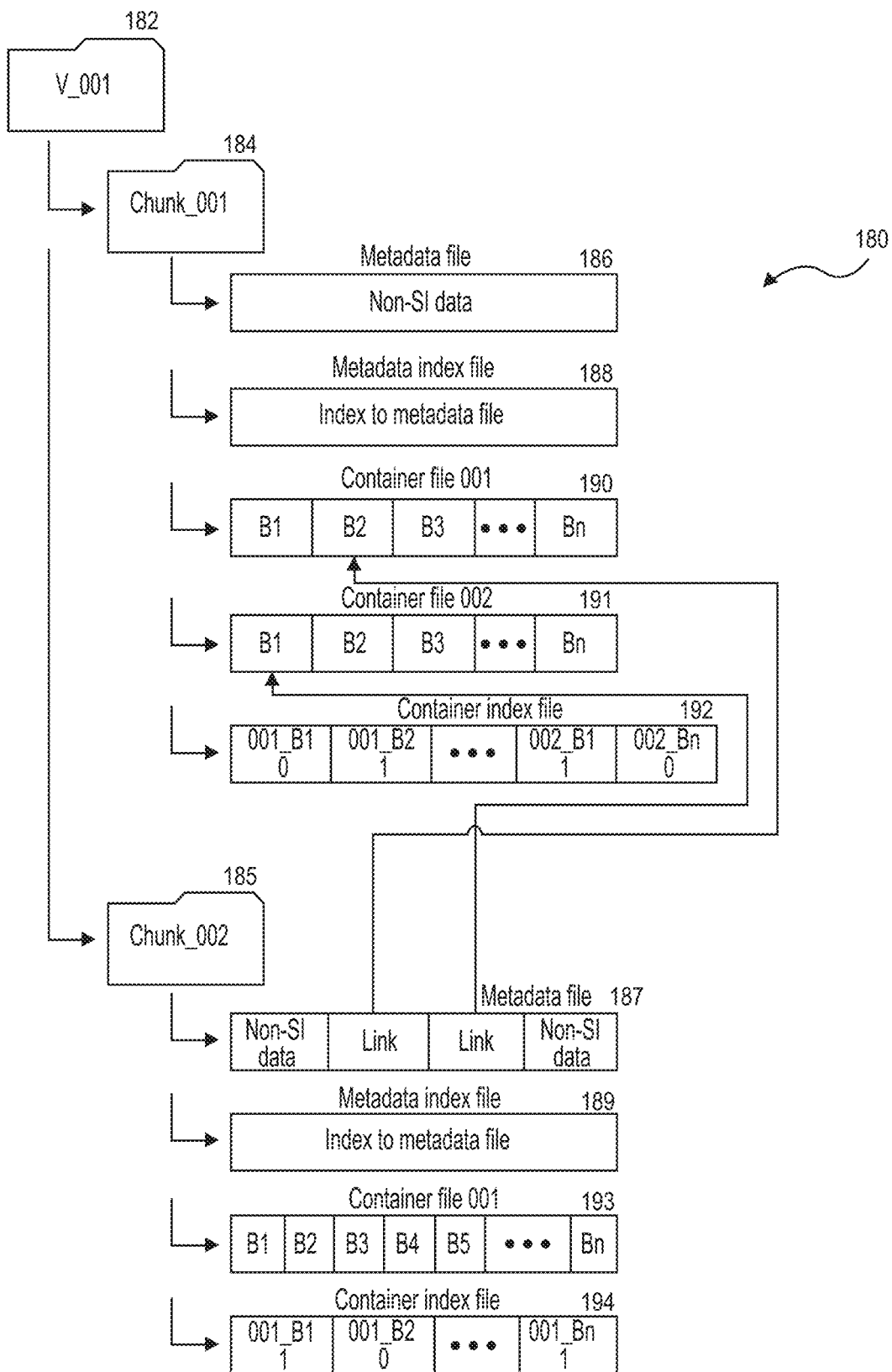

FIG. 1H is a diagram illustrating the data structures 180 that may be used to store blocks of SI data and non-SI data on the storage device (e.g., secondary storage device 108). According to certain embodiments, the data structures 180 do not form part of a native file system of the storage device. The data structures 180 include one or more volume folders 182, one or more chunk folders 184/185 within the volume folder 182, and multiple files within the chunk folder 184. Each chunk folder 184/185 includes a metadata file 186/187, a metadata index file 188/189, one or more container files 190/191/193, and a container index file 192/194. The metadata file 186/187 stores non-SI data blocks as well as links to SI data blocks stored in container files. The metadata index file 188/189 stores an index to the data in the metadata file 186/187. The container files 190/191/193 store SI data blocks. The container index file 192/194 stores an index to the container files 190/191/193. Among other things, the container index file 192/194 stores an indication of whether a corresponding block in a container file 190/191/193 is referred to by a link in a metadata file 186/187. For example, data block B2 in the container file 190 is referred to by a link in the metadata file 187 in the chunk folder 185. Accordingly, the corresponding index entry in the container index file 192 indicates that the data block B2 in the container file 190 is referred to. As another example, data block B1 in the container file 191 is referred to by a link in the metadata file 187, and so the corresponding index entry in the container index file 192 indicates that this data block is referred to.

As an example, the data structures 180 illustrated in FIG. 1H may have been created as a result of two storage operations involving two client computing devices 102. For example, a first storage operation on a first client computing device 102 could result in the creation of the first chunk folder 184, and a second storage operation on a second client computing device 102 could result in the creation of the second chunk folder 185. The container files 190/191 in the first chunk folder 184 would contain the blocks of SI data of the first client computing device 102. If the two client computing devices 102 have substantially similar data, the second storage operation on the data of the second client computing device 102 would result in the media agent 144 storing primarily links to the data blocks of the first client computing device 102 that are already stored in the container files 190/191. Accordingly, while a first storage operation may result in storing nearly all of the data subject to the storage operation, subsequent storage operations involving similar data may result in substantial data storage space savings, because links to already stored data blocks can be stored instead of additional instances of data blocks.

If the operating system of the secondary storage computing device 106 on which the media agent 144 operates supports sparse files, then when the media agent 144 creates container files 190/191/193, it can create them as sparse files. A sparse file is type of file that may include empty space (e.g., a sparse file may have real data within it, such as at the beginning of the file and/or at the end of the file, but may also have empty space in it that is not storing actual data, such as a contiguous range of bytes all having a value of zero). Having the container files 190/191/193 be sparse files allows the media agent 144 to free up space in the container files 190/191/193 when blocks of data in the container files 190/191/193 no longer need to be stored on the storage devices. In some examples, the media agent 144 creates a new container file 190/191/193 when a container file 190/191/193 either includes 100 blocks of data or when the size of the container file 190 exceeds 50 MB. In other examples, the media agent 144 creates a new container file 190/191/193 when a container file 190/191/193 satisfies other criteria (e.g., it contains from approximately 100 to approximately 1000 blocks or when its size exceeds approximately 50 MB to 1 GB).

In some cases, a file on which a storage operation is performed may comprise a large number of data blocks. For example, a 100 MB file may comprise 400 data blocks of size 256 KB. If such a file is to be stored, its data blocks may span more than one container file, or even more than one chunk folder. As another example, a database file of 20 GB may comprise over 40,000 data blocks of size 512 KB. If such a database file is to be stored, its data blocks will likely span multiple container files, multiple chunk folders, and potentially multiple volume folders. Restoring such files may require accessing multiple container files, chunk folders, and/or volume folders to obtain the requisite data blocks.

Content-Independent and DBMS-Independent Synthetic Full Backup of a Database Based on Snapshot Technology FIG. 2 is a block diagram illustrating some salient portions of a storage management system 200 for generating and using a content-independent and DBMS-independent synthetic full backup of a database based on snapshot technology, according to an illustrative embodiment of the present invention. Storage management system 200 may be an embodiment of an information management system, which illustratively comprises: secondary storage device 108, comprising element 226, which represents backup copies of database 212; client computing device 202, comprising database management system 210 and associated data agent 242; storage array 204 comprising database (primary data) 212; secondary storage computing device (proxy server) 206, comprising media agent 244; and storage manager 240. The components may be interconnected as shown by the solid arrows and network 201. The infrastructure required to support the illustrative interconnections may be any suitable communications infrastructure such as described in regard to communication pathways 114, without limitation.

Secondary storage device 108 was described in more detail above. Technology for secondary storage may be a lower tier of storage than primary storage array 204, e.g., lower cost or slower-performing disks, tape, etc. Secondary storage device 108 is well known in the art, and may be used by the illustrative embodiment to store backup copies of database 212 and other secondary copies of data in system 200.

Network 201 is well known in the art and generally provides interconnectivity among some components of system 200, some of which may be dispersed geographically. Network 201 may comprise one or more sub-networks, e.g., LAN, WAN, the Internet, an intranet, etc., and may comprise wired and wireless components without limitation. For example, client computing device 202 may communicate with storage array 204 via network 201. Network 201 may be part of system 200, but need not be. In some alternative embodiments, one or more components shown here to be interconnected via network 201 may be directly connected and/or may use more than one network to communicate.

Client computing device 202 is analogous to client computing device 102, and further comprises additional functionality for operating within system 200. For example, client computing device 202 may execute a data agent 242 that is particularly targeted to and associated with a co-resident database management system 210. System 200 may comprise any number of client computing devices 202.

Storage array 204 is a data storage device that is well known in the art (or may be a network of storage devices in some alternative embodiments). Storage array 204 may be block storage technology (SAN), which may be organized into storage volume portions or logical units designated by respective logical unit numbers (LUNs) which may be mapped to volume(s) on the corresponding computing device (e.g., client computing device 202, secondary storage computing device 206) and mounted thereto when access to the LUN is required. In system 200, storage array 204 is generally used for storing primary data (e.g., database 212) generated by client computing devices 202 (e.g., by database management system 210). Storage array 204 also may generate and store snapshots ("hardware snapshots" or "array-created snapshots"), e.g., as instructed by storage manager 240 and/or data agent 242 and/or media agent 244. Storage array 204 may generate hardware snapshots, i.e., one or more hardware snapshots of a given storage volume comprising database 212, as is well known in the art. Snapshots also may be mounted (e.g., using the respective storage volume designated by a LUN) to computing devices such as proxy server 206, e.g., for executing secondary copy operations as described herein. However, it should be noted that hardware snapshot capability is not required according to the illustrative embodiment, because software snapshots may be used instead.

Secondary storage computing device (proxy server) 206 is analogous to secondary storage computing device 106, and may further comprise additional functionality for operating in system 200, such as executing media agent 244 and receiving changed block identifiers from data agent 242.

Database management system (DBMS) 210 is well known in the art, and may be any type of database management system and/or any model of database, e.g., hierarchical, relational, etc. Examples of database management system 210 may include Oracle, DB2, Microsoft SQL, MySQL, etc., without limitation. In system 200, DBMS 210 illustratively performs operations upon database 212. Such operations may include defining a schema and the underlying data, generating data, changing data, performing queries, and administering data, which may involve one or more read and/or write and/or open operations upon the data and/or metadata in the database. Because the illustrative embodiment is agnostic of the type of DBMS as well as the content of the underlying data/metadata in database 212, any kind of DBMS and database schema may be supported.

DBMS 210 may comprise native utilities for managing database 212, such as "database dump" for saving a record of the table structure and/or schema and/or data of the database, and may include a number of SQL or SQL-like statements. DBMSs such as DBMS 210 may use a native database dump for backing up a database so that the DBMS may later restore it in case of data loss or corruption in the production data. Native DBMS backup utilities may also save the database state, which may include generating and saving metadata of the database structure and relationships to the underlying data. Native restore utilities in a DBMS such as DBMS 210 are able to interpret the metadata and other information in the DBMS-generated backup and/or DBMS-generated database dump, so that the DBMS may properly restore the database to the point in time and/or state captured therein. These native utilities enable the DBMS to handle database failure modes, backups, and restores in a self-contained manner without regard to the storage medium or storage device that stores the database. In sum, native DBMS utilities generally rely on generating, saving, and interpreting database-specific metadata, such as database state. Moreover, each DBMS has distinct features and corresponding product-specific metadata that distinguish it from other versions or competing products.

Database 212 comprises primary data, i.e., live production data, which is operated upon by DBMS 210. Illustratively, database 212 is stored in storage array 204, e.g., in a storage volume that may be snapshotted. As explained herein, database 212 may comprise any data, including metadata, and may be organized according to any model, e.g., hierarchical, relational, etc., and may be managed by any type of DBMS.

Element 226 represents one or more backup copies of database 212 which are stored to secondary storage such as secondary storage device 108. The various backup copies are described in further detail in other figures.

Storage manager 240 is analogous to storage manager 140 and may comprise additional functionality for operating in system 200, such as communicating with any number of data agents 242 and media agents 244, and managing storage operations in system 200, including illustratively the generating and use of synthetic full copies of database(s) 212. Storage manager 240 also manages system 200 and other storage management operations in system 200, which may not be related to database 212.

Data agent 242 may be a data agent analogous to data agent 142, and further comprising additional functionality for operating in system 200. Data agent 242 illustratively executes on client computing device 202. Data agent 242 is illustratively associated with DBMS 210 and is configured to handle certain data protection operations in system 200 relative to DBMS 210 and database 212. Data agent 242 may comprise a monitoring utility, e.g., block filter 342 shown in a later figure, which may keep track of data block status in database 212, e.g., data block changes resulting from write operations issued by DBMS 210. Data agent 242 may also comprise other data structure(s) and functionality, such as maintaining lists of changed data blocks in database 212 relative to successive snapshots of database 212. For example data agent 242 may maintain one or more lists or other data structures that track which data blocks have changed relative to the most recently-executed snapshot of database 212, or may track with data blocks have changed relative to a baseline snapshot of database 212, etc. Data agent 242 may also transmit these lists/data structures to media agent 244, to other data agents and/or media agents, and/or to storage manager 240.

Media agent 244 is analogous to media agent 144, and further comprises additional functionality for operating in system 200. Media agent 244 illustratively executes on secondary storage computing device 206, which may be referred to as proxy server 206. Media agent 244 is illustratively associated with secondary storage device 108 and is configured to handle certain secondary storage operations that store data to and retrieve data from secondary storage device 108. Media agent 244 may receive changed block identifiers from data agent 242. Media agent 244 may comprise an analysis function, e.g., block-level analyzer 444 shown in a later figure, which may synthesize a synthetic full backup of database 212 based on a full backup copy and incremental backup(s) stored in secondary storage device 108. Media agent 244 may also participate in backing up and indexing a full backup copy of database 212; backing up and indexing incremental copies of database 212 in which only changed blocks are moved to secondary storage; and restoring one or more synthetic full backups of database 212 from secondary storage, e.g., to a primary storage device such as storage array 204 or to another storage device.

Storage management system 200 is depicted herein with a limited number of constituent components in order to ease understanding of the illustrative embodiment. However, system 200 may comprise any number and type of the depicted components, as well as components of system 100, without limitation.

Figure 3:
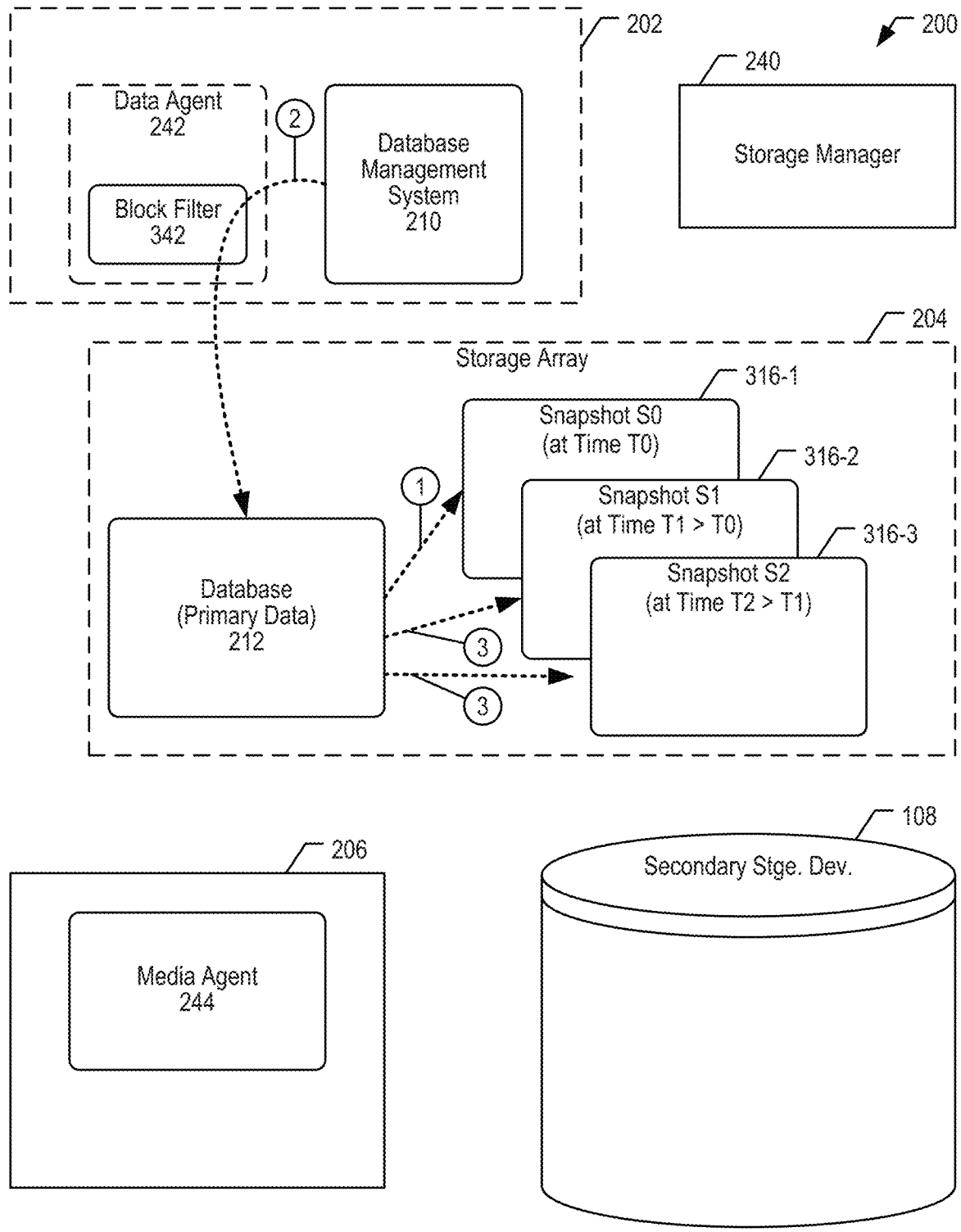
FIG. 3 is a block diagram that illustrates some salient details of system 200, including logical data flow operations 1, 2, and 3.

FIG. 3 is a block diagram that illustrates some salient details of system 200, including logical data flow operations 1, 2, and 3. In addition to components depicted in an earlier figure, the present figure depicts: snapshot S0 (element 316-1); snapshot S1 (element 316-2); snapshot S2 (element 316-3); and block filter 342.

Snapshots S (e.g., S0, S1, S2, etc.) are illustratively stored in storage array 204. Each snapshot S is a snapshot of database 212 at a given point in time and may comprise all data/metadata stored in the storage volume that hosts database 212 at the point in time. Snapshot S0 is illustratively taken at a point in time T0; snapshot S1 is illustratively taken at a later point in time, T1>T0; snapshot S2 is illustratively taken at an even later point in time, T2>T1. Snapshot S may be a hardware snapshot, i.e., an array-created or array-based snapshot generated by storage array 204. Storage array 204 may create snapshot S as instructed by a component of system 200 such as storage manager 240 and/or data agent 242 and/or media agent 244. In alternative embodiments, snapshot S may be a software snapshot, illustratively wherein the operating system that executes on client computing device 202 uses a utility, e.g., Microsoft Volume Snapshot Service or "VSS," to generate a snapshot of database 212 and store it to storage array 204. The software snapshot S may be generated as instructed by a component of system 200 such as data agent 242 and/or storage manager 240 and/or media agent 244.

Block filter 342 is a functional component of data agent 242, and may be implemented as executable software and/or firmware, which executes on the underlying client computing device 202. When it executes according to the illustrative embodiment, block filter 342 is largely responsible for detecting write operations upon database 212 and identifying the affected data block that change as a result of the write. A changed data block may comprise data and/or metadata and block filter 342 is agnostic of what is in the data block or what the data block contents may represent. Block filter 342 also may track these changed blocks relative to a baseline snapshot of database 212, e.g., relative to snapshot S0, and/or relative to another snapshot of database 212, such as a more recent snapshot, e.g., S1 or S2. Block filter 342 is described in additional detail elsewhere herein. Block filter 342 may also interwork and/or communicate with media agent 244 and/or storage manager 240.

Block filter 342 is shown herein as a distinct component to ease understanding of the present disclosure, however, alternative embodiments are also possible within the scope of the present invention. Block filter 342 may be embodied as a unified module within data agent 242, layered on existing data agent code, or may be a logical construct whose functionality is distributed through one or more other functional modules of data agent 242, and in any combination thereof. In some alternative embodiments, block filter 342 may execute in a functional module that is distinct from data agent 242.

Logical data flow operations 1, 2, and 3 are shown here by way of example to briefly illustrate some of the salient operations and/or data flows that may occur in system 200 according to the illustrative embodiment. Further details are provided elsewhere herein, including in regard to method 500 and its sub-operations. Logical operation 1 depicts snapshot S0 (316-1) being taken of database 212 at time T0. Logical operation 2 depicts ongoing operations of DBMS 210 upon database 212, which operations may be monitored by block filter 342 so that it may detect changed data blocks in database 212. Logical operations 3 depict snapshots of database 212 being taken and stored successively, after snapshot S0, e.g., snapshot S1 (316-2) and snapshot S2 (316-3).

Figure 4A:
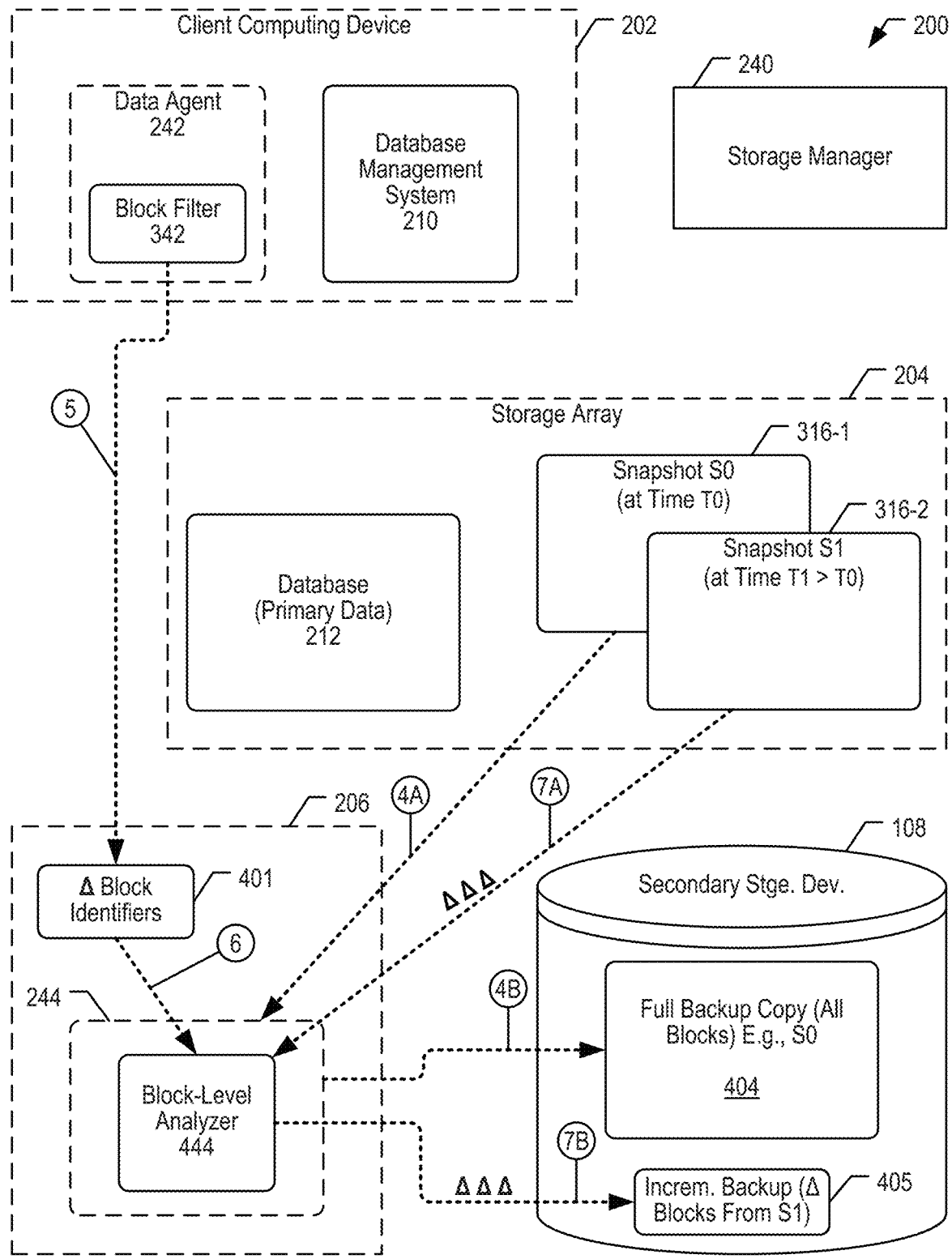
FIG. 4A is a block diagram that illustrates some salient details of system 200, including logical data flow operations 4A, 4B, 5, 6, 7A, and 7B.

FIG. 4A is a block diagram that illustrates some salient details of system 200, including logical data flow operations 4A, 4B, 5, 6, 7A, and 7B. In addition to components depicted in an earlier figure, the present figure depicts: changed block identifiers 401 on proxy server 206; full backup copy 404 and incremental backup 405, stored in secondary storage device 108; and block-level analyzer 444.

Changed block (Δ block) identifiers 401 may comprise one or more data structures, e.g., lists, tables, etc., which are received by proxy server 206 from data agent 242. Changed block identifiers 401 identify one or more changed data blocks from database 212, which have been detected by block filter 342 and transmitted to proxy server 206 and media agent 244. For example, following snapshot S1, data agent 242 may finalize a list of identifiers for data blocks that changed in database 212 relative to (or since) snapshot S0, and may then transmit the finalized list of changed block identifiers to media agent 244 for further processing—illustrated by logical data flow operations 5 and 6 respectively.

Full backup copy 404 may be a full backup copy of database 212, comprising all data blocks of database 212 (really of the storage volume that hosts database 212 and which was captured in a snapshot) at the time that snapshot S0 was taken. Illustratively, snapshot S0 may be transferred from storage array 204 to secondary storage device 108 via media agent 244, illustrated by logical operations 4A and 4B. Storage manager 204 may manage a full backup operation of database 212, which may comprise taking snapshot S0 and transferring all snapshot S0 data to secondary storage device 108, stored as full backup copy 404. As with any backup involving media agent 244, the physical location of each block stored to secondary storage is recorded in a block index (not shown here), e.g., index 153, which may reside on proxy server 206 and/or in secondary storage device 108. The block index will be used in a subsequent operation to locate data blocks in backup copy 404.

Incremental backup 405 is a block-level backup which may be result from an incremental backup operation that captures—at the block level—database 212 changes in a given snapshot compared to an immediately preceding snapshot. For example, after snapshot S1 is taken, media agent 244 may receive changed data block identifiers 401 identifying changed blocks for snapshot S1 relative to baseline snapshot S0 (see logical operations 5 and 6); accordingly, media agent 244, e.g., using block-level analyzer 444, may extract the identified changed blocks from snapshot S1 and transfer them to secondary storage device 108, generating incremental backup 405 (see logical operations 7A and 7B). The physical location of each data block stored to secondary storage is recorded in a corresponding block index (not shown here), e.g., index 153, which may reside on proxy server 206 and/or in secondary storage device 108. The block index will be used in a subsequent operation to locate data blocks in backup copy 405.

Block-level analyzer 444 is a functional component of media agent 244, and may be implemented as executable software and/or firmware, which executes on the underlying secondary storage computing device 206. When it executes according to the illustrative embodiment, block-level analyzer 444 may be responsible for analyzing the changed block identifiers 401, extracting only the changed data blocks from the respective snapshot, e.g., snapshot S1, and transferring only the extracted changed data blocks to secondary storage—as illustrated here by logical operations 7A and 7B. Block-level analyzer 444 is described in additional detail elsewhere herein, e.g., generating a synthetic full backup of database 212. Block-level analyzer 444 may also interwork and/or communicate with data agent 242 and/or storage manager 240.

Block-level analyzer 444 is shown herein as a distinct component to ease understanding of the present disclosure, however, alternative embodiments are also possible within the scope of the present invention. Block-level analyzer 444 may be embodied as a unified module within media agent 244, layered on existing media agent code, or may be a logical construct whose functionality is distributed through one or more other functional modules of media agent 244, and in any combination thereof. In some alternative embodiments, block-level analyzer 444 may execute in a functional module that is distinct from media agent 244.

Logical data flow operations 4A, 4B, 5, 6, 7A, and 7B are shown here by way of example to illustrate some of the salient operations that may occur in system 200 according to the illustrative embodiment. Further details are provided elsewhere herein, including in regard to method 500 and its sub-operations.

Figure 4B:
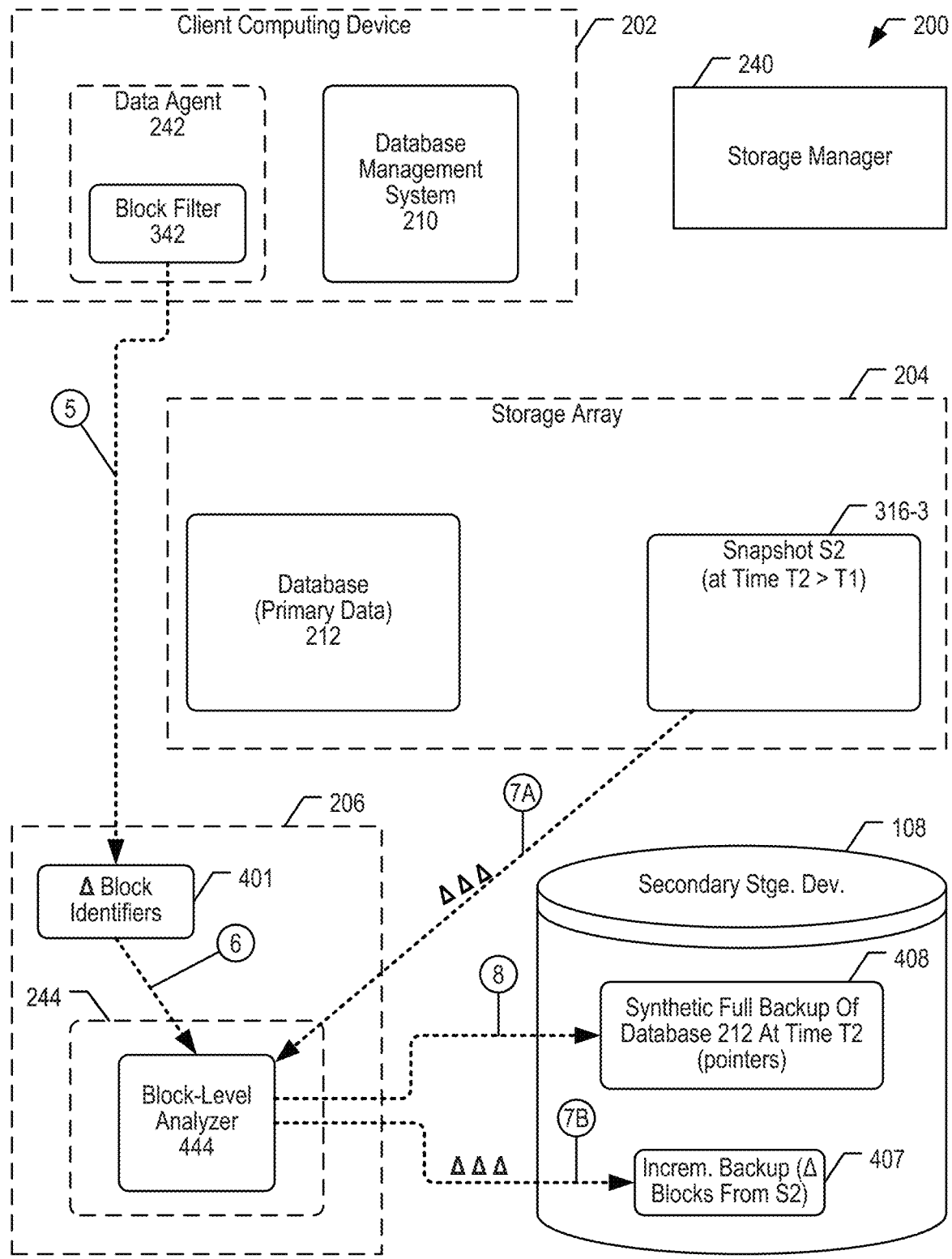
FIG. 4B is a bloc diagram that illustrates some salient details of system 200, including logical data flow operations 5, 6, 7A, 7B, and 8.

FIG. 4B is a block diagram that illustrates some salient details of system 200, including logical data flow operations 5, 6, 7A, 7B, and 8. In addition to components depicted in an earlier figure, the present figure depicts: incremental backup 407 and synthetic full backup 408, stored in secondary storage device 108.

Incremental backup 407 is a block-level backup analogous to incremental backup 405 representing a different point in time, e.g., T2. For example, after snapshot S2 is taken, media agent 244 may receive changed data block identifiers 401 identifying changed blocks for snapshot S2 relative to snapshot S1 (see logical operations 5 and 6 in the present figure); accordingly, media agent 244, e.g., using block-level analyzer 444, may extract the identified changed blocks from snapshot S2 and transfer them to secondary storage device 108, generating incremental backup 407 (see logical operations 7A and 7B in the present figure). The physical location of each block stored to secondary storage is recorded in a block index (not shown here), e.g., index 153, which may reside on proxy server 206 and/or in secondary storage device 108. The block index will be used in a subsequent operation to locate data blocks in backup copy 407.

Synthetic full backup 408 is a block-level representation of database 212 at a certain point in time, illustratively at time T2 when snapshot S2 was taken. Synthetic full backup 408 comprises pointers (or other suitable indicators) to actual data blocks that are stored in secondary storage, which, taken collectively, logically form database 212 at the chosen point in time but which may have been stored in a number of different full and incremental backup copies, e.g., 404, 405, and 407. This is illustrated in more detail in the next figure.

According to the illustrative embodiment, synthetic full backup 408 may be generated by media agent 244, e.g., using data-block analyzer 444, and stored to secondary storage as synthetic full backup 408—illustrated by logical data flow operation 8. Because synthetic full backup 408 is made up of pointers to actual data blocks, backup 408 may be a very compact data structure, and moreover, one that requires only minimal data movement from media agent 244 to secondary storage device 108. No data blocks from database 212 or its snapshots are actually moved in generating synthetic full backup 408. Rather, previously-generated data, such as changed block identifiers 401 and block indexes may be analyzed to determine the appropriate composition of synthetic full backup 408. Furthermore, when another later synthetic full backup is required, it too may be generated based solely on analyzing changed block identifiers 401 and block indexes for later incremental backups. Thus, network resources in system 200 may be sparingly used.

Logical data flow operations 5, 6, 7A, 7B, and 8 are shown here by way of example to illustrate some of the salient operations that may occur in system 200 according to the illustrative embodiment. Further details are provided elsewhere herein, including in regard to method 500 and its sub-operations.

Figure 4C:
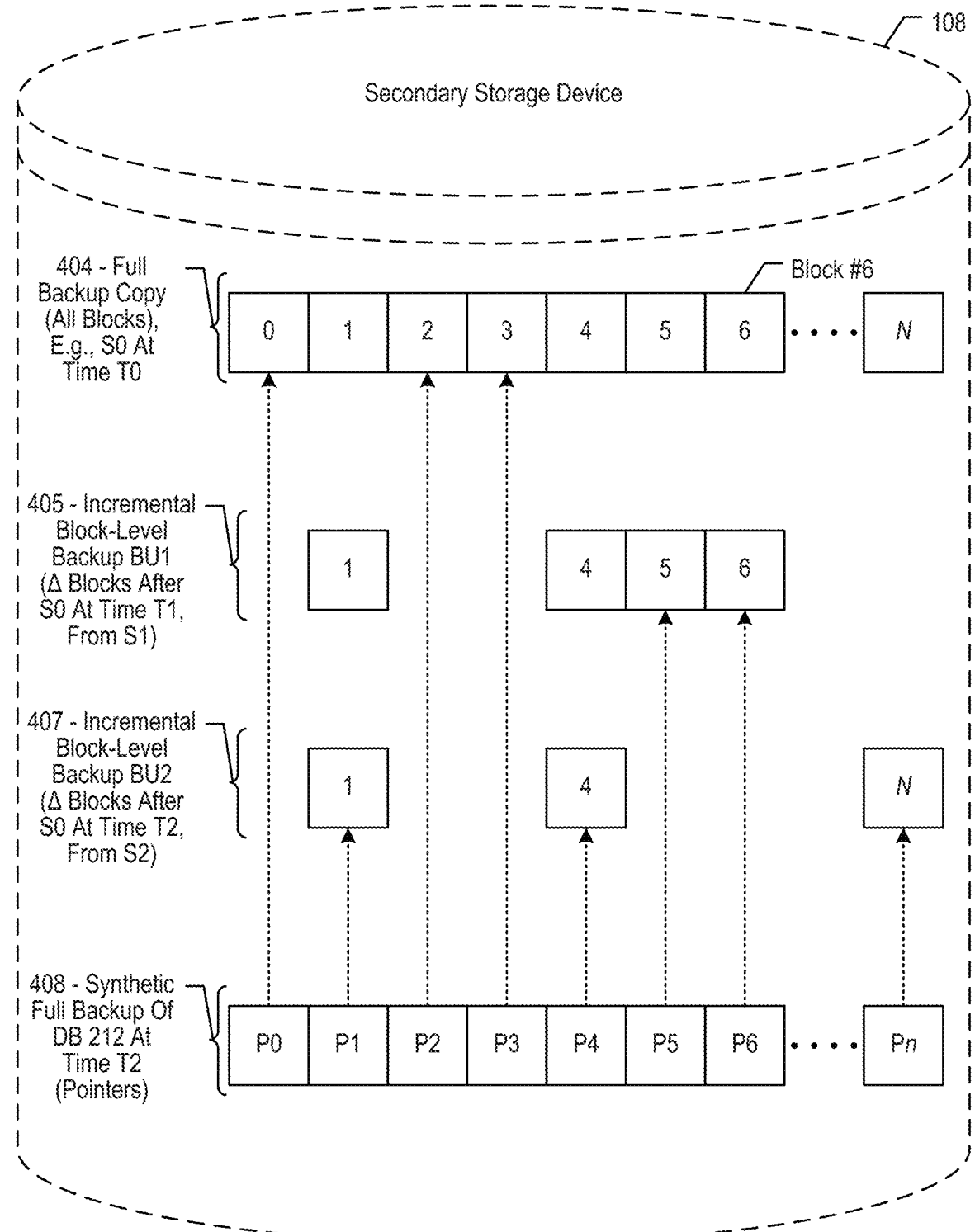
FIG. 4C is a diagram depicting a number of backups of database 212 in secondary storage, including a synthetic full block-level backup of database 212.

FIG. 4C is a diagram depicting a number of backups of database 212 in secondary storage, including a synthetic full block-level backup of database 212. The present figure depicts: a block-by-block diagram of full backup copy 404; a block-by-block diagram of incremental backup 405; a block-by-block diagram of incremental backup 407; and a block-by-block diagram of synthetic full backup 408. The drawing is not to scale as to any of the illustrated elements and is presented in its present form to ease understanding of the present disclosure.

Full backup copy 404. The present diagram enumerates the data blocks that form full backup copy 404, i.e., data blocks 0 through N. Data blocks 0-N are identical to the data blocks in snapshot S0 and every data block is included in full backup copy 404. The size of the individual data blocks may be any size that is suitable to DBMS 210, its associated file system, and storage array 204.

Incremental backup 405. The present diagram illustrates the composition of incremental backup 405, which comprises only some of the data blocks of database 212, as captured in snapshot S1. Illustratively, only data blocks 1, 4, 5, and 6 changed in snapshot S1 relative to snapshot S0, and therefore only these data blocks form incremental backup 405.

Incremental backup 407. The present diagram illustrates the composition of incremental backup 407, which comprises only some of the data blocks of database 212, as captured in snapshot S2. Illustratively, only data blocks 1, 4, and N changed in snapshot S2 relative to snapshot S1, and therefore only these data blocks form incremental backup 407. Notably, data blocks 1 and 4, which changed from snapshot S0 to S1, changed again in S2.

Synthetic full backup 408 may comprise a pointer (or other indicator) for each data block enumerated in full backup 404, i.e., a pointer for each data block from 0 through N. Each pointer points to the physical location, in secondary storage device 108, of the pointed-to data block. This location information may have been obtained from the data block indexes created when full backup 404 and incremental backups 405 and 407 were stored to secondary storage device 108 in a preceding operation. Synthetic full backup 408 is constructed so that it may skip or ignore intermediate changes to certain blocks. Thus, only the most current data blocks are pointed to in synthetic full backup 408, including unchanged data blocks from the baseline full backup (e.g., 404), and further including the most-recently changed data blocks from incrementals such as 405, and 407, and skipping over intermediate changes. Illustratively the intermediate changes of blocks 1 and 4 that were stored in intermediate backup 405 are skipped here and the locations of blocks 1 and 4 from the later intermediate backup 407 are pointed to instead. Thus, according to the depicting in the present figure, when synthetic full backup 408 is generated the result is as follows:

Pointer P0 points to block 0 in full backup copy 404;
Pointer P1 points to block 1 in incremental backup 407;
Pointer P2 points to block 2 in full backup copy 404;
Pointer P3 points to block 3 in full backup copy 404;
Pointer P4 points to block 4 in incremental backup 407;
Pointer P5 points to block 5 in incremental backup 405;
Pointer P6 points to block 6 in incremental backup 405;
Pointer Pn points to block N in incremental backup 407.

Having synthesized the pointers to the appropriate most-current data blocks available from secondary storage, system 200, e.g., using media agent 244 and/or data agent 242 and/or storage manager 240, may then reconstitute or reconstruct a full copy of database 212 that includes every enumerated data block, which may be restored to primary storage and/or may be saved to another secondary storage device, e.g., as an archive copy or a reference copy.

Figure 5:
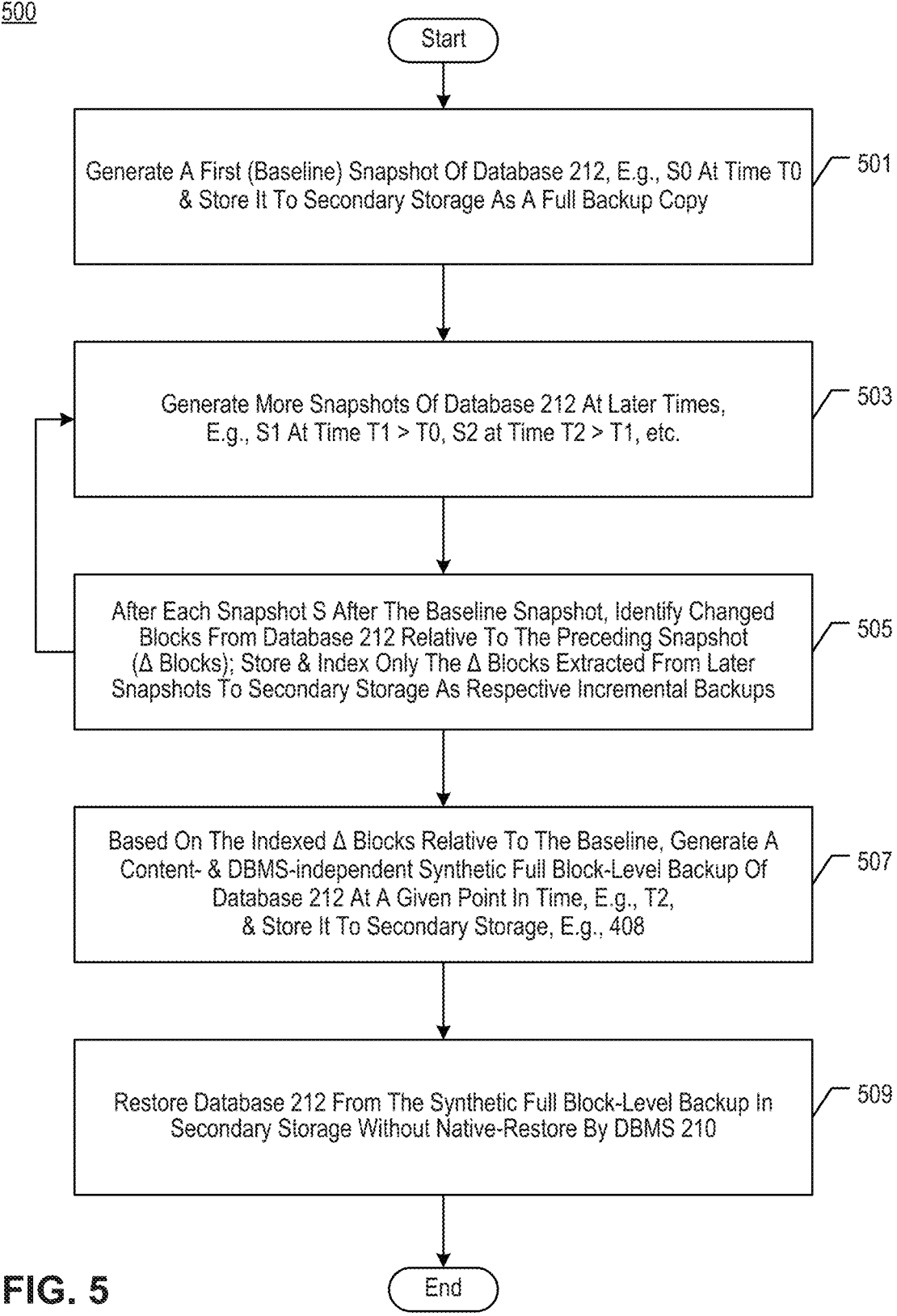
FIG. 5 depicts some salient operations of a method 500 according to an illustrative embodiment of the present invention.

FIG. 5 depicts some salient operations of a method 500 according to an illustrative embodiment of the present invention. Method 500 may be executed by one or more components of system 200.

At block 501, a first snapshot is taken of the storage volume that hosts database 212, e.g., snapshot S0 at time T0. This snapshot may be designated a baseline snapshot. Snapshot S0 may then be stored to secondary storage in its entirely as a full backup copy of database 212, e.g., 404. More details are given in a subsequent figure.

At block 503, more snapshots of database 212 may be generated at later times, e.g., snapshot S1 at time T1>T0, snapshot S2 at Time T2>T1, etc. The snapshots may be hardware snapshots and/or software snapshots, without limitation. More details are given in a subsequent figure.

At block 505, after each snapshot S that is taken after the baseline snapshot, changed blocks from database 212 relative to the immediately preceding snapshot (so-called "Δ blocks") may be identified. For example, changed blocks in snapshot S1 may be identified relative to immediately preceding snapshot S0. Likewise, changed blocks in snapshot S2 may be identified relative to the immediately preceding snapshot S1. Only the identified Δ blocks are extracted from these respective later snapshots and stored to secondary storage as respective incremental backups of database 212, e.g., 405, 407. Secondary storage locations for the data blocks are indexed for future reference in a corresponding block index. More details are given in a subsequent figure. Control may pass back to block 503 to generate more snapshots.

At block 507, based on the Δ blocks stored to secondary storage and indexed in the preceding block, a composite relative to the baseline may be created to generate a content-& DBMS-independent synthetic full block-level backup of database 212 at a given point in time, e.g., T2. The synthetic full block-level backup may be stored to secondary storage device 108, e.g., as backup 408. More details are given in a subsequent figure.

At block 509, database 212 may be restored from the synthetic full block-level backup that may be found in secondary storage device 108. Accordingly, components of system 200 may reconstruct or reconstitute a full copy of database 212, based on the synthetic full block-level backup in secondary storage, using the appropriate backed up data blocks from the full backup and incremental backups therein, without involving any of the native utilities of DBMS 210. The restored database 212 may be restored to primary storage as the current working copy for DBMS 210 or may be copied to secondary storage as an archive copy or reference copy, etc. Notably, DBMS 210 utilities are not used for interpreting data/metadata in secondary storage in order to perform the restore operation, because instead, system 200 components perform block-level operations as described herein, which are agnostic of the contents being restored.

For example, storage manager 240 may manage a restore operation, by instructing media agent 244 (or another media agent component in system 200) to restore database 212 from synthetic full block-level backup 408. Media agent 244 may set aside a storage volume on a storage device such as storage array 204, the storage volume sufficient to store a restored database 212, i.e., comprising all enumerated data blocks. Media agent 244 may use the pointers in backup 408 to retrieve the respective pointed-to data blocks from the one or more full and incremental backups such as 404, 405, and/or 407. Media agent 244 may then store the retrieved data blocks in the appropriate sequential order to the reserved storage volume. Once the operation is completed, the restored database may be made available for appropriate subsequent operations, such as to DBMS 210 or to another DBMS, or may be copied to other secondary storage media. A DBMS may have to be reset or restarted to acquire access to a restored database, but importantly, the DBMS does not perform any restore processing in the course of restoring a full copy of database 212 from the synthetic full backup 408; rather, the restore from 408 to a properly usable copy of database 212 is performed by components of system 200, such as media agent 244, storage manager 240, and/or data agent 242. This means that, advantageously, performance slowdowns, processing cycles, and downtime of the DBMS may be reduced for purposes of restoring the database, and when the full copy is restored and ready for use, the DBMS may access the restored database relatively rapidly. At least in part, this may be because the restored database is available as a complete set of data blocks, which may include status and state metadata for the DBMS to process as it reads in the restored database.

Figure 6:
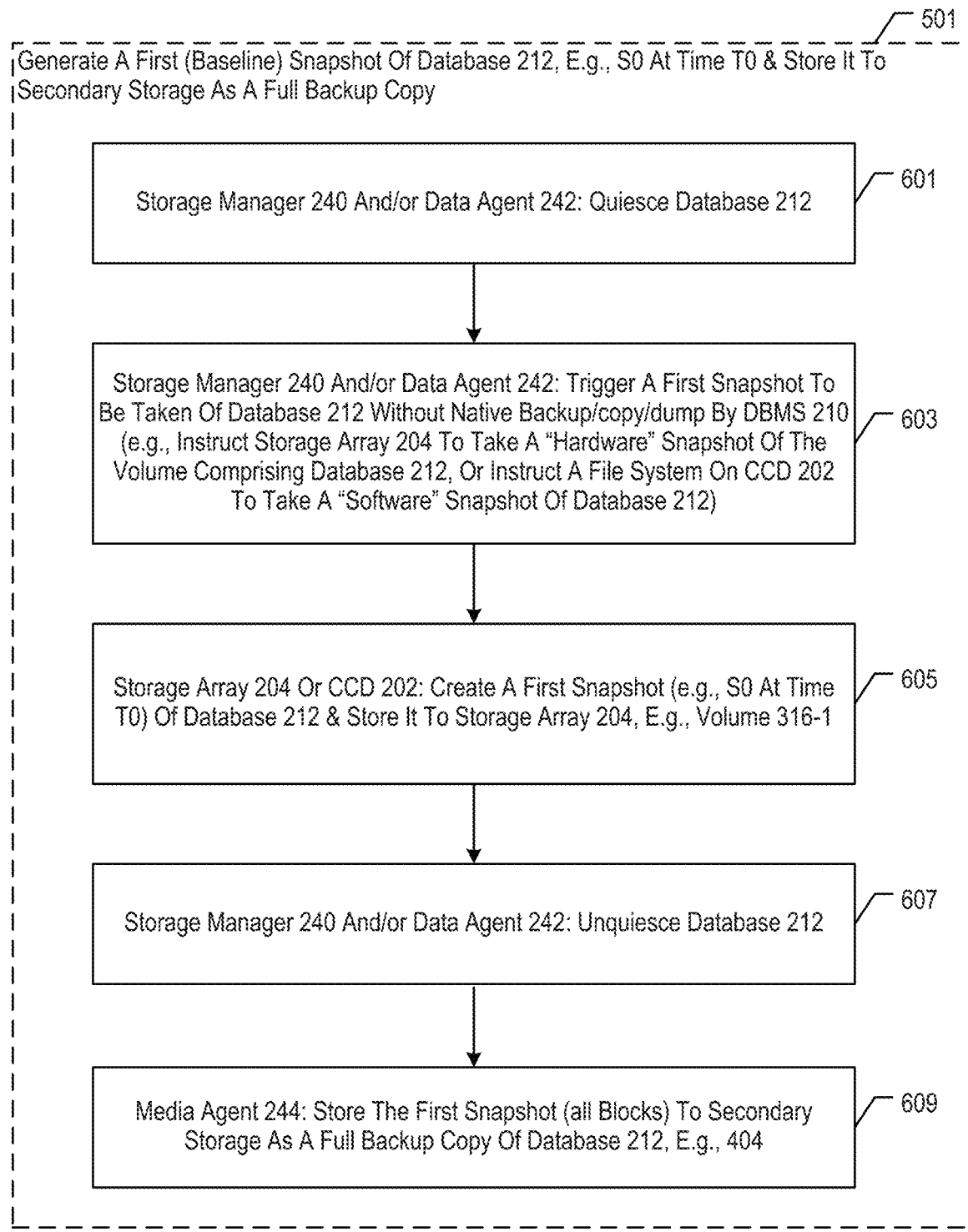
FIG. 6 depicts some salient sub-operation of block 501 in method 500.

FIG. 6 depicts some salient sub-operation of block 501 in method 500. Block 501 is generally directed at generating a first (baseline) snapshot of database 212, e.g., S0 at time T0, and storing the snapshot to secondary storage as a full backup copy of database 212.

At block 601, storage manager 240 and/or data agent 242 may quiesce database 212. This may be performed by instructing DBMS 210 accordingly. Quiescing a database is well known in the art.

At block 603, storage manager 240 and/or data agent 242 may trigger a first snapshot to be taken of database 212 without native backup/copy/dump by DBMS 210. In other words, while database 212 is in a quiesced state, and without participation by native utilities of DBMS 210, a snapshot of database 212 may be taken. A hardware snapshot or a software snapshot may be taken, depending on the implementation of system 200. For example, storage array 204 may be instructed to take a "hardware" snapshot of the storage volume comprising database 212; or, for example, the operating system or file system that executes on client computing device 202 (e.g., Microsoft VSS) may be instructed to take a "software" snapshot of database 212.

At block 605, a first snapshot of database 212 is taken according to the instruction(s) in the preceding block (e.g., S0 at time T0). The snapshot will comprise all data blocks in the storage volume that hosts database 212, which may include raw database data as well as associated metadata that may be generated and stored therein by DBMS 210, such as state information, timestamps, transaction maps, etc. For example, storage array 204 may create a first hardware snapshot of database 212 and store it to a storage volume, e.g., 316-1. Alternatively, a software snapshot may be taken by the operating system, e.g., Microsoft Windows using the VSS utility, and may be stored to storage array 204 in storage volume 316-1. Whether the snapshot is a hardware snapshot or a software snapshot, it may operate at the block level, so that the constituent data blocks may be properly compared and/or extracted therefrom in a later operation.

At block 607, storage manager 240 and/or data agent 242 may unquiesce database 212 after the snapshot operation completes. This may be performed by instructing DBMS 210 accordingly. Unquiescing a database is well known in the art.

At block 609, media agent 244 may store the first snapshot (all data blocks) to secondary storage as a full backup copy of database 212, e.g., 404. This operation may be part of a backup job that may be managed by storage manager 240. This operation also may comprise generating a block index, e.g., index 153, to provide a mechanism for locating the constituent data blocks of the full backup copy 404 in the secondary storage device 108. For example, a location address may be associated with each enumerated data block 0-N, which will be used later in generating the synthetic full backup 408.

Figure 7:
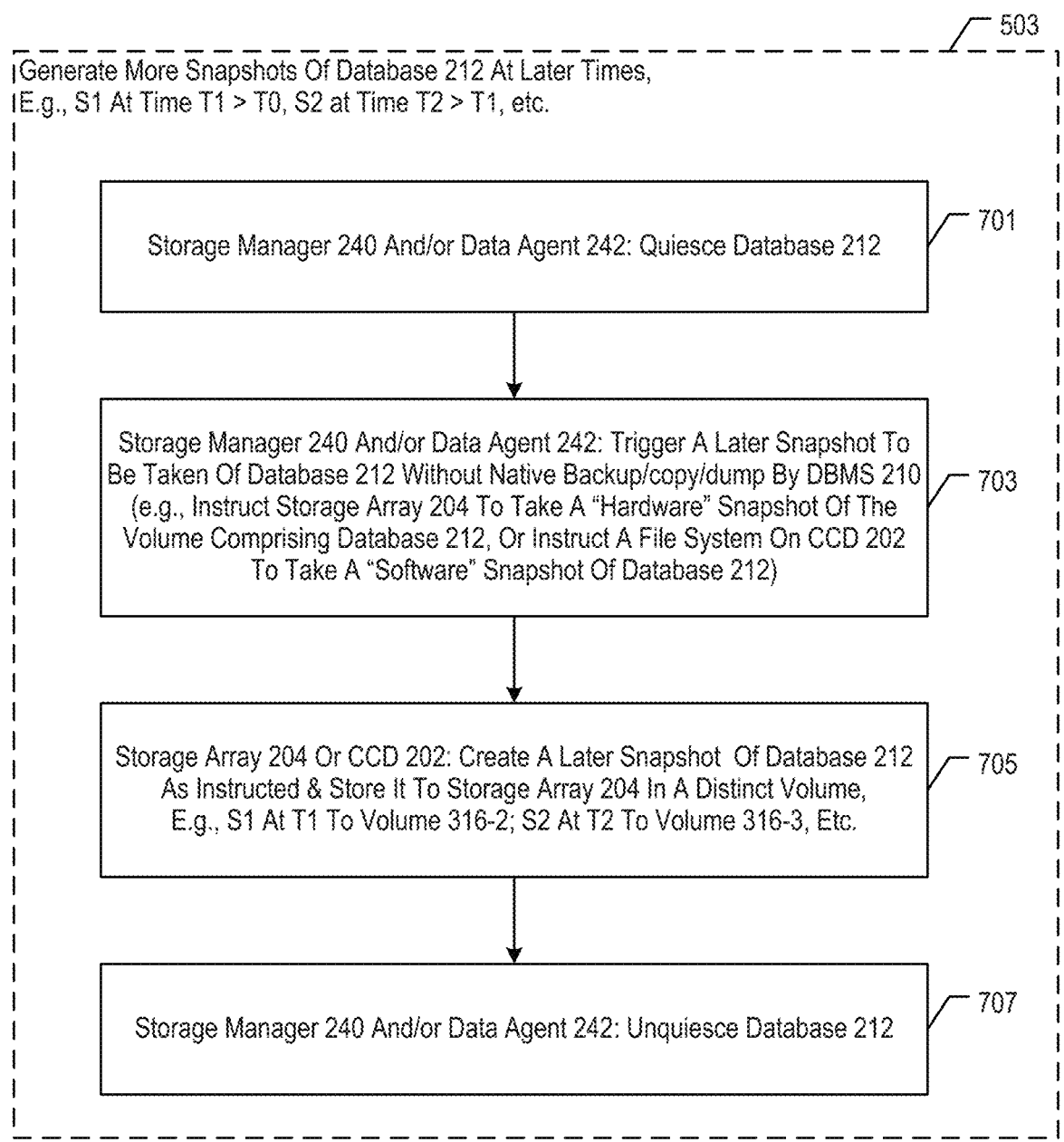
FIG. 7 depicts some salient sub-operation of block 503 in method 500.

FIG. 7 depicts some salient sub-operation of block 503 in method 500. Block 503 is generally directed at generating more snapshots of database 212 at later times after T0, e.g., snapshot S1 at time T1>T0, snapshot S2 at Time T2>T1, etc.

At block 701, storage manager 240 and/or data agent 242 may quiesce database 212, analogous to block 601.

At block 703, which is analogous to block 603, storage manager 240 and/or data agent 242 may trigger a later snapshot to be taken of database 212 without native backup/copy/dump by DBMS 210 (e.g., instruct storage array 204 to take a "hardware" snapshot of the storage volume comprising database 212, or instruct client computing device 202 to take a "software" snapshot of database 212).

At block 705, which is analogous to block 605, storage array 204 or client computing device 202 may create a later snapshot of database 212 as instructed; and may store it to storage array 204 in a distinct storage volume, e.g., storing snapshot S1 at T1 to volume 316-2; storing snapshot S2 at T2 to volume 316-3, etc.

At block 707, which is analogous to block 607, storage manager 240 and/or data agent 242 may unquiesce database 212 after the snapshot operation completes.

Figure 8:
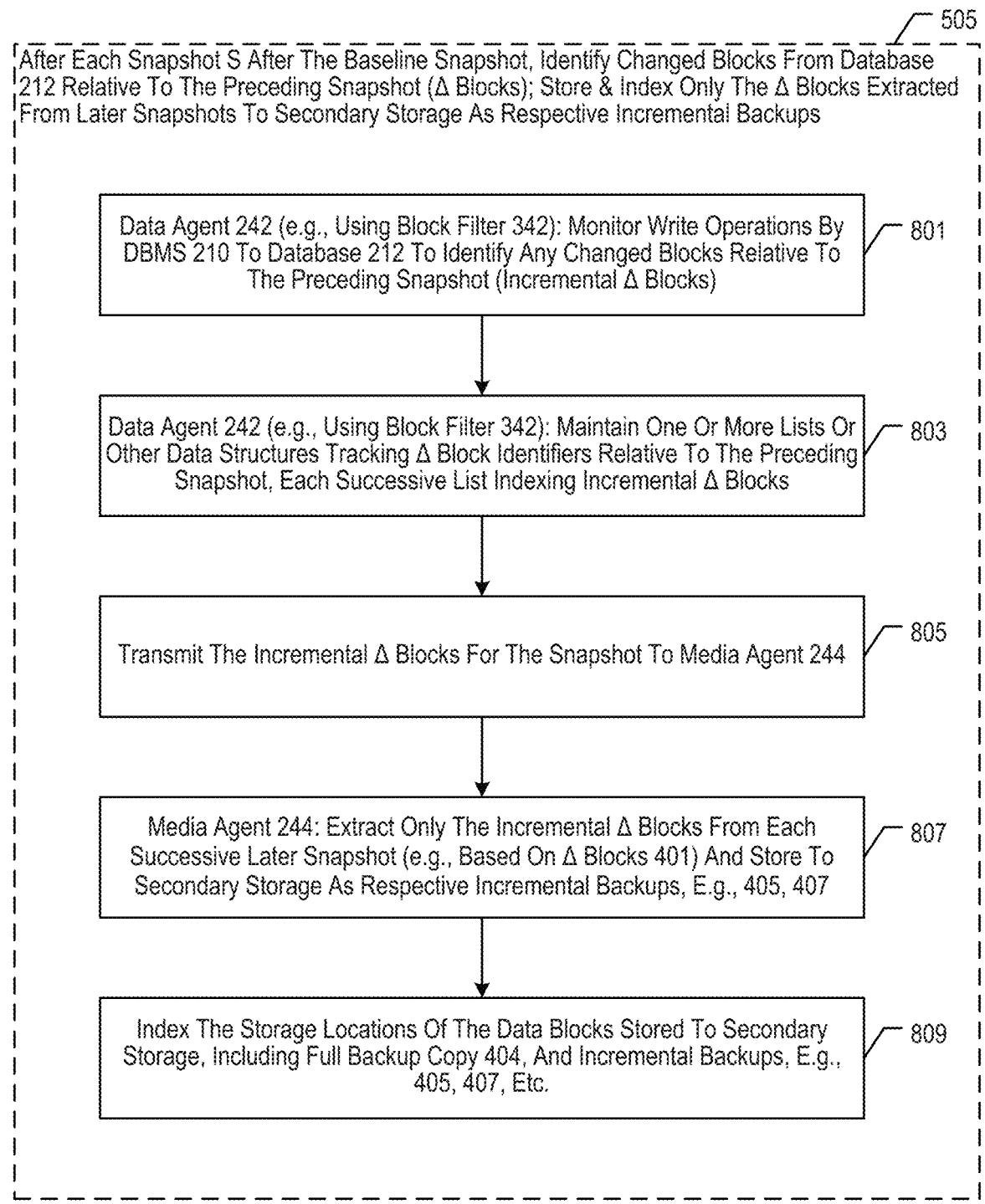
FIG. 8 depicts some salient sub-operation of block 505 in method 500.

FIG. 8 depicts some salient sub-operation of block 505 in method 500. In general, block 505 is directed at operations that follow each snapshot S after the baseline snapshot, to identify changed blocks from database 212 relative to the preceding snapshot (Δ blocks) and to store & index only the Δ blocks extracted from later snapshots to secondary storage as respective incremental backups.

At block 801, data agent 242 (e.g., using block filter 342) may monitor write operations by DBMS 210 to database 212 to identify any changed data blocks relative to the immediately preceding snapshot; these changed data blocks may be designated "incremental Δ blocks." Thus, data agent 242 may identify which data blocks are changing over time in database 212.

At block 803, data agent 242 (e.g., using block filter 342) may maintain one or more lists or other data structures tracking Δ block identifiers relative to the preceding snapshot, each successive list indexing incremental Δ blocks. For example, data agent 242 may maintain a list of identifiers of data blocks which changed after snapshot S1 is taken and may finalize the list after another snapshot is taken, e.g., snapshot S2. The list will then identify only those data blocks that have changed after snapshot S1 up until snapshot S2—incremental Δ blocks S2 versus S1. This process may continue indefinitely, tracking the incremental Δ blocks for each subsequent snapshot of database 212.

At block 805, data agent 242 may transmit the incremental Δ blocks for the current snapshot, and/or for any number of other snapshots, to media agent 244, e.g., transmitting incremental Δ blocks S2 versus S1.

At block 807, media agent 244, having received one or more lists of identifiers of Δ blocks, e.g., "Δ block identifiers 401," may proceed to extract only incremental Δ blocks from each successive later snapshot and store to secondary storage as respective incremental backups, e.g., 405, 407. Thus, each incremental backup illustratively comprises only changed data blocks identified in a given snapshot relative to the immediately preceding backup. To access a given snapshot on storage array 204, it may be necessary to first mount the snapshot to proxy server 206, e.g., as a volume or logical unit number (LUN). Media agent 244 may then perform the data block extractions.

At block 809, media agent 244 may index the storage locations of the data blocks stored to secondary storage, including the data blocks in full backup copy 404 (see, e.g., block 609), and incremental backups, e.g., 405, 407, etc. Media agent 244 may thus generate and store a respective block index for each backup, including full backups and incremental backups.

Figure 9:
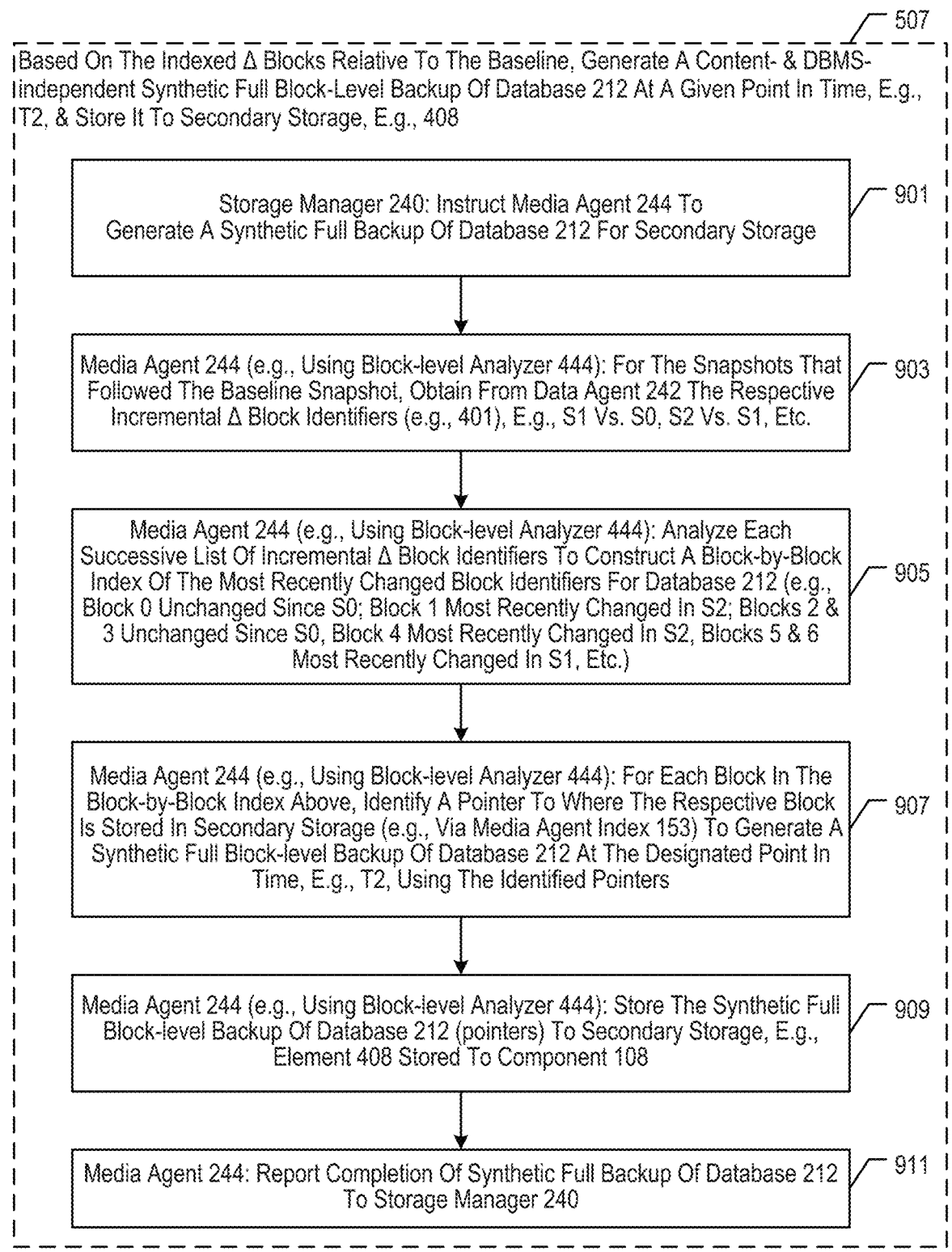
FIG. 9 depicts some salient sub-operation of block 507 in method 500.

FIG. 9 depicts some salient sub-operation of block 507 in method 500. In general, block 507 is directed at generating a content-independent and DBMS-indpendent synthetic full block-level backup of database 212 at a given point in time, e.g., T2, based on the indexed A blocks relative to the baseline, and storing the synthetic full backup to secondary storage, e.g., 408 to secondary storage device 108.

At block 901, storage manager 240 may instruct media agent 244 to generate a synthetic full block-level representation ("synthetic full backup" or "synthetic full block-level backup") of database 212 for storage to secondary storage. This may be part of launching a synthetic full backup job for the database 212 and/or for DBMS 210.

At block 903, media agent 244 (e.g., using block-level analyzer 444) may obtain from data agent 242 the respective incremental Δ block identifiers (e.g., 401), e.g., S1 vs. S0, S2 vs. S1, etc. for the snapshots that followed the baseline snapshot. These may have been obtained in a prior operation, e.g., block 805 in a preceding figure.

At block 905, media agent 244 (e.g., using block-level analyzer 444) may analyze each successive list of incremental Δ block identifiers to construct a block-by-block index of the most current block identifiers for database 212 (e.g., block 0 unchanged since S0; block 1 most recently changed in S2; blocks 2 & 3 unchanged since S0, block 4 most recently changed in S2, blocks 5 & 6 most recently changed in S1, etc.) Note that according to this illustrative analysis, intermediate changes are dropped when a given block changes again in a later snapshot, such as skipping blocks 1 and 4 in snapshot S1. See also element 408 and FIG. 4C and accompanying text.

At block 907, media agent 244 (e.g., using block-level analyzer 444) may, for each most-current block in the block-by-block index above, identify a pointer to where the respective block is stored in secondary storage (e.g., via media agent index 153) to generate a synthetic full block-level representation of database 212 at the designated point in time, e.g., T2, using the identified pointers. The representation may also be referred to herein as a "synthetic full backup" or "synthetic full block-level backup." Note that the pointer manipulation performed in the present operation, e.g., dropping intermediate changes to pick only the latest changes & most current blocks is far more efficient than moving data to secondary storage or copying data blocks to generate the backup. Moreover, generating successive synthetic full block-level backups may go on indefinitely, based on any number of incremental backups after the initial full backup, e.g., 404, is saved to secondary storage. Also, the DBMS native utilities are not involved in generating the synthetic full backup of database 212.

At block 909, media agent 244 (e.g., using block-level analyzer 444) may store the synthetic full block-level backup of database 212 (pointers) to secondary storage, e.g., element 408 stored to component 108.

At block 911, media agent 244 may report the completion of the synthetic full backup of database 212 to storage manager 240, which may maintain a record thereof, e.g., in management database 146.

In regard to FIGS. 2-9, other embodiments are possible within the scope of the present invention, such that the above-recited components, sub-components, logical operations, steps, blocks, operations, sub-operations, and/or messages/requests/queries/instructions may be differently arranged, sequenced, sub-divided, organized, and/or combined. In some embodiments, a different component may initiate or execute a given operation without departing from the scope of the present invention. For example, method 500 can include fewer, more, or different blocks than those illustrated in FIGS. 5-9 without departing from the spirit and scope of the respective descriptions herein.

Example Embodiments

A number of computer-implemented methods are disclosed herein as exemplary embodiments of the present invention, the methods being executed on one or more computing devices to perform a number of steps and/or operations. Each disclosed computing device comprises at least one hardware processing element (e.g., CPU, processing chip, etc.), non-transitory computer memory components (exclusive of transitory propagating signals), and communications hardware such as transmitters, receivers, and/or transceivers for electronically communicating with other components of the illustrative system and with other components such as network resources and/or storage devices. A number of embodiments may take the form of tangible non-transitory computer-readable media, excluding transitory propagating signals, which may store instructions that, when executed by at least one component of the illustrative storage management system, may cause the component to perform one or more of the above-recited methods or portions thereof. Likewise, other embodiments may take the form of systems comprising components which may be programmed to execute one or more of the computer-implemented methods; these components may execute a given method exclusively or may do so by interoperating with other components of the illustrative system and/or other components, such as network resources and/or storage devices.

An example method according to an illustrative embodiment of the present invention may be a computer-implemented method for synthesizing a block-level backup copy of a database in a storage management system based on one or more snapshots of the database, the method comprising executing on one or more computing devices the steps of: generating a synthetic full backup of the database, by a media agent executing on a secondary storage computing device in the storage management system, which synthetic full backup represents the database at the time that a most recent snapshot was generated in a plurality of successive snapshots taken of the database, wherein the synthetic full backup comprises a set of pointers to the most-current data blocks in: (i) a copy of a first snapshot and (ii) a plurality of incremental backups of the database based on corresponding snapshots in the plurality of successive snapshots taken of the database; and storing the synthetic full backup of the database to a secondary storage device component of the storage management system, by the media agent executing on the secondary storage computing device.

The above-recited method may further comprise: generating a first snapshot of the database, wherein the first snapshot is stored to a first storage device, wherein a database management system that executes on a client computing device component of the storage management system performs operations that change data in the database; storing, by the media agent, a copy of the first snapshot to the secondary storage device; after the first snapshot is generated, generating the plurality of successive snapshots of the database; after each snapshot in the plurality of successive snapshots is generated, identifying a respective set of data blocks which changed in the database relative to corresponding data blocks in an immediately preceding snapshot, which set of data blocks are designated changed data blocks for the respective snapshot; extracting, by the media agent, the identified changed data blocks from the respective snapshot; storing to the secondary storage device, by the media agent, the plurality of incremental backups of the database corresponding to each respective snapshot in the plurality of successive snapshots, wherein the respective incremental backup comprises the extracted changed data blocks from the respective snapshot; and storing, by the media agent to the second storage device, the synthetic full backup of the database. The above-recited method wherein the identifying is performed by a data agent executing on the client computing device, and further wherein the data agent is associated with the database management system executing on the same client computing device.

Another example method according to an illustrative embodiment of the present invention may be a computer-implemented method for synthesizing a block-level backup copy of a database in a storage management system based on one or more snapshots of the database, the method comprising executing on one or more computing devices the steps of: generating a first snapshot of the database, wherein the first snapshot is stored to a first storage device, wherein a database management system that executes on a client computing device component of the storage management system performs operations that change data in the database; storing, by a media agent component of the storage management system, a copy of the first snapshot to a second storage device; after the first snapshot is generated, generating a plurality of successive snapshots of the database; after each snapshot in the plurality of successive snapshots is generated, identifying, by a data agent that is associated with the database management system, a respective set of data blocks which changed in the database relative to corresponding data blocks in an immediately preceding snapshot, which set of data blocks are designated changed data blocks for the respective snapshot; extracting, by the media agent, the identified changed data blocks from the respective snapshot; storing to the second storage device, by the media agent, a plurality of incremental backups of the database corresponding to each respective snapshot in the plurality of successive snapshots, wherein the respective incremental backup comprises the extracted changed data blocks from the respective snapshot; generating, by the media agent, a synthetic full backup of the database, which represents the database at the time the most recent snapshot was generated in the plurality of successive snapshots, wherein the synthetic full backup comprises a set of pointers to the most-current data blocks in: the copy of the first snapshot and the plurality of incremental backups of the database; and storing, by the media agent to the second storage device, the synthetic full backup of the database.

The above-recited method wherein the copy of the first snapshot stored by the media agent to the second storage device comprises all data blocks in the first snapshot. The above-recited method may further comprise: restoring the database from the synthetic full backup to a location in the first storage device, wherein the restored database comprises all the data blocks of the database at the time the most recent snapshot was generated in the plurality of successive snapshots; and wherein the restoring is performed at least in part by the media agent; and wherein the restoring of the database is performed without processing thereof by the database management system. The above-recited method wherein the generating of the plurality of successive snapshots of the database is performed by the first storage device. The above-recited method wherein the generating of the plurality of successive snapshots of the database is performed by the client computing device.

According to another illustrative embodiment, a computer-implemented method for synthesizing a block-level backup copy of a database in a storage management system based on one or more snapshots of the database, may comprise executing on one or more computing devices the steps of: generating a first snapshot of the database, wherein the first snapshot is stored to a first storage device; storing, by a media agent component of the storage management system, a copy of the first snapshot to a second storage device; after the first snapshot is taken, identifying, by a data agent that is associated with the database management system, a first set of data blocks in the database which change relative to data blocks in the first snapshot as a result of database management system operations, wherein the data agent executes on a client computing device that also executes the database management system, and wherein the database management system performs operations that change data in the database; generating a second snapshot of the database, wherein the second snapshot is stored to the first storage device; receiving, by the media agent, identifiers of the first set of changed data blocks; extracting by the media agent, from the second snapshot, the identified first set of changed data blocks; storing a first incremental backup of the database to the second storage device, wherein the first incremental backup comprises the first set of changed data blocks extracted from the second snapshot; generating, by the media agent, a first synthetic full backup of the database, representing the database at the time the second snapshot was taken, wherein the first synthetic full backup comprises a set of pointers to the most-current data blocks in: the copy of the first snapshot and the first incremental backup of the database.

The above-recited method wherein the copy of the first snapshot stored by the media agent to the second storage device is designated a full backup of the database and comprises all data blocks in the first snapshot. The above-recited method may further comprise: storing, by the media agent to the second storage device, the first synthetic full backup of the database. The above-recited method may further comprise: restoring the database from the first synthetic full backup, wherein the restored database comprises all the data blocks of the database at the time the second snapshot was taken; wherein the restoring is performed at least in part by the media agent; and wherein the restoring of the database is performed without processing thereof by the database management system. The above-recited method may further comprise: generating a third snapshot of the database after the second snapshot is generated; receiving, by the media agent, identifiers of a second set of changed data blocks relative to the second snapshot; extracting by the media agent, from the third snapshot, the identified second set of changed data blocks; storing a second incremental backup of the database to the second storage device, wherein the second incremental backup comprises the second set of changed data blocks extracted from the third snapshot; generating, by the media agent, a second synthetic full backup of the database, representing the database at the time the third snapshot was taken, wherein the second synthetic full backup comprises a set of pointers to the most-current data blocks in: the copy of the first snapshot, the first incremental backup of the database, and the second incremental backup of the database, and wherein the second synthetic full backup skips over intermediate changed data blocks that changed in the second snapshot and changed again in the third snapshot; and storing, by the media agent to the second storage device, the second synthetic full backup of the database.

The above-recited method may further comprise: storing a plurality of incremental backups of the database to the second storage device, wherein each respective incremental backup comprises a corresponding set of changed data blocks, relative to the immediately preceding snapshot, extracted from a respective snapshot taken of the database; generating, by the media agent, a second synthetic full backup of the database, representing the database at the time the most recent snapshot was taken, wherein the second synthetic full backup comprises a set of pointers to the most-current data blocks in: the copy of the first snapshot, the first incremental backup of the database, and the plurality of incremental backups of the database; and storing, by the media agent to the second storage device, the second synthetic full backup of the database. The above-recited method may further comprise: restoring the database from the second synthetic full backup to a location in the first storage device, wherein the restored database comprises all the data blocks of the database at the time of the snapshot corresponding to the most recent incremental backup in the plurality of incremental backups; and wherein the restoring is performed at least in part by a media agent component of the storage management system; and wherein the restoring of the database is performed without processing thereof by the database management system. The above-recited method wherein the first synthetic full backup of the database is independent of the type of database management system. The above-recited method wherein the first synthetic full backup of the database is independent of the content of the data in the database. The above-recited method wherein the snapshots are hardware snapshots created by the first storage device. The above-recited method wherein the snapshots are software snapshots created by the client computing device.

An illustrative system according to another example embodiment of the present invention may be a storage management system useful for synthesizing a block-level backup copy of a database based on one or more snapshots of the database, the system comprising: a client computing device that executes a database management system, which operates upon a database, and also executes data agent associated with the database management system; a storage array in communication with the client computing device, wherein the storage array stores the database and a plurality of successive snapshots of the database; a secondary storage computing device that executes a media agent; a secondary storage device in communication with the media agent, wherein the secondary storage device comprises a full backup of a first snapshot of the database taken at a first time, wherein the full backup and the first snapshot each comprises a first set of data blocks; wherein the client computing device, when executing the data agent, is programmed to identify, after each snapshot is taken, data blocks that change in the database relative to the data blocks in the respective snapshot; and wherein the secondary storage computing device, when executing the media agent, is programmed to: index, into a first index, the storage locations in the secondary storage device of the first set of data blocks of the full backup, store a plurality of incremental backups of the database to the secondary storage device, wherein each respective incremental backup comprises a corresponding set of changed data blocks extracted by the media agent from a respective snapshot in the plurality of successive snapshots on the storage array, wherein the extracted data blocks are changed relative to the immediately preceding snapshot of the database, and wherein the changed data blocks are identified by the data agent, generate, for each incremental backup, a corresponding index of the storage locations in the secondary storage device of the data blocks of the respective incremental backup, generate a synthetic full backup of the database, which represents the database at the time of the most recent snapshot in the plurality of successive snapshots, wherein the synthetic full backup comprises a set of pointers to the most current data blocks in: the full backup of the database and the plurality of incremental backups, wherein the synthetic full backup skips over intermediate changed data blocks that changed in a snapshot and changed again in a later snapshot in the plurality of successive snapshots, and store the synthetic full backup of the database to the secondary storage device.

Another illustrative system according to another example embodiment of the present invention may be a storage management system useful for synthesizing a block-level backup copy of a database based on one or more snapshots of the database, the system comprising: a client computing device that executes a database management system, which operates upon a database, and also executes data agent associated with the database management system; a storage array in communication with the client computing device, wherein the storage array stores the database and a plurality of successive snapshots of the database; a secondary storage computing device that executes a media agent; a secondary storage device in communication with the media agent, wherein the secondary storage device comprises a full backup of a first snapshot of the database taken at a first time, wherein the full backup and the first snapshot each comprises a first set of data blocks; wherein the data agent is configured to identify, after each snapshot is taken, data blocks that change in the database relative to the data blocks in the respective snapshot; and wherein the media agent, when is configured to: index, into a first index, the storage locations in the secondary storage device of the first set of data blocks of the full backup, store a plurality of incremental backups of the database to the secondary storage device, wherein each respective incremental backup comprises a corresponding set of changed data blocks extracted by the media agent from a respective snapshot in the plurality of successive snapshots on the storage array, wherein the extracted data blocks are changed relative to the immediately preceding snapshot of the database, and wherein the changed data blocks are identified by the data agent, generate, for each incremental backup, a corresponding index of the storage locations in the secondary storage device of the data blocks of the respective incremental backup, generate a synthetic full backup of the database, which represents the database at the time of the most recent snapshot in the plurality of successive snapshots, wherein the synthetic full backup comprises a set of pointers to the most current data blocks in: the full backup of the database and the plurality of incremental backups, wherein the synthetic full backup skips over intermediate changed data blocks that changed in a snapshot and changed again in a later snapshot in the plurality of successive snapshots, and store the synthetic full backup of the database to the secondary storage device.

The above-recited storage management system may further comprise: wherein the synthetic full backup is based on the first index and the subsequent indexes corresponding to the incremental backups. The above-recited storage management system wherein the media agent is further configured to: restore the database from the synthetic full backup to a location in the first storage device, wherein the restored database comprises all the data blocks of the database at the time of the most recent snapshot in the plurality of successive snapshots; and wherein the database is restored without processing thereof by the database management system.

A computer-readable medium according to an example embodiment of the present invention may be a tangible computer-readable medium, excluding transitory propagating signals, storing instructions that, when executed by at least one secondary storage computing device, cause the secondary storage computing device to perform operations comprising: storing a copy of a first snapshot of a database to a secondary storage device, which copy is designated a full backup of the database; receiving identifiers of a first set of changed data blocks in the database relative to the first snapshot; extracting the identified first set of changed data blocks from a second snapshot of the database which follows the first snapshot; storing a first incremental backup of the database to the secondary storage device, wherein the first incremental backup comprises the first set of changed data blocks extracted from the second snapshot; generating a first synthetic full backup of the database, representing the database at the time the second snapshot was taken, wherein the first synthetic full backup comprises a set of pointers to the most-current data blocks in: the full backup of the database and the first incremental backup of the database; and storing the first synthetic full backup of the database to the secondary storage device.

The above-recited tangible computer-readable medium wherein the copy stored by the secondary storage computing device to the secondary storage device comprises all data blocks in the first snapshot. The above-recited tangible computer-readable medium wherein the operations further comprise: restoring the database from the first synthetic full backup to a location in a primary storage device, wherein the restored database comprises all the data blocks of the database at the time the second snapshot was taken; and wherein the restoring of the database is performed without processing thereof by a database management system that operates upon the database. The above-recited tangible computer-readable medium wherein the operations further comprise: receiving identifiers of a second set of changed data blocks in the database relative to the second snapshot; extracting the identified first set of changed data blocks from a third snapshot of the database which follows the second snapshot; storing a second incremental backup of the database to the secondary storage device, wherein the second incremental backup comprises the second set of changed data blocks extracted from the third snapshot; generating a second synthetic full backup of the database, representing the database at the time the third snapshot was taken, wherein the second synthetic full backup comprises a set of pointers to the most-current data blocks in: the full backup of the database, the first incremental backup of the database, and the second incremental backup of the database, and wherein the second synthetic full backup skips over intermediate changed data blocks that changed in the second snapshot and changed again in the third snapshot. The above-recited tangible computer-readable medium wherein the operations further comprise: storing the second synthetic full backup of the database to the secondary storage device; restoring the database from the second synthetic full backup, wherein the restored database comprises all the data blocks of the database at the time the third snapshot was taken, and wherein the restoring of the database is performed without processing thereof by a database management system that operates upon the database.

Other methods, systems, and computer-readable media (tangible, non-transitory) will also fall within the scope of the present invention, based on one or more of the above-recited illustrative methods, systems, and computer-readable media, and/or in any combination thereof.

Terminology

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

Depending on the embodiment, certain operations, acts, events, or functions of any of the algorithms described herein can be performed in a different sequence, can be added, merged, or left out altogether (e.g., not all are necessary for the practice of the algorithms). Moreover, in certain embodiments, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described herein. Software and other modules may reside and execute on servers, workstations, personal computers, computerized tablets, PDAs, and other computing devices suitable for the purposes described herein. Software and other modules may be accessible via local memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, the processing of the various components of the illustrated systems can be distributed across multiple machines, networks, and other computing resources. In addition, two or more components of a system can be combined into fewer components. Various components of the illustrated systems can be implemented in one or more virtual machines, rather than in dedicated computer hardware systems and/or computing devices. Likewise, the data repositories shown can represent physical and/or logical data storage, including, for example, storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks.

These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded onto a computing device or other programmable data processing apparatus to cause a series of operations to be performed on the computing device or other programmable apparatus to produce a computer implemented process such that the instructions which execute on the computer or other programmable apparatus provide steps for implementing the acts specified in the flow chart and/or block diagram block or blocks.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates the various aspects of the invention in any number of claim forms. For example, while only one aspect of the invention is recited as a means-plus-function claim under 35 U.S.C sec. 112(f) (AIA), other aspects may likewise be embodied as a means-plus-function claim, or in other forms, such as being embodied in a computer-readable medium. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application, in either this application or in a continuing application.

What is claimed is:

1. A non-transitory computer-readable medium storing instructions that, when executed by a computing device that comprises one or more processors and computer memory, cause the computing device to:
   store a copy of a first snapshot of a database to a storage device, wherein a database management system (DBMS) changes data in the database;
   after the first snapshot, cause successive snapshots of the database to be generated, wherein for a given successive snapshot:
   (i) from a block filter that is independent of data block content, receive identifiers of changed data blocks within the given successive snapshot that changed compared to corresponding data blocks in an immediately preceding snapshot of the database,
   (ii) extract the changed data blocks from the given successive snapshot,
   (iii) generate an incremental backup copy of the database that corresponds to the given successive snapshot and comprises the changed data blocks extracted from the given successive snapshot, and
   (iv) track the changed data blocks in the incremental backup copy in an index of changed data blocks;
   use the index to find, in the copy of the first snapshot and in incremental backup copies corresponding to the successive snapshots, data blocks that are most current in time including changed data blocks and skipping over changed data blocks that are not most current in time;
   consolidate the data blocks that are most current in time to generate a synthetic full block-level backup copy of the database;
   after storing the synthetic full block-level backup copy of the database to a storage device, report to a storage manager a completion of the synthetic full block-level backup copy; and
   independent of database content, restore the database from the synthetic full block-level backup copy without using a native restore feature of the database management system (DBMS), wherein the data blocks in the synthetic full block-level backup copy are reassembled into files in a transparent fashion.

2. The non-transitory computer-readable medium of claim 1, wherein the index tracks the changed data blocks using pointers.

3. The non-transitory computer-readable medium of claim 1, wherein the synthetic full block-level backup copy of the database is generated based on pointers in the index that point to the data blocks that are most current in time.

4. The non-transitory computer-readable medium of claim 1, wherein the synthetic full block-level backup copy of the database comprises pointers obtained from the index that point to the data blocks that are most current in time.

5. The non-transitory computer-readable medium of claim 1, wherein the copy of the first snapshot comprises all data blocks in the first snapshot.

6. The non-transitory computer-readable medium of claim 1, wherein a media agent that executes on the computing device performs according to the instructions.

7. The non-transitory computer-readable medium of claim 1, wherein the synthetic full block-level backup copy is independent of type of database management system.

8. The non-transitory computer-readable medium of claim 1, wherein a data agent, which is a component of a data storage management system that also comprises the computing device and the storage manager, monitors changes to the database made by the database management system (DBMS) using the block filter.

9. The non-transitory computer-readable medium of claim 1, wherein the successive snapshots of the database are generated by a storage device that stores the database.

10. The non-transitory computer-readable medium of claim 1, wherein the successive snapshots of the database of the database are generated by a computing device that hosts the database management system (DBMS).

11. A method performed by a media agent that executes on a computing device comprising one or more processors and computer memory:
   storing a copy of a first snapshot of a database to a storage device, wherein a database management system (DBMS) changes data in the database;
   after the first snapshot, causing successive snapshots of the database to be generated, wherein for a given successive snapshot:
   (i) from a block filter that is independent of data block content, receiving identifiers of changed data blocks within the given successive snapshot that changed compared to corresponding data blocks in an immediately preceding snapshot of the database,
   (ii) extracting the changed data blocks from the given successive snapshot,
   (iii) generating an incremental backup copy of the database that corresponds to the given successive snapshot and comprises the changed data blocks extracted from the given successive snapshot, and
   (iv) tracking the changed data blocks of the incremental backup copy in an index of changed data blocks;
   using the index to find, in the copy of the first snapshot and in incremental backup copies corresponding to the successive snapshots, data blocks that are most current in time including changed data blocks and skipping over changed data blocks that are not most current in time;
   consolidating the data blocks that are most current in time into a synthetic full block-level backup copy of the database;
   after storing the synthetic full block-level backup copy of the database to a storage device, reporting to a storage manager a completion of the synthetic full block-level backup copy; and
   independent of database content, restoring the database from the synthetic full block-level backup copy without using a native restore feature of the database management system (DBMS), wherein the data blocks in the synthetic full block-level backup copy are reassembled into files in a transparent fashion.

12. The method of claim 11, wherein the index tracks the changed data blocks using pointers.

13. The method of claim 11, wherein the synthetic full block-level backup copy of the database is generated based on pointers in the index that point to the data blocks that are most current in time.

14. The method of claim 11, wherein the synthetic full block-level backup copy of the database comprises pointers obtained from the index that point to the data blocks that are most current in time.

15. The method of claim 11, wherein the copy of the first snapshot comprises all data blocks in the first snapshot.

16. The method of claim 11, wherein the synthetic full block-level backup copy is independent of type of database management system.

17. The method of claim 11, wherein a data agent, which is a component of a data storage management system that also comprises the computing device and the storage manager, monitors changes to the database made by the database management system (DBMS) using the block filter.

18. The method of claim 11, wherein the successive snapshots of the database are generated by a storage device that stores the database.

19. The method of claim 11, wherein the media agent restores the database from the synthetic full block-level backup copy in conjunction with a data agent, which is a component of a data storage management system that also comprises the computing device and the storage manager, and wherein the data agent monitors changes to the database made by the database management system (DBMS) using the block filter.

20. The method of claim 11, wherein the restored database is directly accessible as primary data to the database management system (DBMS).

\* \* \* \* \*